(12) United States Patent
Tobb

(10) Patent No.: US 12,555,118 B2
(45) Date of Patent: Feb. 17, 2026

(54) AGE VERIFICATION SYSTEM, METHOD AND APPARATUS

(71) Applicant: Ronald Eric Tobb, Stevensville, MD (US)

(72) Inventor: Ronald Eric Tobb, Stevensville, MD (US)

( * ) Notice: Subject to any disclaimer, the term of this patent is extended or adjusted under 35 U.S.C. 154(b) by 0 days.

(21) Appl. No.: 17/523,881

(22) Filed: Nov. 10, 2021

(65) Prior Publication Data

US 2022/0253846 A1 Aug. 11, 2022

Related U.S. Application Data

(60) Provisional application No. 63/148,546, filed on Feb. 11, 2021.

(51) Int. Cl.
 *G06Q 30/00* (2023.01)
 *G06Q 20/40* (2012.01)
 (Continued)

(52) U.S. Cl.
 CPC ....... *G06Q 20/405* (2013.01); *G06Q 20/4014* (2013.01); *G06Q 30/0607* (2013.01); *G06V 30/418* (2022.01)

(58) Field of Classification Search
 CPC ............ G06Q 20/405; G06Q 20/4014; G06Q 30/0607; G06V 30/418; G06V 20/95; G07C 2209/08; G07C 9/20
 (Continued)

(56) References Cited

U.S. PATENT DOCUMENTS 7,107,226 B1* 9/2006 Cassidy ................. G06Q 30/06
  707/999.005
7,337,166 B2* 2/2008 Bailey ................. G06F 16/2428
(Continued)

FOREIGN PATENT DOCUMENTS

WO 2006112875 A1 10/2006

OTHER PUBLICATIONS

Harper, Colin. Civic Demos Proof of Concept with Beer Vending Machines, Launches ID Codes. May 16, 2018. Published by Bitcoin Magazine. Accessed via https://bitcoinmagazine.com/business/civic-demos-proof-concept-beer-vending-machines-launches-id-codes (Year: 2018).*

(Continued)

*Primary Examiner* — Christopher B Seibert
(74) *Attorney, Agent, or Firm* — GIBRALTAR CONSULTING LLC; Tariq S. Najee-Ullah

(57) ABSTRACT

The system and techniques disclosed herein perform advanced and automatic age verification. The age verification system (AVS) is designed for automated and accurate age-restricted access control and age verification for the sale of age-controlled products. For example, the AVS can be employed to perform age-verification to permit the legal sale/purchase of age-controlled products such as alcohol, tobacco, cannabis, and the like, and Also, the AVS can be used to control legal access to age-restricted areas such as casinos, movie theaters, bars, and the like. The AVS can include a scanner for scanning a barcode printed on an identification (ID) card, an application, and a computer unit having output devices for generating visual, audible, and electronic signals to view, alert, and control age-restricted entry and control the sale of age-controlled products. The AVS can include automatic door lock functionality that supports age-restricted access control.

13 Claims, 43 Drawing Sheets

(51) Int. Cl.
*G06Q 30/0601* (2023.01)
*G06V 30/418* (2022.01)

(58) Field of Classification Search
USPC .................................................... 705/26.25
See application file for complete search history.

(56) References Cited

U.S. PATENT DOCUMENTS

| | | | |
|---|---|---|---|
| 7,708,189 B1 | 5/2010 | Cipriano | |
| 8,344,849 B2 | 1/2013 | Larsson et al. | |
| 8,355,992 B1 | 1/2013 | Haugh | |
| 8,833,658 B2 | 9/2014 | Lebaschi et al. | |
| 10,373,409 B2 | 8/2019 | White et al. | |
| 10,726,246 B1* | 7/2020 | McClellan | G07F 9/002 |
| 2001/0032170 A1* | 10/2001 | Sheth | G06Q 10/103 |
| | | | 705/26.1 |
| 2003/0014317 A1* | 1/2003 | Siegel | G06Q 30/06 |
| | | | 705/28 |
| 2003/0220830 A1* | 11/2003 | Myr | G06Q 30/0245 |
| | | | 705/14.54 |
| 2004/0243505 A1* | 12/2004 | Sweeting | G06Q 40/00 |
| | | | 705/37 |
| 2004/0250142 A1 | 12/2004 | Feyler | |
| 2004/0254950 A1* | 12/2004 | Musgrove | G06F 16/904 |
| | | | 707/999.102 |
| 2005/0137987 A1 | 6/2005 | May et al. | |
| 2005/0177474 A1* | 8/2005 | Ma | G06Q 30/0633 |
| | | | 705/30 |
| 2006/0074780 A1* | 4/2006 | Taylor | G06Q 40/04 |
| | | | 705/37 |
| 2007/0088625 A1* | 4/2007 | Fish | G06Q 30/02 |
| | | | 705/26.7 |
| 2007/0094056 A1* | 4/2007 | Kang | G06Q 10/02 |
| | | | 705/5 |
| 2007/0179868 A1* | 8/2007 | Bozym | G06Q 30/0601 |
| | | | 705/26.1 |
| 2008/0052372 A1* | 2/2008 | Weber | G06F 16/58 |
| | | | 707/E17.026 |
| 2008/0189212 A1* | 8/2008 | Kulakowski | G06Q 30/018 |
| | | | 705/50 |
| 2009/0138817 A1* | 5/2009 | Oron | G06F 16/9577 |
| | | | 715/788 |
| 2009/0150262 A1* | 6/2009 | Mizhen | G06Q 30/0601 |
| | | | 705/26.1 |
| 2009/0276088 A1* | 11/2009 | Ruddy | G07F 9/026 |
| | | | 221/199 |
| 2010/0205551 A1* | 8/2010 | Underwood | G06Q 30/0633 |
| | | | 715/760 |
| 2010/0234987 A1* | 9/2010 | Benschop | G07F 7/025 |
| | | | 340/5.81 |
| 2011/0047014 A1* | 2/2011 | De Angelo | G06F 3/0482 |
| | | | 715/810 |
| 2011/0059727 A1* | 3/2011 | Lisboa | H04L 51/04 |
| | | | 455/414.1 |
| 2011/0161384 A1* | 6/2011 | Wykes | G06Q 30/0603 |
| | | | 707/822 |
| 2011/0238484 A1* | 9/2011 | Toumayan | G06Q 30/0641 |
| | | | 709/225 |
| 2012/0109713 A1* | 5/2012 | Wilhite | G06Q 30/0611 |
| | | | 705/26.4 |
| 2012/0215665 A1* | 8/2012 | Marshall | H04L 67/02 |
| | | | 705/27.1 |
| 2012/0226620 A1* | 9/2012 | Junger | G06Q 30/00 |
| | | | 705/304 |
| 2012/0265648 A1* | 10/2012 | Jerome | G06Q 10/10 |
| | | | 705/26.62 |
| 2013/0041778 A1* | 2/2013 | Nativ | G06Q 30/0633 |
| | | | 705/26.62 |
| 2013/0112746 A1 | 5/2013 | Krell et al. | |
| 2013/0151481 A1* | 6/2013 | Andrasick | G06F 16/9532 |
| | | | 707/E17.014 |
| 2015/0227995 A1* | 8/2015 | Takahashi | G06Q 30/0607 |
| | | | 705/26.25 |
| 2017/0372392 A1* | 12/2017 | Metnick | G06Q 30/0613 |
| 2019/0251562 A1* | 8/2019 | Dabiri | G06Q 50/01 |
| 2020/0000143 A1* | 1/2020 | Anderson | G06F 18/23 |
| 2020/0401792 A1* | 12/2020 | McClellan | G06Q 20/40145 |
| 2021/0173674 A1* | 6/2021 | Rose | G06Q 20/4016 |
| 2022/0012677 A1* | 1/2022 | Rongley | G06K 7/10297 |
| 2022/0253846 A1* | 8/2022 | Tobb | G06V 30/418 |

OTHER PUBLICATIONS

Campbell, Anita. What is a POS and Why Does Your Business Need One? May 9, 2018. Published via US Small Business Administration. Accessed via https://www.sba.gov/blog/what-pos-why-does-your-business-need-one (Year: 2018).*

Cambridge Business English Dictionary. Accessed via https://dictionary.cambridge.org/us/dictionary/english/pos (Year: 2024).*

Hayes, Adam. What is POS System and How Does it Work? Dec. 20, 2023. Published via Investopedia. Accessed via https://www.investopedia.com/terms/p/point-of-sale.asp (Year: 2023).*

Deutch, Kira. What is a POS system and How Does it Work? Nov. 30, 2023. Published via Square. Accessed via https://squareup.com/us/en/the-bottom-line/operating-your-business/what-pos-system (Year: 2023).*

Liukkonen, Jere. "Machine vision system for a reverse vending machine." (2015). (Year: 2015).*

* cited by examiner

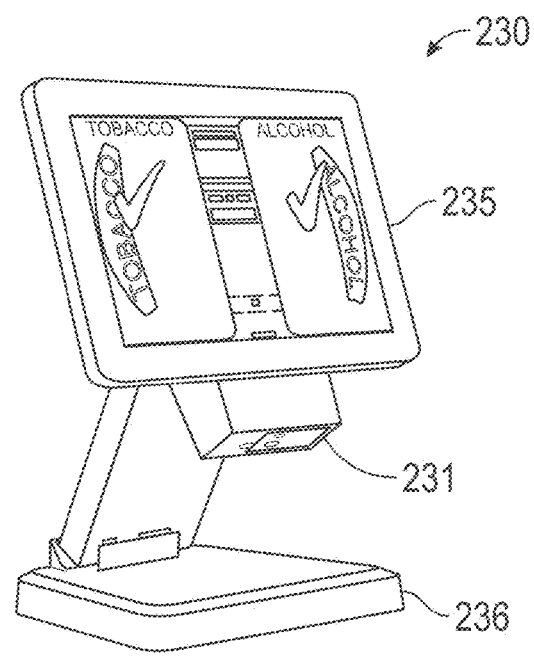
FIG. 2C
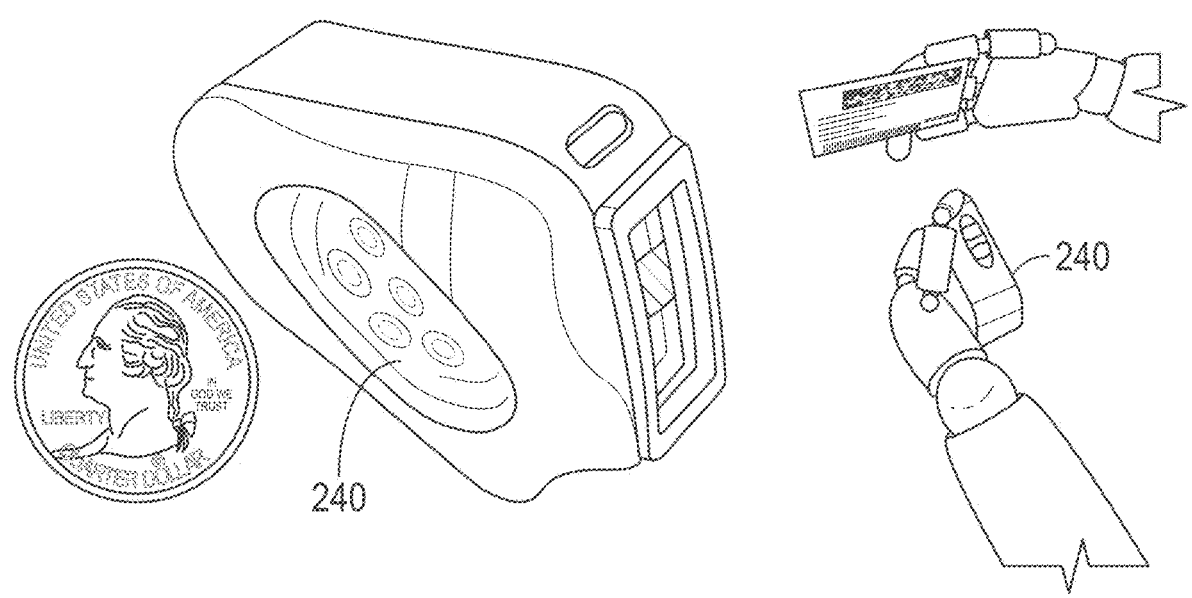
FIG. 2D
FIG. 2E

FIG. 3G

| # | QUESTION | ANSWER | |
|---|---|---|---|
| 1 | DO THEY SEEM CALM (CORRECT) OR NERVOUS (INCORRECT)? ASK THEIR AGE | OBSERVE | INCORRECT / CORRECT |
| 4 | WHATS YOR EYE COLOR? | MATCH TO PERSON AND DL | INCORRECT / CORRECT |
| 7 | WHATS YOR ZIP CODE? | MATCH TO DL | INCORRECT / CORRECT |
| 3 | DO THEY KNOW THEIR ADDRESS? | MATCH TO DL | INCORRECT / CORRECT |
| 6 | WHAT YOUR ZODIAC SIGN | ARE THEY CONFIDENT IN THEIR ANSWER | INCORRECT / CORRECT |
| 8 | ASK FOR STATE CAPITAL | ARE THEY CORRECT | INCORRECT / CORRECT |
| 2 | WHAT YEAR WERE YOU BORN IN? | MATCH TO DL | INCORRECT / CORRECT |
| 5 | DO YOU LIVE ON STREET OR A ROAD? | MATCH TO DL | INCORRECT / CORRECT |

JUDGEMENT: PASS / FAIL

| ID GENDER | STAFF NAME | FAKE CITY | TIME STATE | PURCHASE ZIP | LICENSE | BIRTHDAY EXPIRATION | AGE |
|---|---|---|---|---|---|---|---|
| 20 | RT | | JANUARY-23-2021 10:07 PM | TOBACCO VAPOR ALCOHOL | T-100-100-100-100 | NOVEMBER-01-2021 | |
| 19 | RT | | JANUARY-23-2021 09:51 PM | NOT PERMITTED TOBACCO VAPOR ALCOHOL | T-100-100-100-100 | NOVEMBER-01-2021 | |
| 18 | RT | | JANUARY-23-2021 09:46 PM MD | NOT PERMITTED TOBACCO VAPOR ALCOHOL | T-100-100-100-100 | NOVEMBER-01-2021 | |
| 17 | RT | | JANUARY-23-2021 09:32 PM MD | TOBACCO VAPOR ALCOHOL | T-100-100-100-100 | NOVEMBER-01-2021 | |
| 16 | RT | | JANUARY-23-2021 09:32 PM | TOBACCO VAPOR ALCOHOL | T-100-100-100-100 | NOVEMBER-01-2021 | |
| 15 | RT | | JANUARY-23-2021 09:21 PM MD | TOBACCO | | | |

FIG. 7S

AGE VERIFICATION SYSTEM, METHOD AND APPARATUS

FIELD OF DISCLOSURE

The present disclosure generally relates to an automatic image scanning system for verifying an age of a human user to verify and determine if the human user is of legal age to purchase or use an age restricted item or service. Examples include retail, public facing or wholesale point-of-sale (POS) sites, Point of Delivery Sites, unattended and attended Age Restricted Access control areas, Mobile delivery of age restricted items, and attended and unattended age restricted vending.

RELATED APPLICATION(S)

Under provisions of 35 U.S.C. § 119(e), the Applicant claim the benefit of U.S. provisional application No. 63/148,546, filed Feb. 11, 2021, which is incorporated herein by reference.

It is intended that each of the referenced applications may be applicable to the concepts and embodiments disclosed herein, even if such concepts and embodiments are disclosed in the referenced applications with different limitations and configurations and described using different examples and terminology.

BACKGROUND OF THE DISCLOSURE

It may be desirable for retailers and/or owners to utilize an advanced automatic age verification system that is designed specifically for ease of use and accuracy in a variety of situations, including but not limited to: point-of-sale (POS) sites; Point of Delivery Sites; unattended and attended Age Restricted Access control areas; Mobile delivery of age restricted items; and attended and unattended age restricted vending.

BRIEF OVERVIEW

An age verification system, method, and apparatus may be provided. The age verification system, method, and apparatus may be configured to provide automatic and accurate verification of a person's age can then be applied directly at the POS (variety of situations) prior to the sale of a plurality of age-controlled products, such as alcohol, tobacco, spray paints, fireworks, video recordings, games, vending machines, pharmaceuticals and the like. The age verification system, method, and apparatus may be configured to provide automatic and accurate verification of a person's age for providing unattended access control to age restricted environments including but not limited to vape stores, beer caves, cold storage alcohol areas, commercial walk-in coolers, nightclubs, party venues, adult parties, cannabis dispensaries, and the like.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are explanatory only and are not restrictive of the disclosure, as claimed.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 2C depicts an example of an integrated AVS, in accordance with an embodiment of the present disclosure. Here the input method (bar code) scanner and computer are 1 unit FIG. 2D depicts another example of an integrated AVS particularly configured for portable handle use, in accordance with an embodiment of the present disclosure.

FIG. 2E depicts another example of the integrated AVS particularly configured for mobile, portable hand-held use shown in FIG. 2C, in accordance with an embodiment of the present disclosure. In this use case, the computer unit and the scanner may be implemented as one piece or two parts.

FIG. 3G depicts an example of an interface displaying a function of a truth meter for the advanced fake ID detection feature that may be implemented by the application aspects of the AVS system, in accordance with an embodiment of the present disclosure.

FIG. 7I depicts an example of an interface supporting a customer appraisal module that may be implemented by the application aspects of the AVS system, in accordance with an embodiment of the present disclosure.

FIG. 7O depicts an example of an interface supporting custom screen savers that may be implemented by the application aspects of the AVS system, in accordance with an embodiment of the present disclosure.

FIG. 7S depicts an example of an interface displaying compliance logs that may be implemented by the application aspects of the AVS system, in accordance with an embodiment of the present disclosure.

DETAILED DESCRIPTION OF THE DISCLOSURE

Figure 1A:
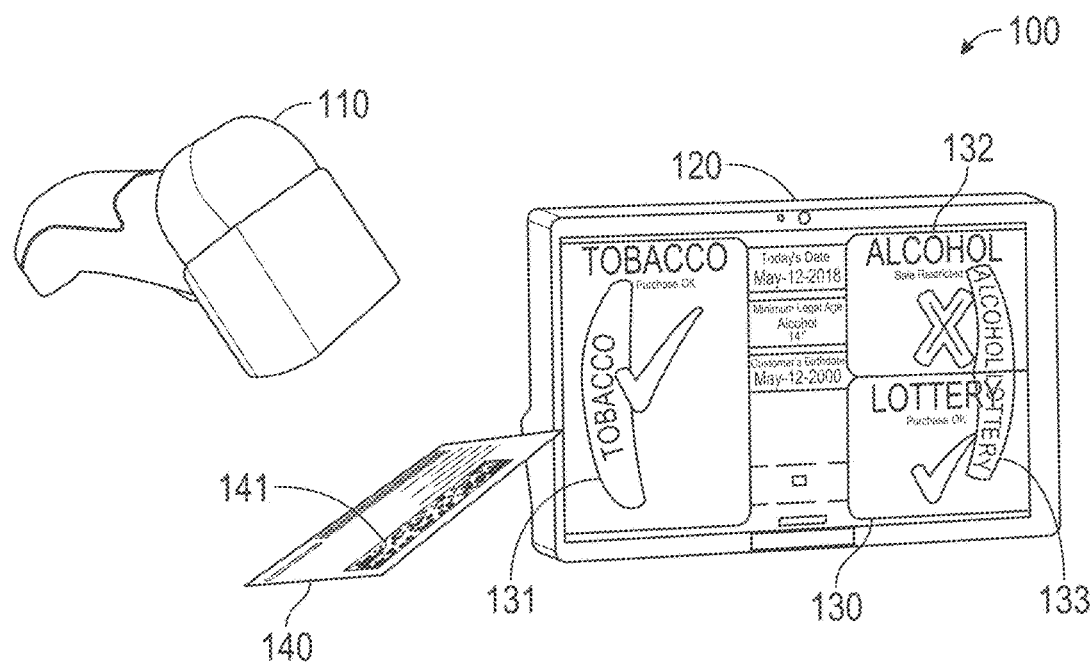
FIG. 1A illustrates an example of an age verification system (AVS) performing age verification for controlling sale and/or purchase of age-controlled products, according to one or more embodiments shown and described herein.

Products and services that are associated with age restrictions, such as alcohol, tobacco, vape, CBD, Cannabis, lottery tickets, and casinos (e.g., gambling) presents particular issues for retailers and/or owners. Due to the legal liabilities often involved with offering age-controlled products, and the social responsibilities and impact to public and personal health implications for selling to an underage person. Retailers that provide such products and services must have effective systems in place to prevent sales to prospective customers who are underage. It is the responsibility of the retailers to ensure that age-controlled products are not sold to patron's who are under the minimum legal age.

For example, a convenience store may be held liable if a patron that is under the legal age for purchasing alcohol (e.g., 21 years of age in the United States) buys a product containing alcohol from their establishment. In the case that a retailer is found responsible for an illegal sell of an age-controlled product, even unintentionally, this situation can lead to consequences that are detrimental to the retailer and/or owner, such as fines, lawsuits, and reputation damage. Challenges associated with age verification can be further exacerbated by various factors, for instance when underage patrons try to circumvent age verification (e.g., falsified identification) and instances when age restriction laws vary in different states. Consequently, retailers often shoulder the burden of setting up effective systems that are capable of verifying the age of potential purchasers to ensure they are above the minimum legal age to purchase an age-controlled product. Furthermore, these systems must take into account all associated legal requirements associated with the age-controlled products in a manner that allows the retailers to take reasonable precautions and to exercise all due diligence to avoid committing an offence. These legal requirements are often time a retailer's primary defense in consumer protection legislation.

The present disclosure includes many aspects and features. Moreover, while many aspects and features relate to, and are described in, the context of techniques and systems for providing automatic and accurate age verification. The age-verification techniques and systems can analyze a user's age, based on a scanned ID, tokenization inputs from identity documents, electronic digital identify tokens, or an QR code representing an age and origin. A scanned ID such as a driver's license, can ultimately determine whether to allow or prohibit the user from entering an age-restricted area or purchase of an age-controlled product. The present disclosure can be understood more readily by reference to the following detailed description of the disclosure and the Examples included therein.

Before the present articles, systems, apparatuses, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" mean that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; and the number or type of aspects described in the specification.

Disclosed are the components to be used to manufacture the disclosed apparatuses, systems, and articles of the disclosure as well as the apparatuses themselves to be used within the methods disclosed herein. These and other materials are disclosed herein, and it is understood that when combinations, subsets, interactions, groups, etc. of these materials are disclosed that while specific reference of each various individual and collective combinations and permutations of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and apparatuses of the disclosure. Thus, if there are a variety of additional steps that can be performed it is understood that each of these additional steps can be performed with any specific aspect or combination of aspects of the methods of the disclosure.

It is understood that the apparatuses and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

An age verification system, method, and apparatus are provided in the present disclosure. The age verification system, method, and apparatus may be configured to provide automatic and accurate verification of a person's age that can be applied directly at the POS, POD prior to the sale of any of age-controlled products, such as alcohol, tobacco, vape, CBD, Cannabis, lottery tickets, and casinos (e.g., gambling), pharmaceuticals, spray paints, fireworks, video recordings, games, vending machines, and the like. The age verification system, method, and apparatus may be configured to provide automatic and accurate verification of a person's age to be applied for providing unattended access control to age restricted environments including but not limited to nightclubs, party venues, adult parties, cannabis dispensaries, vape stores, beer caves, cold storage alcohol areas, commercial walk in coolers, and the like.

With reference now to the drawings, and in particular FIG. 1A through FIG. 4 thereof, examples of the real-time system and methods of age verification and the principles and concepts thereof will be described.

The system and techniques disclosed herein can be described as a system is configured to perform advanced and automatic age verification. The age verification system (AVS), as disclosed herein, is particularly designed for ease of use and accuracy to automatically implement age-restricted access control and control of the sale and/or purchase of age-controlled products. For example, the AVS can be employed in POS/POD environments that sale age-controlled products such as alcohol, tobacco, vape, cannabis, cannabidiol (CBD), lottery, and the like to ensure that a user meets the minimum legal age requirements to be permitted purchase of the product. Also, the AVS can be employed in environments that have age-restricted areas such as casinos, movie theaters, bars, pharmacies and the like to ensure that a user meets the minimum legal age requirements to be permitted entry into the age-restricted area. In some embodiments, the AVS can be a stand-alone system that comes configured out of the box and can be implemented by a user with minimal technical knowledge (e.g., alleviating extensive staff training).

As a general description, operation of the AVS involves scanning visually represented data, (e.g., a unique barcode, a digital token, etc.) that is displayed, or otherwise embedded, in or on a state, federal or authority issued identification (IDs) presented by a patron, for instance a AAMVA PDF417 format barcode. For purposes of discussion, the exemplary embodiments are described herein with respect to scanning a barcode. However, it should be appreciated that the scanning capabilities of the AVS can be applied to other known forms of visually represented data, such as QR codes, digital tokens, and the like, as deemed appropriate. The AVS can then use data associated with the scanned ID to ascertain age determining information for the particular patron, which is analyzed to quickly return a response with respect to the sale of an age-controlled product to that patron. This information may be imbedded in the scanned information or may be accessed from a central server. For instance, the AVS can generate an audible (e.g., easy to hear) output and/or a visual (e.g., easy to read) output, such as displaying 'Sale/No Sale' on a display screen. The AVS can also generate a spoken result output for clear messaging for visually impaired store personal. The AVS' result output (in response to the scan) can indicate whether the patron meets the minimum legal age requirement for the purchase of the age-controlled product. By prominently displaying (or audibly outputting) an age verification result, the AVS can aide an employee at a POS/POD (e.g., cashier) in ensuring a legal sale, and thereby avoiding the undesirable consequences (e.g., fines, license revocations) for erroneous and/or illegal underage sales. In use, the AVS can be used in the sale of a variety of age-controlled products, including but not limited to tobacco, vape, alcohol, lottery, casino, cannabis, and the like.

In one embodiment of a present disclosure, a Minor Decliner advanced age verification technology ID scanner may be directly integrated with an ID document verification system—Kessing™ Documentchecker. The driver license may be scanned and the Minor Decliner system may check if the ID is expired or if the individual is underage. Then, the Kessing™ Documentchecker portal may automatically open to allow for checking of the security features of the scanned driver's license against a document library of authentic licenses. As the scanned driver license is compared against the library, all of the security features are notated and highlighted for a quick review. The driver license may be viewed under a UV light to compare the security features that are only visible under the UV illumination. Accordingly, a purchase transaction may be smoothly passed or failed based on the advanced verification check and may be recorded by a Minor Decliner's Age Verification Suit™ E™—AVCS™.

In one embodiment, the Minor Decliner's Age Verification system may build a transaction list to verify e-cigarettes (e.g., JUUL) device and POS counts and may check for RACS EAC. For any transaction with more than 1 e-cigarette device and/or 16 e-cigarette pods, the item may be automatically blocked from adding to the transaction list. After complete scanning for the transaction, the system may check the ID against the TruAge™ and then send approved and validated UPC/GTIN to the POS. As only items that have been validated are sent to the POS, so this implements an automated sale control of age-restricted items.

In one embodiment, the Minor Decliner's Age Verification system may be coupled with a passport scanner or may have an integrated passport scanner configured to scan passports and passport cards. The Minor Decliner's Age Verification system may, advantageously, simplify the analyses of passport documentation. The passports and passport cards from any country can be processed and validated for holder's age.

In one embodiment, an integrated chatbot bot configured for instant answers to questions and topics related to ID scanning, age verification, laws, age restricted purchase limits, NACS TruAge™, e-cigarettes (e.g., JUUL RACS EAC), etc. may be provided. The chat bot may implement a guided menu or/and natural language processing with AI machine learning component. The chatbot may have topics areas tailored to the business and for customer information.

Referring now to FIG. 1A, an example of the AVS 100 in an operational environment, such as a POS, is shown. In the illustrated example, the AVS 100 has a modular configuration where the system includes two physically separate components, including: 1) a scanner 110 (shown as handheld wireless 2D scanner); 2) and a computer unit 120 (shown as tablet computer). The scanner 110 can be implemented as a laser scanner, which can interpret the information provided in a barcode. A laser scanner uses a laser and a mirror to emit the beam that scans the information. The scanner 110 can have the ability to cover large physical footprint and wirelessly network scanned and aggregate data for a large facility. As shown in FIG. 1A, the scanner 110 has a generally small and handheld design, which can be leveraged for portable and instant feedback to the computer unit 120. The computer unit 120 can be implemented as a computer device having the processing capability to analyze and interpret the scanned data captured by the scanner 110. Thus, the scanner 110 and the computer unit 120 can have a two-way communication ability.

The AVS 100 also includes a component, namely an application 130 (shown as graphical user interface on computer unit 120). The application 130 can be programmed to customize the AVS 100 to perform age verification with respect to different age-controlled items. In some embodiments, the AVS 100 can be configured to respectively verify a patron's age with respect to the minimum age requirement of up to four or more different age-controlled items. As seen in FIG. 1A, a user, for instance a retailer, has configured the application 130 to perform age-verification for three selected age-controlled products. The AVS 100 can display a specific verification result for each item in corresponding windows 131-133 (supported by the graphical user interface (GUI) on the computer unit 120). Particularly in FIG. 1A, the application 130 is shown to output a window 131 displaying the age verification result for tobacco product (e.g., cigarettes), window 132 displaying the age verification result for an alcohol product (e.g., wine), and window 133 displaying the age verification result for a lottery product (e.g., lottery ticket). According to the embodiments, the application 130 can be implemented as a suite of advanced compliance features. Additionally, in some embodiments, there may be multiple scanners 110 (e.g., up to four) that can be used (e.g., serving as input) with the same computer unit 120.

In operation, the AVS 100 can be employed for automatic age verification in the realm of retail, for example within a convenience store such as 7-11™ where various age-controlled products are sold (e.g., vape, cigarettes, alcohol, and the like). The AVS 100 can be positioned close in proximity to a POS terminal, such as the cashier's counter. In some embodiments, the computer unit 120 of the AVS 100 can be installed at the cashier's counter, for instance, in an employee-facing position. Thus, an employee of the retailer, such as a cashier operating the POS terminal for purchases, can use the AVS 100 to scan an ID 140 that is presented by a patron (as required to be sold age-controlled items).

As an example, a patron can come to the POS terminal attempting to buy a vape pen, which as a tobacco product has a minimum age requirement of 21 years old for its sale. Thus, the patron is required to furnish an ID 140, such as a driver's license, to the cashier prior to completing this purchase. In some instances, a cashier may manually scan the ID (e.g., inspecting the ID using human vision). Manually scanning the information on an ID by a human can be a lengthy process (compared to computer analysis). For instance, if the cashier is not familiar with the particular form of ID that is presented by the patron (e.g., driver's license from another state) it may take a few seconds for the person to locate the appropriate information in the ID needed to determine the users age (e.g., date of birth). Also, a person may not be familiar with all of the appropriate indications of a valid ID and thus may not be able to distinguish between an authentic ID and a counterfeit ID. For example, a REAL ID issued by the state of California includes a bear and a star in the top right corner, but a cashier in North Carolina may not be aware of these indications. Even further, any manual process is susceptible to human error. In the case of age verification, a human, such as the cashier, may erroneously miscalculate the age of the patron, even from an accurate date of birth on a valid ID. If the cashier were to fail to accurately determine whether the patron meets the minimum age requirement for legally purchasing the age-controlled item, namely the vape pen, it may potentially lead to actions that ultimately impact the retailer (e.g., warning letters, fines, and loss of license).

However, by employing the AVS 100 before allowing the patron to purchase the vape pen, a result on whether the patron is "of age" to buy the age-controlled item can be accurately and quickly (e.g., less than a second) obtained for the cashier. The cashier can place the ID 140 within the optical range of the scanner 110 of the AVS 100. As seen, the ID 140 is oriented such that a laser emitted by the scanner 110 is aligned with a 1D (linear) barcode 141 that is printed on the ID. The scanner 110 can then "scan" the barcode 141, which enables the scanner 110 to interpret the optical representation of data conveyed by the barcode 141.

The information obtained from the scanned ID 140, as read by the scanner 110, can then be analyzed by the application 130 on the computer unit 120. In some embodiments, the application 130 determines at least a date of birth and a validity/authentication of the ID 140 based on the scanned data from ID 140. The date of birth obtained from the ID 140 can be used by the application 130 to calculate an age of the patron, and thereafter compared to a minimum age requirement corresponding to each selected age-restricted product that the AVS 100 is configured to check. Referring back to the example, the AVS 100 can calculate that the patron is 19 years old based on the date of birth read from the scanned ID 140. Accordingly, the application 130 generates an output conveying the age verification result for three different age-controlled items, specifically indicating whether the patron meets the minimum age requirement to purchase a tobacco product (e.g., 18 or older), an alcohol product (e.g., 21 or older), and a lottery product (e.g., 18 or older). In the example depicted in FIG. 1A, the AVS 100 determines that at 19 years of age, the patron is authorized (e.g., meets or exceeds the minimum age requirement) to buy tobacco and thus the application's 130 GUI displays a color-coded check in window 131 on a display screen of the computer unit 120 that can be easily viewed (and understood) by the cashier. Consequently, the cashier receives the verification that the patron is indeed old enough to legally purchase the vape pen and can complete the purchase at the POS terminal. Similarly, the application's 130 GUI generates a green (or any other color) check in window 133 indicating that the 19-year-old patron can legally purchase a lottery item. However, with respect to alcohol, where the legal age is 21 years old, the AVS 100 determines that the 19-year-old patron cannot legally purchase any alcohol products. Therefore, FIG. 1A shows that the application's 130 GUI generates a red "X" in window 132, that can be easily interpreted by a human as an indication that the patron is legally prohibited from purchasing any alcohol items. In some embodiments, the application 130 can be programmed to generate other forms of audible and/or visible outputs that indicate the results of the age verification, such as lights, colors, sounds, spoken/vocalized statements (e.g., for visually impaired, section 508 compliance), tactile outputs (e.g., vibrations), and other mechanisms that are deemed appropriate to be understood and/or interpreted by a human. The GUI implemented by the application 130 can be configured to provide other display/output features, such as: displaying happy birthday based on the scanned date of birth; suppressing personal information displayed on screen; displaying a custom messaging on a failure. The AVS 100 can also implement variable roll off ID data for privacy protection.

In addition, the AVS 100 can implement multiple compliance features, such as logs and reports. The AVS 100 may be configured to: maintain scan logs that are traceable to a date, and time, and sales associate corresponding to a particular purchase; control the scan information collected to comply with local, state, or federal laws; and tie each sale of each age-controlled item to a purchaser's age; check the validity of the ID (e.g., expired ID date or counterfeit ID); and print logged transactions (e.g., shift reports). Moreover, as a compliance feature, any outputs display by the AVS 100 in response to a failed age-verification (e.g., purchaser determined to not meet a legal age requirement) must be prominently visible, for instance an extremely large and bold 'NO SALE' message may be displayed on the screen of the computer unit 120 of the AVS 100. In some embodiments, the AVS 100 includes a manual entry capability and auto prompting that can be employed when scanned id is invalid (e.g., printed barcode may be damaged). Furthermore, in some embodiments, the AVS 100 can utilize Artificial Intelligence (AI) and Machine Learning (ML) technology to enhance the valid/authentic ID detection (e.g., via behavioral and ID based information). Added features that may be implemented by the AVS 100 include on board trouble shooting and scan dialogistic settings, and error log capture for later scan diagnosis to help mitigate malfunctioning and/or overall failure of the system.

The AVS 100 can be a stand-alone system which does not require connectivity to a communications network (e.g., Internet) or updates (e.g., cloud-based downloads). The AVS 100 can be configured to accurately recognize various IDs that are deemed valid and/or authentic for different counties, states, countries, and territories when scanned by scanner 110. As an example, the AVS 100 can scan a barcode using scanner 110 to properly identify authentic and/or valid driver's licenses, REAL ID, passports, and birth certificates that have been issued by countries such as the United States (US) and Canada. The application 130 also allows for simple configuration (and re-configuration) of the AVS' 100 functionalities, so that updates/adaptations can be made to the system to account for differences in state-to-state scanning laws, and any changes to minimum legal age laws. Additionally, the AVS 100 can also support various optional features such as remote management (requires Internet connectivity), advertising modules, and elements branded for the end user (e.g., retailer logo displayed on computer unit 120. Also, the AVS 100 can be fully compliant with Texas SB21 for Texas Grandfathering of 18-year old's (as of Aug. 31, 2019). Moreover, it should be appreciated that above operational environment is not intended to be limiting, and the AVS 100 is not limited to being in proximity to the POS terminal, and can be placed at other locations throughout a location, such as a retail store (e.g., integrated AVS configurations). Also, in some embodiments, the application 130 can be provided as a subscription service that can be purchased by the retailer (or owner). Also, the application 130; the scanner 130; and the computer unit 120 can be configured to be used with different platforms (e.g., Android, SDK, web application, etc.).

Although FIG. 1A is described as an example of a convenience store, it should be appreciated by one skilled in the art that simple, fast, and accurate age-verification capabilities of the AVS 100 can be employed to assist prevents underage sales of age-controlled products (e.g., vape, tobacco, alcohol, military tobacco, CBD) in various different environments such as, but not limited to: vape stores, dispensaries, restaurants, bars and the like. Additionally, the AVS 100 is not restricted to use at brick-and-mortar retail, and can be integrated into other avenues of commerce, such as on-line sales, e-commerce, and business-to-business (B2B) sales. The sale of such age-restricted products is ubiquitous, being an estimated 1 million locations in the US that sell age-restricted items. Industry data shows that that the illegal sale of age-controlled products is not a rare occurrence (e.g., underage sales occur 15% to 20% of the time), and thus the AVS 100 can be useful as an accurate and automated preventative measure in retail and entertainment. There is a basis for commercial success as the present disclosure provides solutions to long-felt yet unsolved needs. The AVS 100 provides accuracy and ease of use where conventional approaches have failed to produce repeatable, efficient, reliable results.

Furthermore, the AVS 100 ID provides compliance auditing features, for instance providing an audit trial, to ensure usage. As an additional preventative measure, the AVS 100 may also be configured to enforce custom frequency management, which limits the number of times the same customer can scan their ID during a certain time period (e.g., day/shift).

Figure 1B:
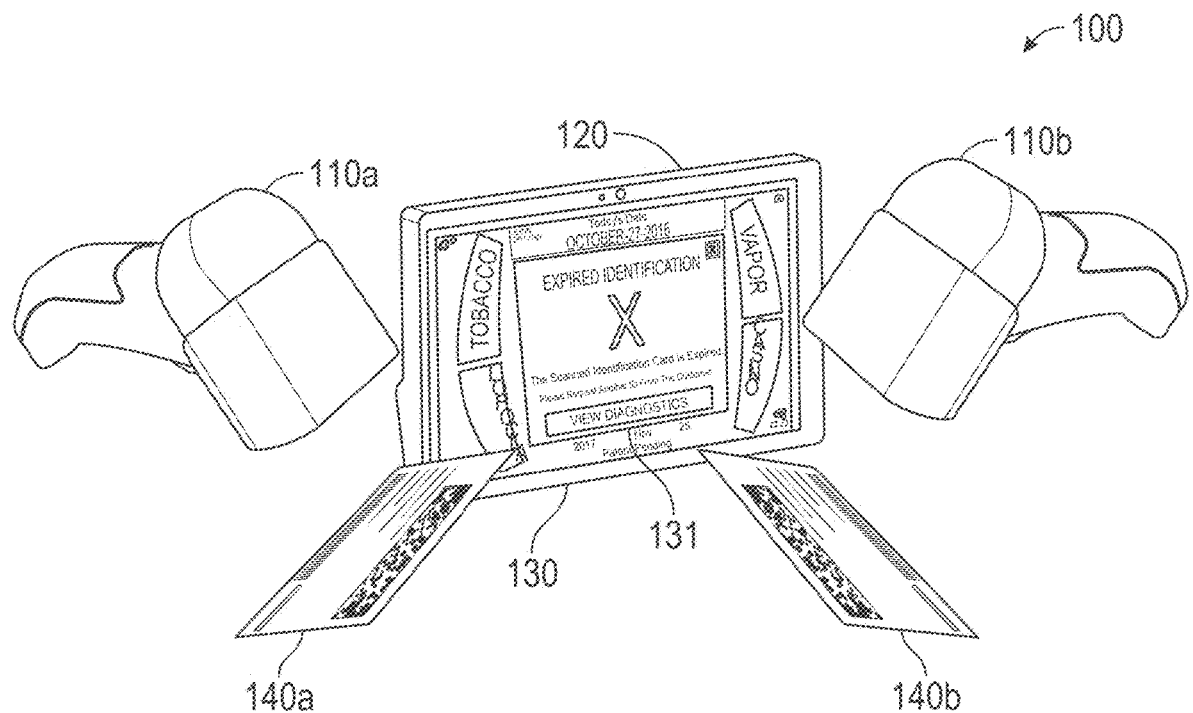
FIG. 1B illustrates an example of the AVS performing valid identification ID detection, according to one or more embodiments shown and described herein. Multiple scanner input from different POS stations integrated to a central computer and display is illustrated here.

In FIG. 1B, another example of an AVS 100 operating in the valid/authentic ID detection function is shown. As described in detail above, the AVS 100 can perform automatic age verification. For instance, the AVS 100 can analyze the age of a patron (based scanning a driver's license or other ID scan), and then generate a visual, audible, and electronic signals to view, alert, and control age-restricted entry and/or sale of age-controlled items. Another feature of the AVS 100 is particularly detecting whether the scanned ID 140 is a valid (e.g., not counterfeit (AAMVA barcode correct), not expired), as shown in FIG. 1B. In this example, the computer unit 120 can receive scanned input from two scanners 110a, 110b. As seen, each of the scanners 110a, 110b is scanning a respective ID card 140a, 140b having a corresponding barcode printed thereon. The scanned data, obtained by each of the scanners 110a, 110b, can be further analyzed by the computer unit 120 to determine a validity of the ID card 140a, 140b being presented. FIG. 1B illustrates that in the case where at least one of the ID cards 140a, 140b is detected to be invalid, the GUI of the application 130 can output a window 131 that displays the indication that one of the scanned ID cards 140a, 140b has expired, and thus is invalid (e.g., should not be used for age-verification). The example shows that window 131 displaying the message "identification expired" on the screen of the computer unit 120 along with a prominently displayed red 'X," which can be easily viewed and interpreted by a user. In some cases, when the AVS 100 does detect that an invalid ID has been scanned, the patron may be allowed to use another form of ID that can be scanned by the AVS 100 for age-verification. Otherwise, the patron may be prohibited from purchasing an age-controlled product and/or entering an age-restricted area (e.g., similar to determining that the patron is underage) if a scanned ID is detected to be invalid, as illustrated in FIG. 1B.

According to one embodiment, the AVS 100 has multiple different configurations to optimally customize the device for a specific operational environment. The various configurations for the AVS 100 can include: 1) a modular AVS configuration (shown in FIG. 1A); an integrated AVS configuration (shown in FIG. 2C); and a portable (e.g., handheld) AVS configuration (shown in FIG. 2D & FIG. 2E). Each of the aforementioned AVS configurations can be comprised of different configuration options for the scanner 110, and different configuration options for the computer unit 120 in a manner that allows the system to be adjusted for a specific feature. For instance, the integrated AVS (shown in FIG. 2C) can be configured with the integrated scanner option so as to provide greater portability and compactness. As an alternative, the modular AVS (shown in FIG. 1A) can be configured with the wired scanner option which limits the overall portability of the system but mitigates the requirement of a dedicated power source for the system. The various configurations for the AVS, scanner, and computer unit will be described in greater detailed below. According to the disclosed embodiments, the AVS 100 can have at least three distinct configuration options for the scanner 110 that include: 1) a wired scanner configuration (shown in FIG. 2A) that is principally for use with the modular AVS configuration; 2) a wireless scanner configuration (shown in FIG. 1A & FIG. 2B) that is principally for use with the modular AVS configuration; and 3) and an integrated scanner configuration (shown in FIG. 2C, FIG. 2D, and FIG. 2E) that is designed for use with the integrated AVS configuration and the portable AVS configuration.

Also, according to the disclosed embodiments, the AVS 100 can have at least two distinct configuration options for the computer unit 120 that include: 1) a wired computer unit (not shown); and 2) a wireless computer unit (shown in FIG. 1A, FIG. 2D, and FIG. 2E).

Figure 2A:
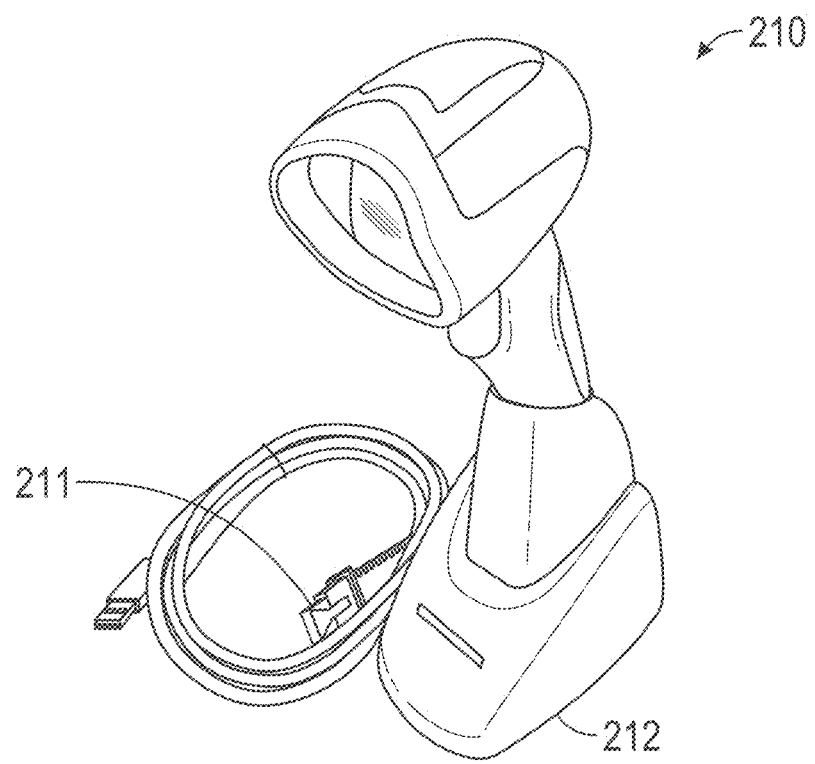
FIG. 2A depicts an example of a wired scanner that can be used in a modularly configured AVS shown in FIG. 1A, in accordance with an embodiment of the present disclosure. Other input methods as camera and photographs are included as input methods to determinate age.

In FIG. 2A, an example of a scanner 210 having a wired configuration is shown (hereinafter referred to as a wired scanner). According to the disclosed embodiments, the wired scanner 210 can be used as a component in the modular AVS configuration (shown in FIG. 1A). As shown in FIG. 2A, the wired scanner 210 includes a wire 211 for physical (and communication) connectivity to additional components of the AVS system, such as a computer unit (e.g., table). In the example, the wire 211 is implemented as a Universal Serial Bus (USB) cable. The USB cable has ends that can be inserted into a USB port (at the compute unit), which then establishes a connection to the wired scanner 210. Further, the wired scanner 210 includes an Autosense Base 212. The Autosense Base 212 enables automatic scanning functionality for the scanner 210. For example, when an ID card, such as a driver's license in positioned underneath the lens of the scanner 210, the Autosense Base 212 automatically can function as a motion/presence sensor, sensing the presence of the ID card. In response to the Autosense Base 212 sensing the ID card is present, it can automatically trigger the scanning function of the scanner 210 (e.g., emitting the laser). In addition, the wired scanner 210 does not require its own power source. For example, the wire 211 can also supply electric power from the connected device (e.g., tablet) across the wire to power the wired scanner 210. In some embodiments, the wired scanner 210 (and the other scanners shown in FIGS. 2B-2F) can be implemented as an image reader, which enables the wired scanner 210 to read 2D barcodes and/or Quick Response (QR) codes. In some embodiments, the scanner 210 can vibrate, providing a tactile alert in response to an underage scan.

Figure 2B:
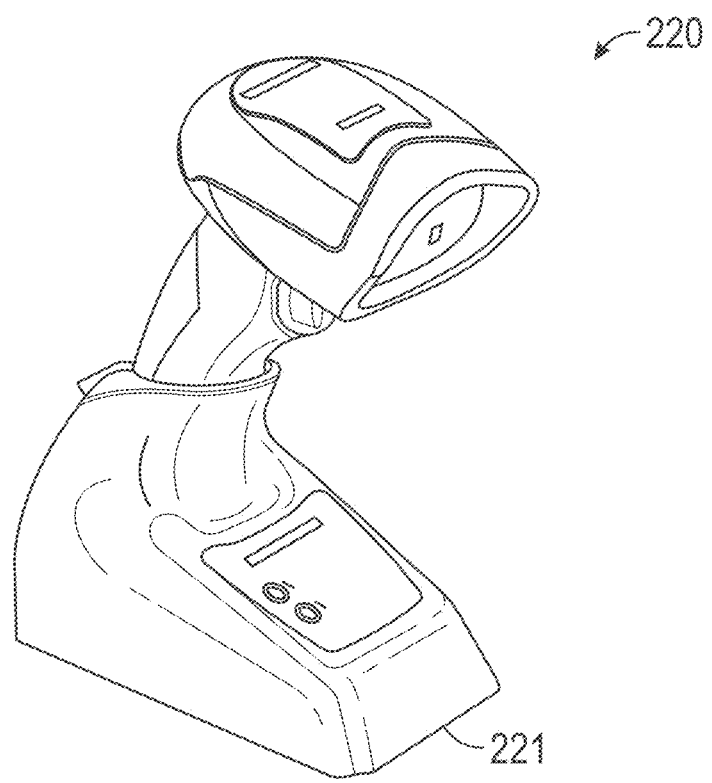
FIG. 2B depicts an example of a wireless scanner that can be used in a modularly configured AVS shown in FIG. 1A, in accordance with an embodiment of the present disclosure.

Referring now to FIG. 2B, an example of a scanner 220 having a wireless configuration is shown (referred to as wireless scanner). According to the embodiments, the wired scanner 210 can be used as a component in the modular AVS configuration (shown in FIG. 1A). In FIG. 2B, the wireless scanner 220 is shown to include a base 221. The wireless scanner 220 can be cradled by the base 221, and in turn the base 221 can be wire connected to the computer unit (tablet) of the AVS. The base 221 can include its own power supply, and can be plugged into a power outlet, for instance. The wireless scanner 220 can also be removed from its base 221. In this configuration, the wireless scanner 220 can be mobile (e.g., not attached/removed from the base 221). Thus, a user has freedom of movement when using the AVS. For instance, a user can have the wireless scanner 220 in hand, and walk over to a patron that may be further away in line, in order to scan their ID. Furthermore, the wireless scanner 220 has the ability to be charged when it is placed in its base 221. To further support mobility, the wireless scanner 220 can still be used at a distance away from the base, for instance 10 meters or more.

Figure 2F:
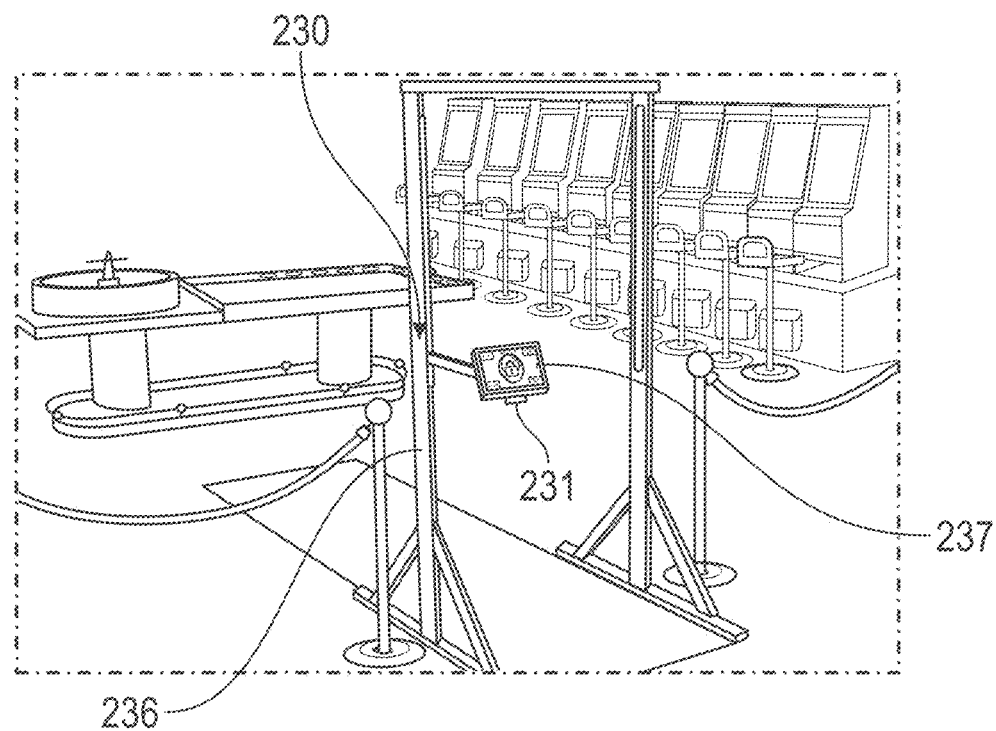
FIG. 2F depicts another example of the integrated AVS particularly configured for deployment at an entryway of an age-restricted area, in accordance with an embodiment of the present disclosure.
Figures 2G, 2H:
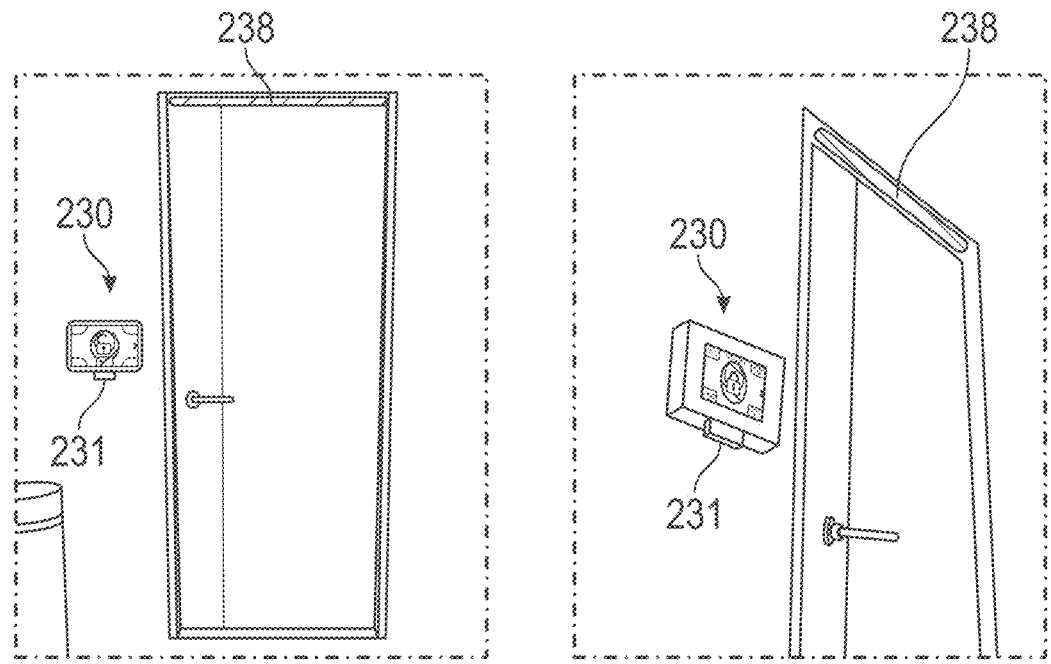
FIG. 2G depicts another example of the integrated AVS particularly configured for deployment at door of an age-restricted area and implementing door lock control, visual display of door lock unlock status from a far field distance (10 ft plus) in accordance with an embodiment of the present disclosure.
FIG. 2H depicts another example of the integrated AVS particularly configured for deployment at door of an age-restricted area and implementing door lock control, visual display of door lock unlock status from a far field distance (10 ft plus) as shown in FIG. 2G, in accordance with an embodiment of the present disclosure.
Figures 2I, 2J:
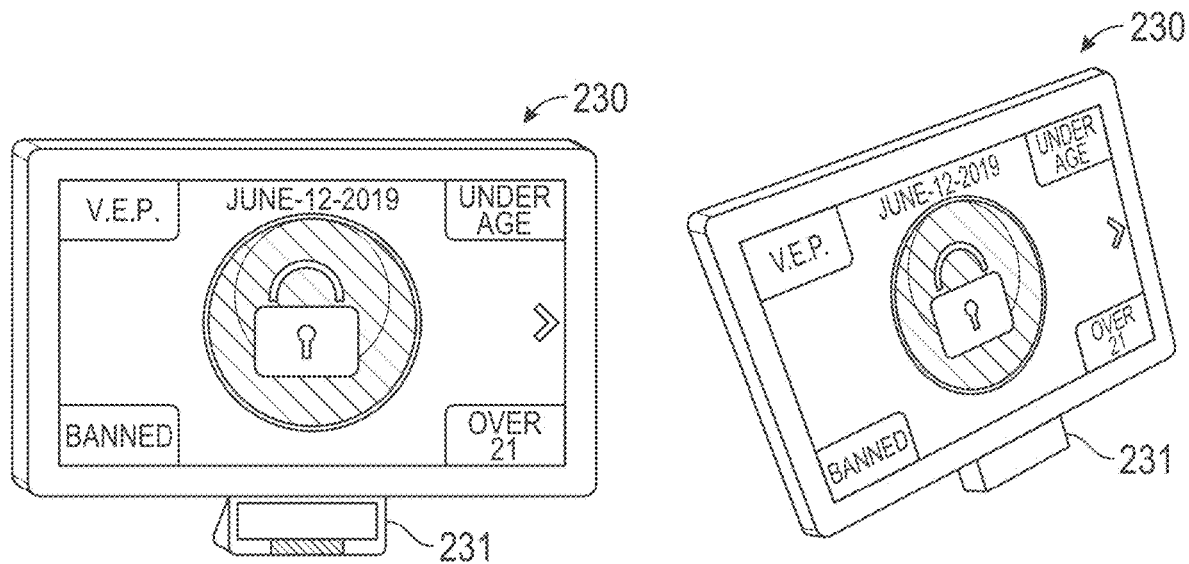
FIG. 2I depicts an example of a display of the integrated AVS implementing door lock control as shown in FIG. 2G, in accordance with an embodiment of the present disclosure.
FIG. 2J depicts another example of the display of the integrated AVS as shown in FIG. 2J implementing door lock control, in accordance with an embodiment of the present disclosure.
Figure 2K:
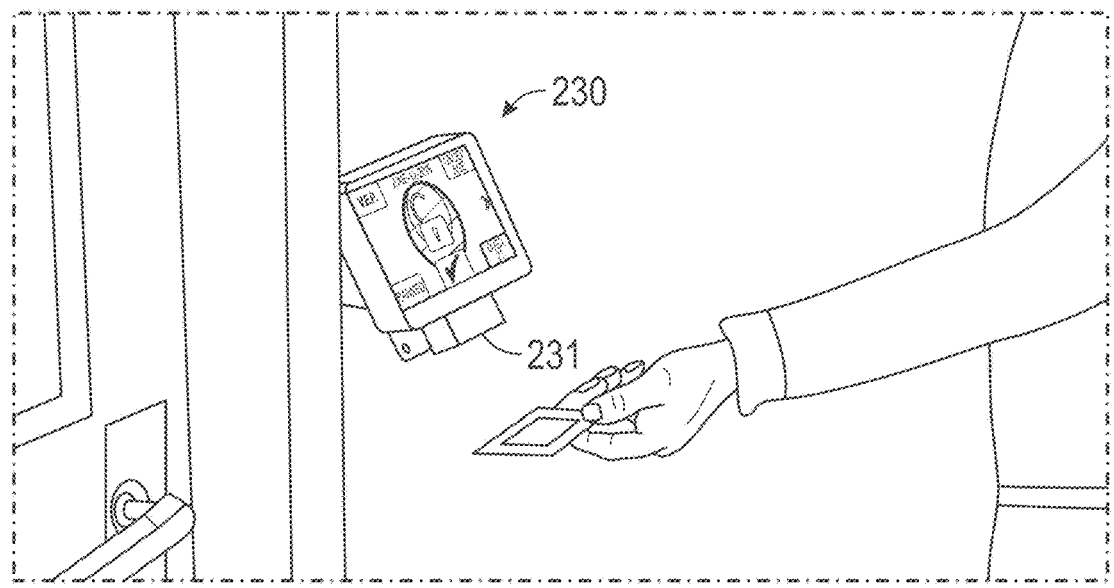
FIG. 2K depicts another example of the integrated AVS particularly configured for deployment at door of an age-restricted area and implementing door lock control, in accordance with an embodiment of the present disclosure.
Figure 2L:
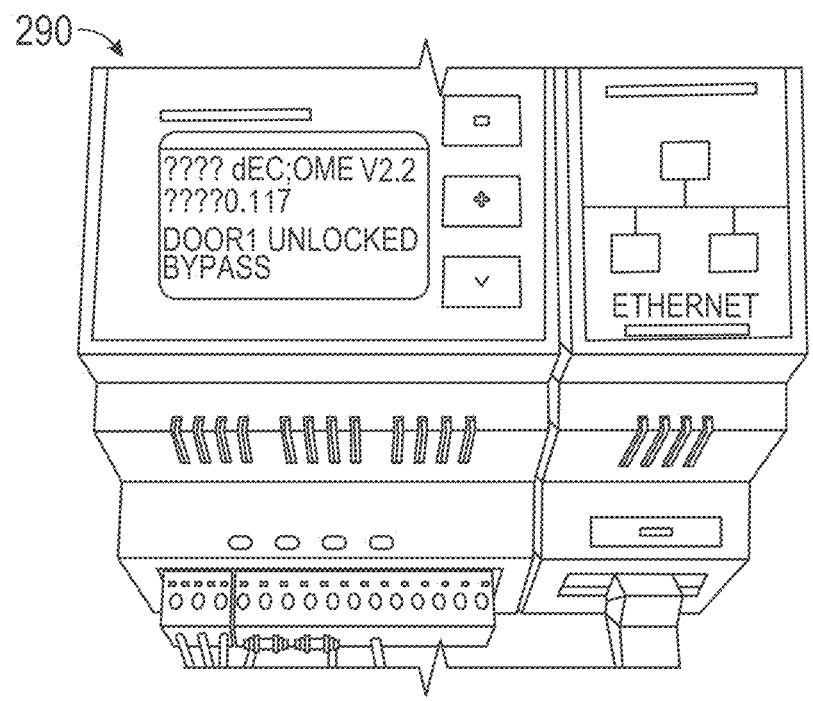
FIG. 2L depicts an example of an Ethernet lock control module employed with the AVS for implementing door lock control, management of input and outputs, light bar control, overall system status and faults display, power status display, communication status display in accordance with an embodiment of the present disclosure.

In FIG. 2C, an example of the AVS 230 in an integrated configuration (hereinafter referred to as the integrated AVS) is depicted. Generally, the integrated AVS 230 consists of the computer unit 235 being designed to include an integrated scanner 231. By having the computer unit 235 and the scanner 231 integrated together, the integrated AVS 230 is structured as a monolithically assembled device, as opposed to the separate elements in the modular AVS configuration (shown in FIG. 1A). As seen, the integrated AVS 230 can have the computer unit 235 implemented as a tablet computer (e.g., 7 inches or 10 inches). Particularly, in this example, the integrated AVS 230 has some portability (e.g., combined unit increases ease of moving), but is substantively configured for use in a more stationary environment, such as tabletop use. Accordingly, the computer unit 235 of the integrated AVS 230 includes a base, integrated stand 236. The integrated stand 236 allows the integrated AVS 230 to be stably placed on (e.g., fixedly mounted) a surface, such as a counter, desk or a wall, where the device can remain during use. The integrated AVS 230 can have a flexible design, by employing different mounting options to support its stable (e.g., stationary) features. Moreover, the integrated AVS 230 provides for a flexibility of deployment, due to the various mounting options and the device's portability. For example, the integrated AVS 230 can be deployed (or installed) for use at a plethora of different locations, such as, but not limited to: doors; POS terminals; desks; counters; walk-thru scanners; and the like. The mounting options can include but are not limited to: table stand mounts; floor stand mounts; articulating arm mounts; and wall mounts. FIG. 2N prominently shows an example of a wall flex mount 236 that can be used as a mounting option, for installing the integrated AVS 230 on a wall or other vertical surface. The wall flex mount 236 can also support swivel or radial movement, such that the can integrated AVS 230 can be arranged in a desired orientation.

Figure 2M:
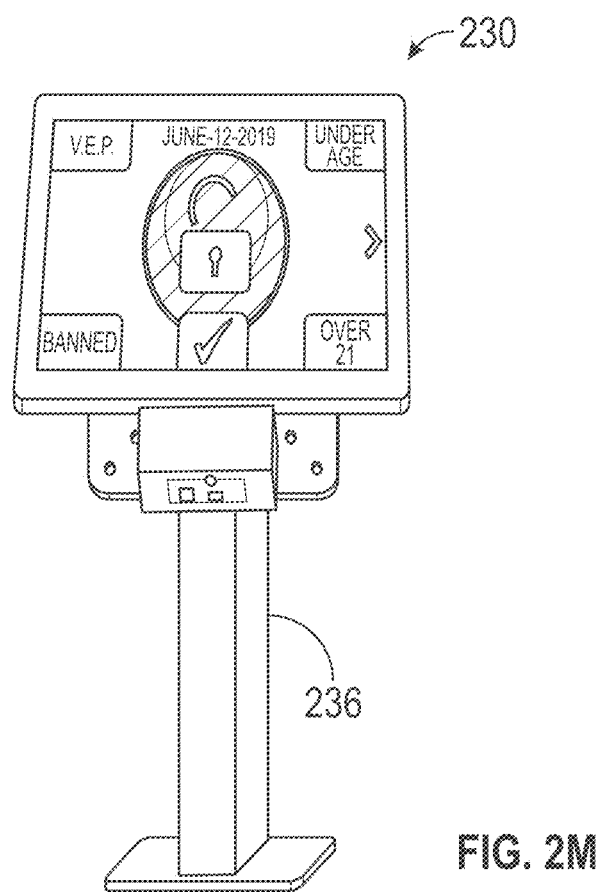
FIG. 2M depicts another example of an integrated AVS also having an integrated stand, in accordance with an embodiment of the present disclosure. This embodiment also allows for social distance scanning and self-scanning removing any store personal to a safe distance from a potential customer.
Figure 2N:
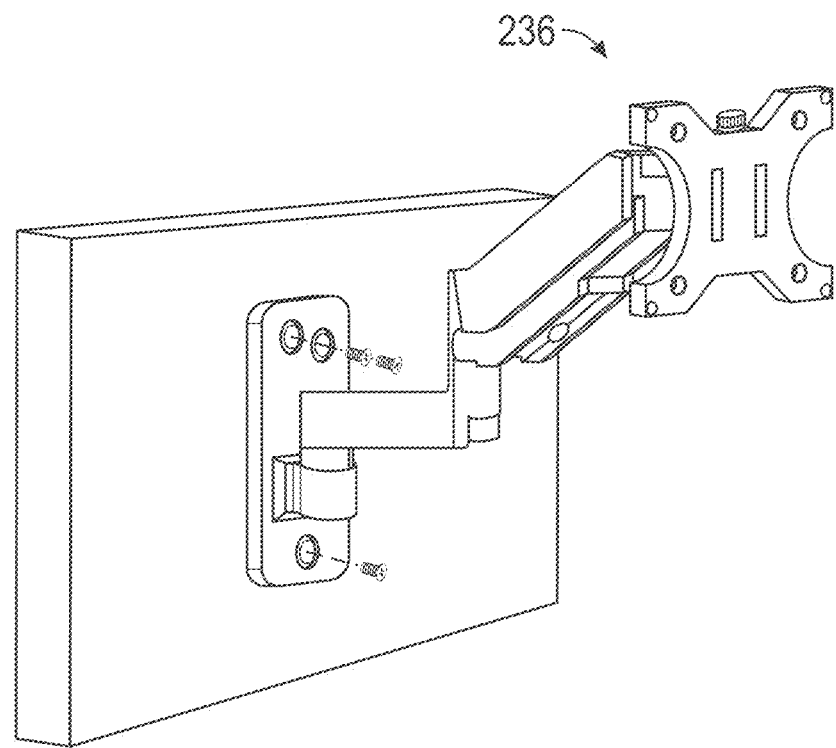
FIG. 2N depicts an example of a wall flex mount that can be employed to install the integrated AVS, in accordance with an embodiment of the present disclosure.

FIG. 2M illustrates an example of the integrated AVS 230 where the integrated stand 236 is an implemented as an elongated stand. This configuration shown in FIG. 2M may be appropriate for placing the integrated AVS 230 on a floor, or other low horizontal surface, as opposed to a counter, a table or a higher surface.

In some embodiments, the computer unit 235 requires connection to a power source, such as a standard 120v power outlet. In some configurations, the integrated AVS 230 can include a security enclosure. For example, once the integrated AVS 230 is installed in its position for use, such as a cashier counter of a POS, the security enclosure can protect the system from being removed from its installed position (e.g., table top) or tampered with by unauthorized users.

In FIG. 2F, another example of the integrated AVS 230, where the integrated AVS 230 is particularly shown operating according to the age-restricted access control features. In the illustrated example, the integrated AVS 230 includes a mounting arm 237 that is used to attach the integrated AVS 230 to a light bar display 237. Commonly, walk-thru scanners are used at entryways of various venues, in order to prevent patrons from entering with dangerous or lawfully prohibited items (e.g., weapons). Similarly, the integrated AVS 230 can be designed to aid in preventing patrons that are lawfully prohibiting an age-controlled area, such as a casino, from entering. Thus, it may be desirable to place the integrated AVS 230 at an entry-way checkpoint, and further leverage the portability of the integrated AVS 230 design. For example, as a patron approaches an entryway to the age-restricted area, an employee, such as a security office, can scan the patron's ID card using the scanner 231 of the integrated AVS 230. The security officer can then read the output result displayed on the screen of the integrated AVS 230, which can be a prominent green check to indicate that the patron is "of age" (e.g., 18 years or older) and the light bar display 237 can generate a bright green light indicating that the patron is "of age" and thus allowed to enter the casino floor. Alternatively, if the integrated AVS 230 determines that the patron is under 18, and thus does not meet the minimum age requirement for entering a casino, the output result displayed on the screen of the integrated AVS 230 can be a prominent red "X" to indicate that the patron is underage, and the light bar display 237 can generate a bright red light indicating that the patron is underage and thus prohibited from entering the casino floor.

Figure 2O:
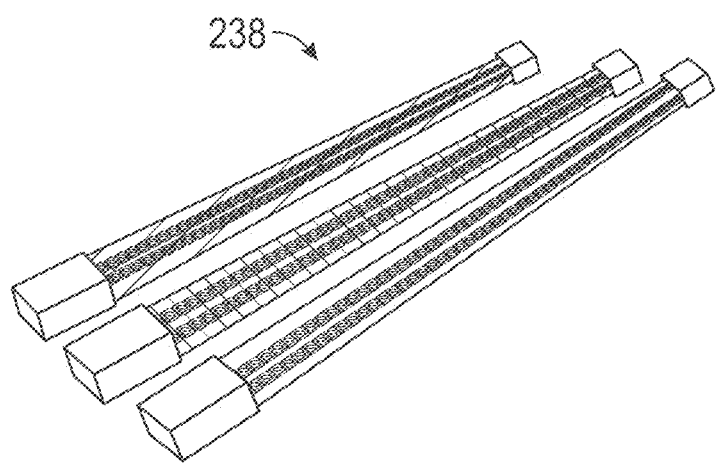
FIG. 2O depicts examples of a light bars that can be employed with the integrated AVS to implement age-restricted access control and/or notification, in accordance with an embodiment of the present disclosure.

FIG. 2G and FIG. 2H illustrate another example of the integrated AVS 230 operating according to the age-restricted access control features. As shown in FIG. 2G and FIG. 2H, the integrated AVS 230 is mounted proximate to a door and can control a light bar 238 as an additional output device indicating the results of the age verification. FIG. 2O prominently shows examples of the light bars 238 that are employed in the configuration of FIG. 2G and FIG. 2H. Light bar 238 can illuminate a certain color of light, as controlled by the AVS. As seen in FIG. 2G, the light bar 238 can illuminate a green light if the patron is successfully determined to be "of age" after scanning their ID card under the scanner 231 of the integrated AVS 230. In contrast, as seen in FIG. 2H, the light bar 238 can illuminate a red light if the patron is determined to be underage by the integrated AVS 230. Accordingly, the integrated AVS 230 can act as an access control at the door, which is an entrance to an age-restricted area. By implementing the light bar 238, the integrated AVS 230 can provide an automated and easily interpreted output for age-verification. For example, staff that are positioned at the door entry, which as is commonly the case at bars, casinos, and the like, can quickly and easily understand that a green light generated by the light bar 238 indicates that the patron is "of age" and allowed entry into the age-restricted area, while a red light generated by the light bar 238 indicates that the patron is underage and should be denied entry into the age-restricted area. Performing age-verification in a speedy and accurate manner is important in many real-world scenarios with age-restricted areas, where checking IDs for each person in an extremely long lines for entry may be a stressful and burdensome task for staff. FIG. 2K similarly shows another example of the integrated AVS 230 operating according to the age-restricted access control features. However, in FIG. 2K, the integrated AVS 230 is mounted as a stand-alone device (e.g., no light bar) proximate to a door. Accordingly, the age verification result can be displayed directly on the screen of the integrated AVS 230.

In some embodiments, the integrated AVS 230 performing age-restricted access control as shown in FIG. 2G and FIG. 2H (e.g., at a door) also has a door lock control functionality. As an example, when the integrated AVS 230 has scanned an ID and subsequently determines that the patron attempting to enter the age-restricted area is underage, the integrated AVS 230 can further generate a door lock control output signal which triggers the door to be automatically locked, preventing entry for the underage patron. The integrated AVS 230 can also display an indication on its screen that the door is locked, in response to the door lock control. FIG. 2I and FIG. 2J prominently illustrate an example of the tablet screen of the integrated AVS 230 displaying an output in accordance to the door lock control features. In FIG. 2I and FIG. 2J, the integrated AVS 230 is displaying a large image of a "lock", serving as an indication that the patron attempting to enter the age-restricted is not of legal for entry, as detected by the integrated AVS 230. As a result, the integrated AVS 230 can display the alert that the door lock control of the integrated AVS 230 has automatically locked the door to preventing them from opening the door to the entrance. Alternatively, however, when the integrated AVS 230 has scanned an ID and subsequently determines that the patron is "of age" and can legally enter the age-restricted area, the integrated AVS 230 can generate a door lock control output signal which triggers the door automatically unlock, allowing entry for that patron. In some embodiments, the door lock control is implemented by an Ethernet-based lock control module. For example, the integrated AVS 230 can communicate with an Ethernet-based lock control module which effectuates the electro-mechanical automatic lock/unlock mechanisms for the door. FIG. 2L depicts an example of the Ethernet-based lock control module 290 that can be used in concert with the integrated AVS 230 in order to perform the door lock control functionality of the system.

Now referring to FIG. 2D and FIG. 2E, examples of the AVS 240 in another integrated configuration, which is more compact and portable (as compared to the integrated AVS shown in FIG. 2C) is depicted. The portable AVS 240 includes substantively the same components as the integrated AVS described above in reference to FIG. 2C. Thus, for purposes of brevity, the same components are not described again in reference to FIG. 2D and FIG. 2E. As illustrated by FIG. 2D, the portable AVS 240 has significantly smaller dimensions (shown next to a quarter for size reference) than other configurations disclosed herein, to be more optimally designed for handheld use. For example, in FIG. 2E, the portable AVS 240, having such a compact design can be extremely portable (e.g., not requiring a stand, or wire), having a structure that is small enough for the entire AVS 240 to completely fit in the hand of the user.

Figure 2P:
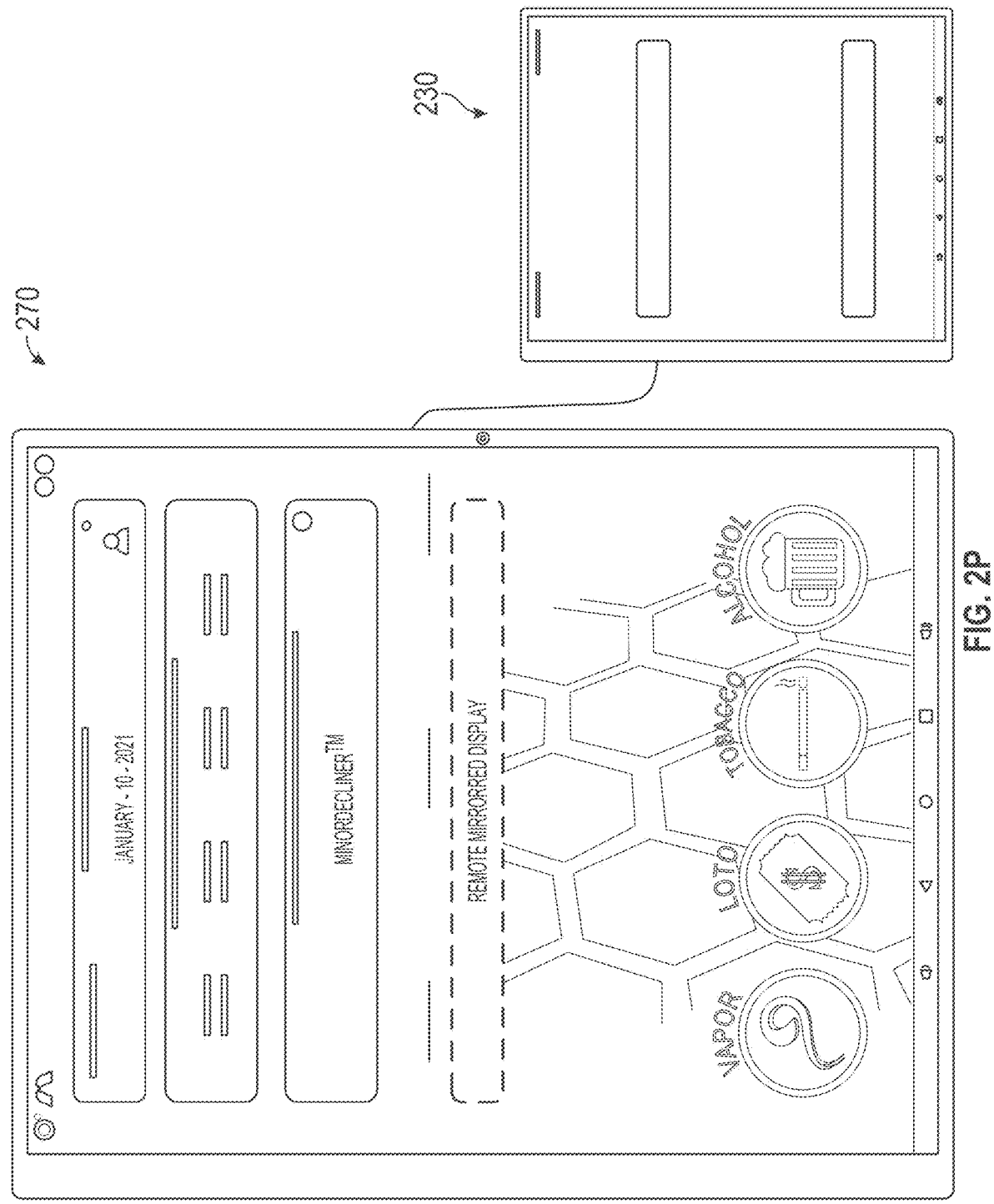
FIG. 2P depicts an example of the integrated AVS connected to a mirrored remote display, in accordance with an embodiment of the present disclosure.

Referring now to FIG. 2P, an example of an integrated AVS 230 functioning in accordance with a mirrored remote display feature is shown. In FIG. 2P, the integrated AVS 230 is shown to be connected to a mirror displayed 290, for example via a High-Definition Multimedia Interface (HDMI) cable. Due to the connection, the mirrored display 290 (which is shown as an external display that is substantially larger screen than the screen of the tablet computer) can "mirror" or duplicate the display of the integrated AVS 230. FIG. 2P illustrates that the mirrored remote display feature enables the same picture is to be simultaneously displayed on both the screen of the integrated AVS 230 and on the mirror displayed 290.

In some embodiments, the integrated AVS can be integrated into an alcohol dispensing system, such as the tap handle of a beer dispenser. This configuration for the AVS may be useful in self-serv operating environments (e.g., vending machine) where the patron may have direct access to the device that is dispensing the age-controlled product. Referring back to the beer dispenser example, a customer may scan their ID using the AVS installed at the tap handle. In response to the AVS verifying that the customer is "of-age" to purchase alcohol, the tap may be enabled so that the customer can then pour themselves a cup of beer.

Figure 3A:
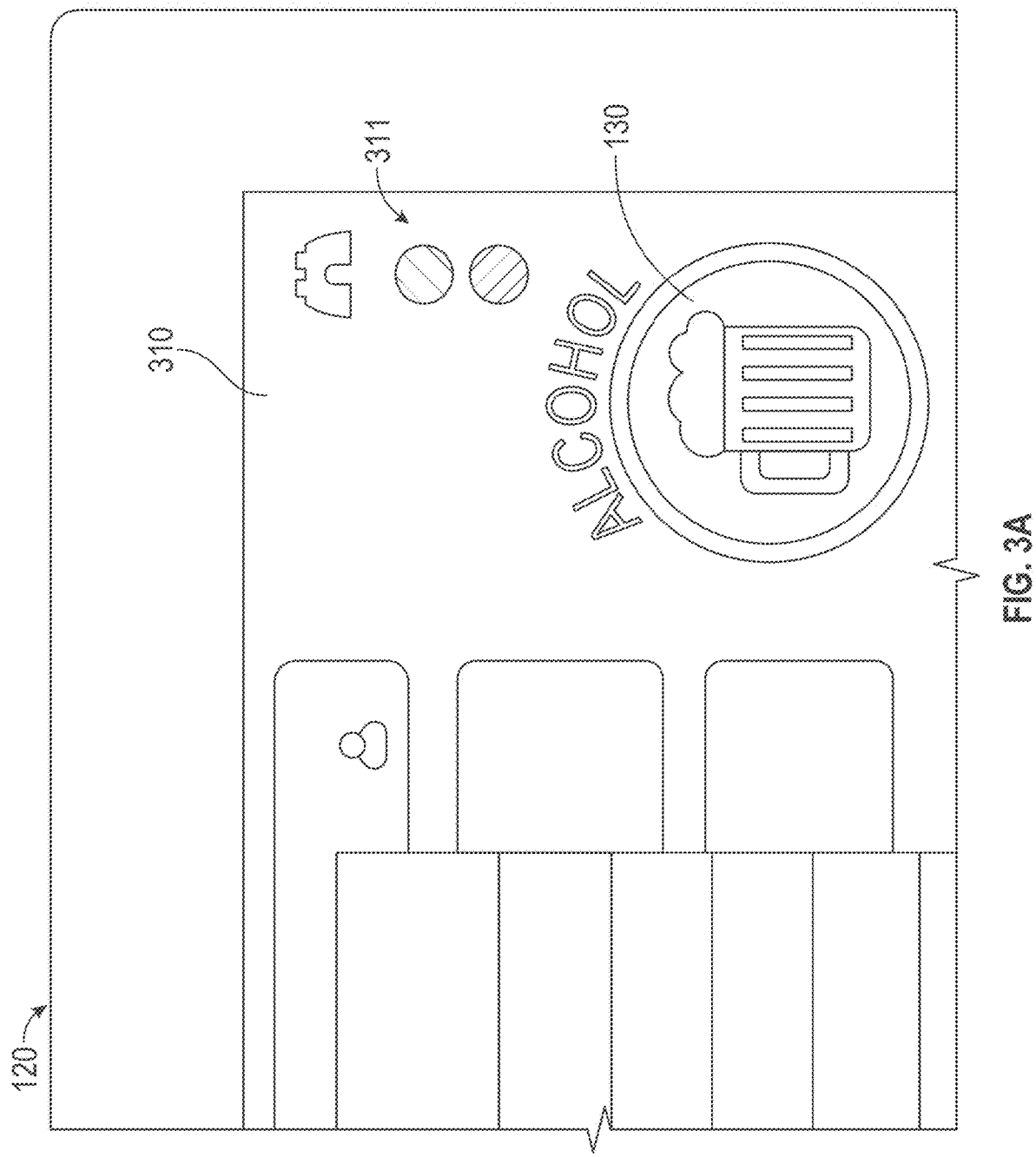
FIG. 3A depicts an example of an interface displaying a system status that may be implemented by the application aspects of the AVS system, in accordance with an embodiment of the present disclosure.

In FIG. 3A an example of an interface 310 displaying a system status 311 is shown. According to the embodiments, the system status 311 can indicate various statuses that are critical to the operation of the AVS. For example, the system status 311 can be a visual indicator, such as green light, that is displayed on the computer unit 120 (e.g., tablet computer) indicating that the system has an available and/or operating connection to a network, such as Internet, which may be necessary for the AVS to perform its key age verification features. As an alternative, if the AVS was not operating properly, for instance the system the connection to a network, such as Internet, is off-line and/or not operating, the system status 311 may be red light that is displayed on the computer unit 120 (e.g., tablet computer). The system status 311 can be supported by the application 130, as a part of the GUI on computer unit 120.

Figure 3B:
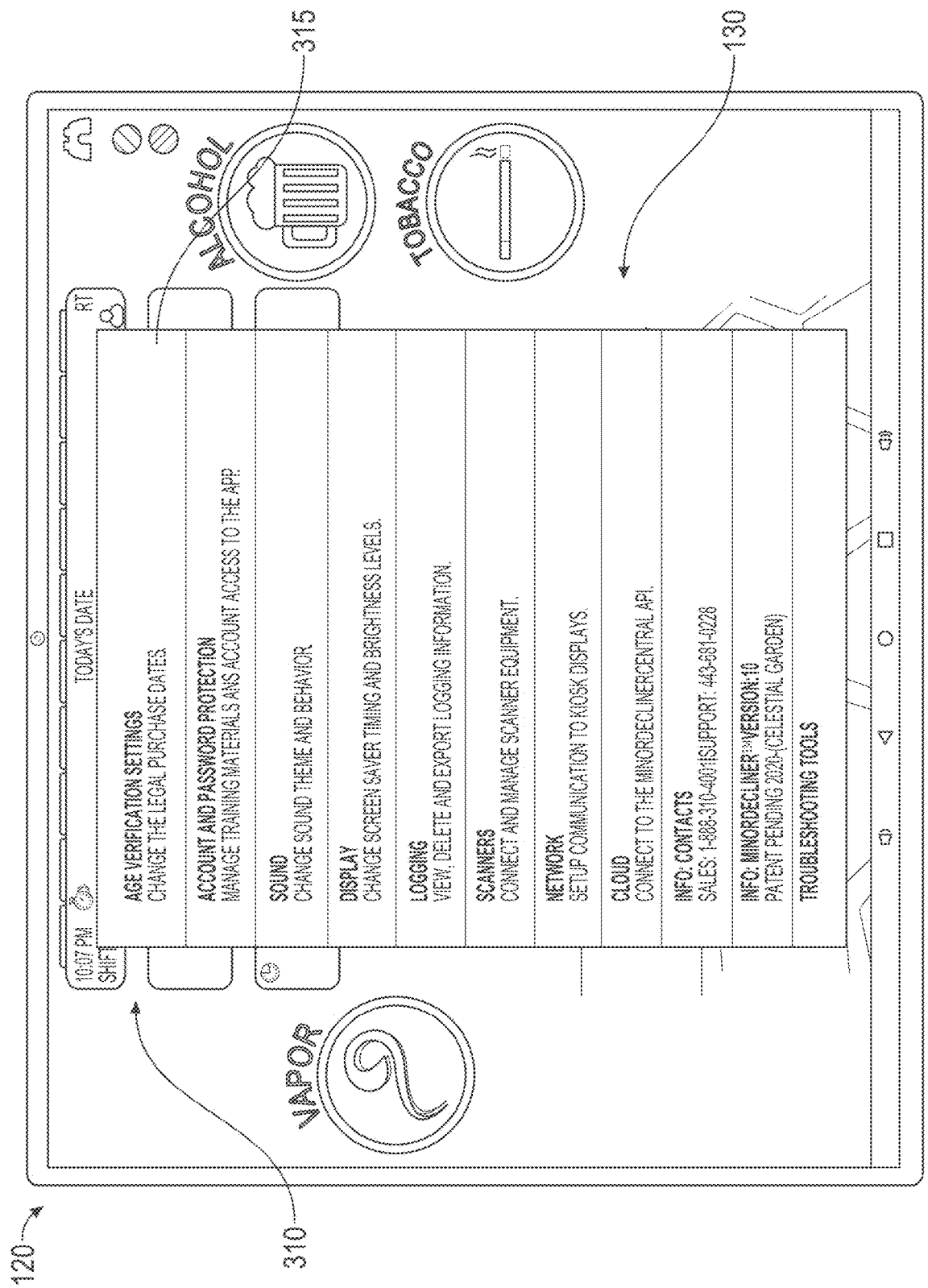
FIG. 3B depicts an example of an interface displaying configuration menus that may be implemented by the application aspects of the AVS system, in accordance with an embodiment of the present disclosure.

FIG. 3B depicts an example of an interface 310 displaying configuration menus 315. The configuration menus 315 can be user accessible, allowing the user to adjust various settings for the AVS. In the illustrated example, the configuration menus 315 includes options such as, but not limited to: age verification settings (change the legal purchase dates); accounts and password protection (manage training materials and account access to the app); sound (change the sound theme and behavior); etc. Accordingly, a user can access the configuration menus 315 to adjust operation and/or change settings for the various features of the AVS. The configuration menus 315 can be supported by the application 130, as a part of the GUI on computer unit 120.

Figure 3C:
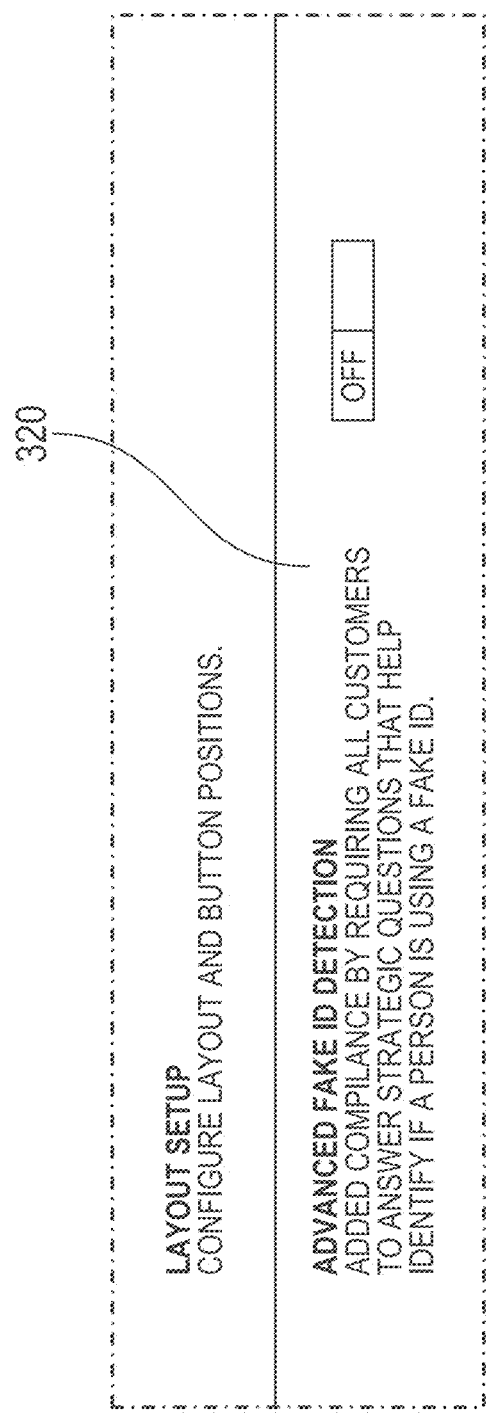
FIG. 3C depicts an example of an interface displaying an advanced fake identification (ID) detection feature that may be implemented by the application aspects of the AVS system, in accordance with embodiment of the present disclosure.

FIG. 3C depicts an example of an interface 310 displaying an advanced fake identification (ID) detection feature 320.

Figure 3D:
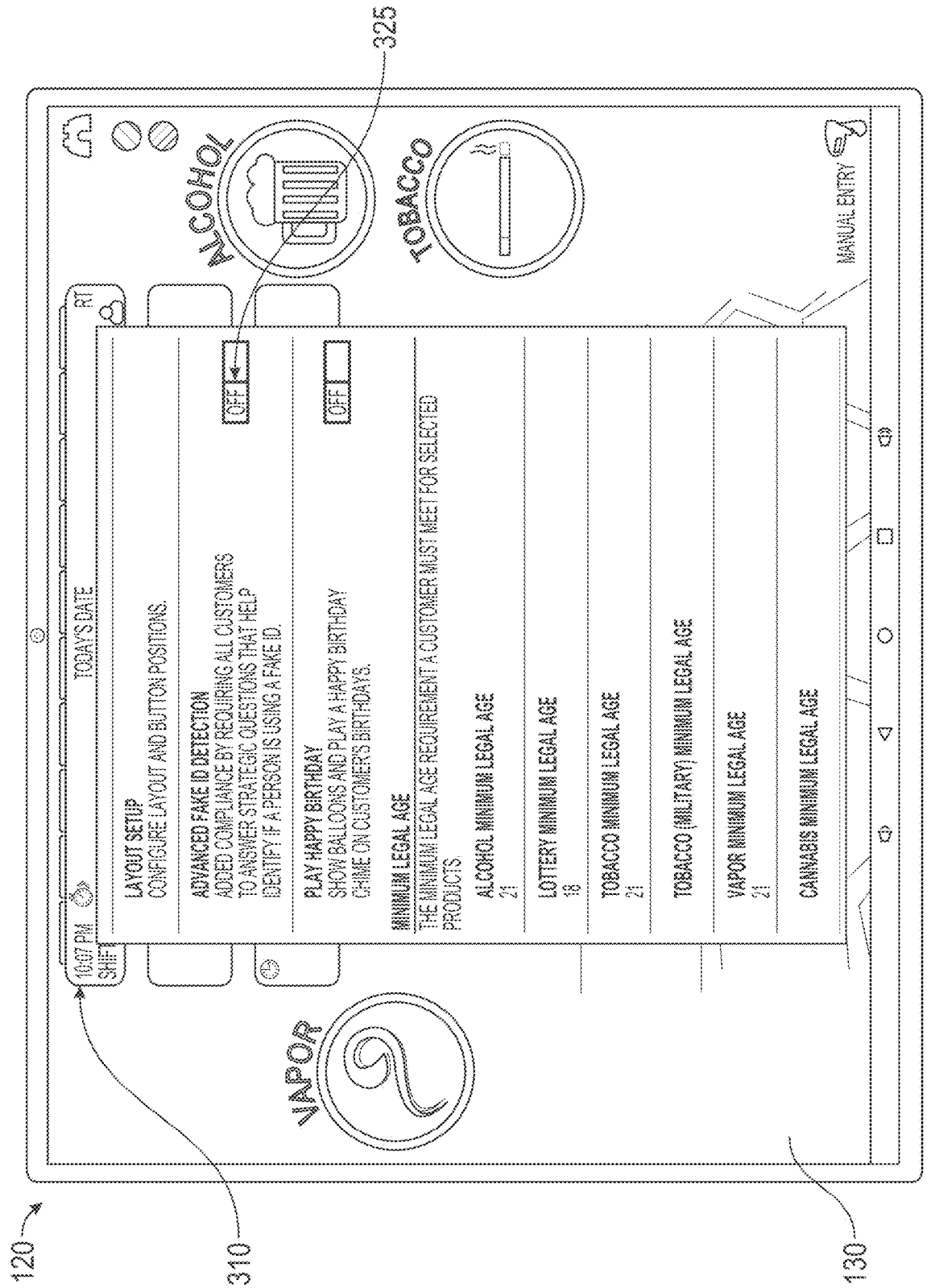
FIG. 3D depicts an example of an interface displaying an "on/off" selection for the advanced fake ID detection feature that may be implemented by the application aspects of the AVS system, in accordance with an embodiment of the present disclosure.

According to the embodiments, the advanced fake ID detection feature 320 includes presenting a series of intelligent questions that can be used to consider the behavior and/or characteristics of the patron (in addition to scanning the ID itself) in order to ultimately determine the validity of the ID. The advanced fake ID detection feature 320 adds a level of protection for fake IDs by requiring customers to answer strategic questions to determine that can be indicative of whether the user has a real or unauthentic ID. In the example, the interface 310 shows a setting which allows the user to turn this advanced fake ID detection feature 320 "on" or "off" as an active feature of the AVS. FIG. 3D also depicts an example of the interface 310 displaying an "on/off" selection 325 for the advanced fake ID detection feature.

Figure 3E:
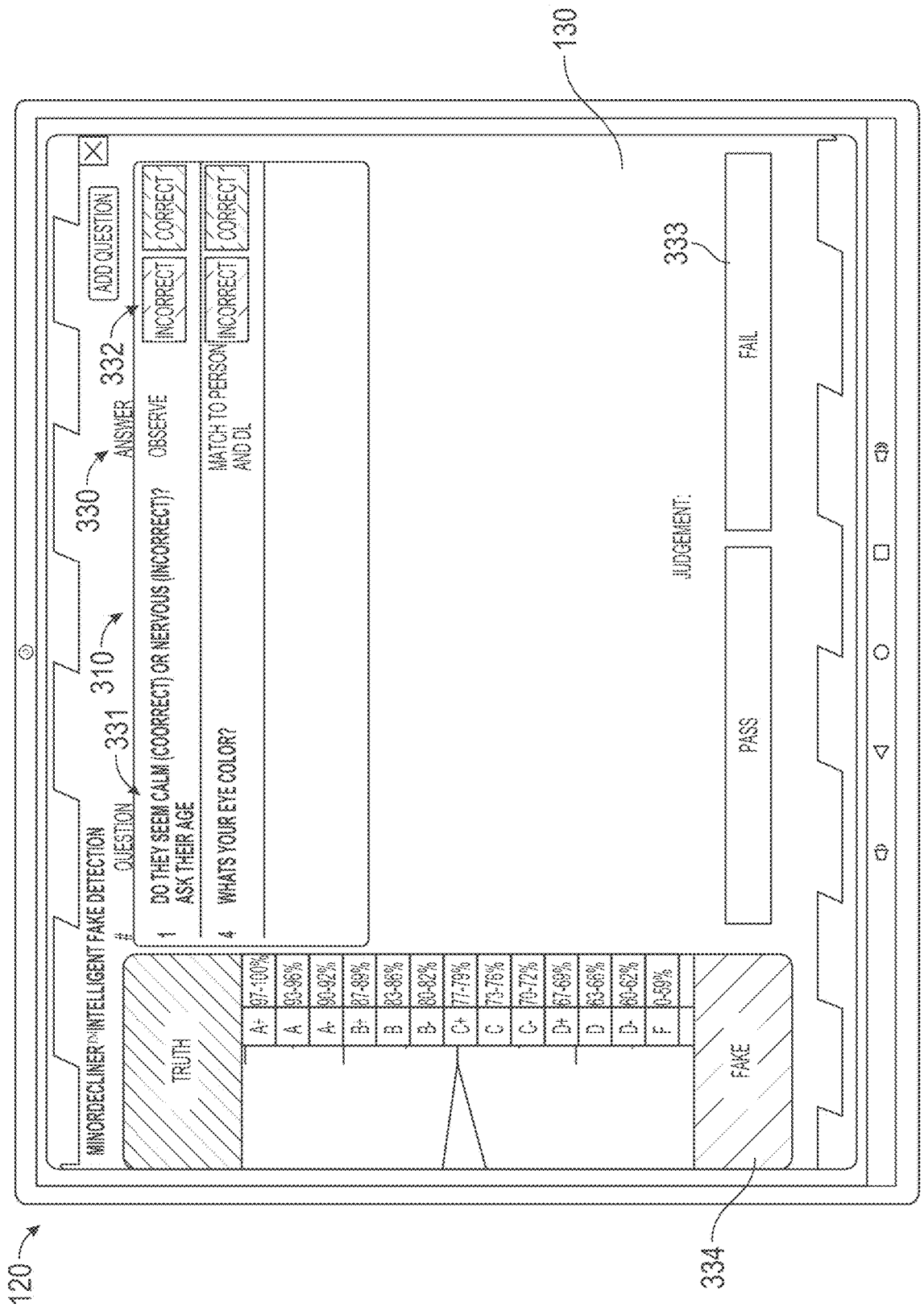
FIG. 3E depicts an example of an interface displaying default questions for the advanced fake ID detection feature that may be implemented by the application aspects of the AVS system, in accordance with an embodiment of the present disclosure.

Another aspect of the advanced fake ID detection feature is shown in FIG. 3E. FIG. 3E illustrates an example of an interface 310 displaying two default questions 331 for implementing the advanced fake ID detection feature. In the illustrated example, the default questions 331 include two questions that are displayed on the computer unit 120, which an employee (e.g., cashier, security) can ask a patron that has presented an ID in an attempt to access an age-restricted area or purchase an age-controlled product. The default questions 331 shown in FIG. 3F include: 1) "Do they seem calm (Correct) or Nervous (Incorrect)? Ask Their Age"; and 2) "What's your eye color?" The interface 310 also displays answer inputs 332 corresponding to each question, that can be selected by the employee, for example, indicating the patron's behavior in response to the default questions 331. The answer inputs 332 are shown to have two options "correct" or "incorrect". As an example, the employee can ask a patron their age from the default questions 331. In response, the employee can observe the patron's behavior while the default questions 331 are asked, and select "incorrect" from the answer inputs 332 to suggest that the patron may be attempting to falsify their age, for example, if the patron appears to be nervous (e.g., jittery movement, no eye contact) from being asked the question. These answer inputs 332 are entered into the AVS, which can be analyzed as considerations when determining a validity of the ID. FIG. 3E also shows that interface 310 can also display a truth meter 334. The truth meter 334 is shown as a sliding scale, which measures whether the patron's behavior indicates more truth (e.g., up the scale) or more fake (e.g., down the scale), based on the answer inputs 332 that are received in response to the default questions 331. The interface 310 also includes a judgement input 333, The judgment inputs 333 are shown to have two options "pass" or "fail". The judgement input 333 allows the user, such as an employee, to select whether the patron ultimately has passed or failed the advanced fake ID detection based on the reading of the truth meter 334. For example, if the truth meter 334 indicates that the patron's answers suggest that the ID is fake in accordance with the scale, then the employee may select "fail" from the judgment inputs 333, entering in the AVS that the patron's behavior is suspicious and the ID has a higher potential of being fake and/or invalid.

Figure 3F:
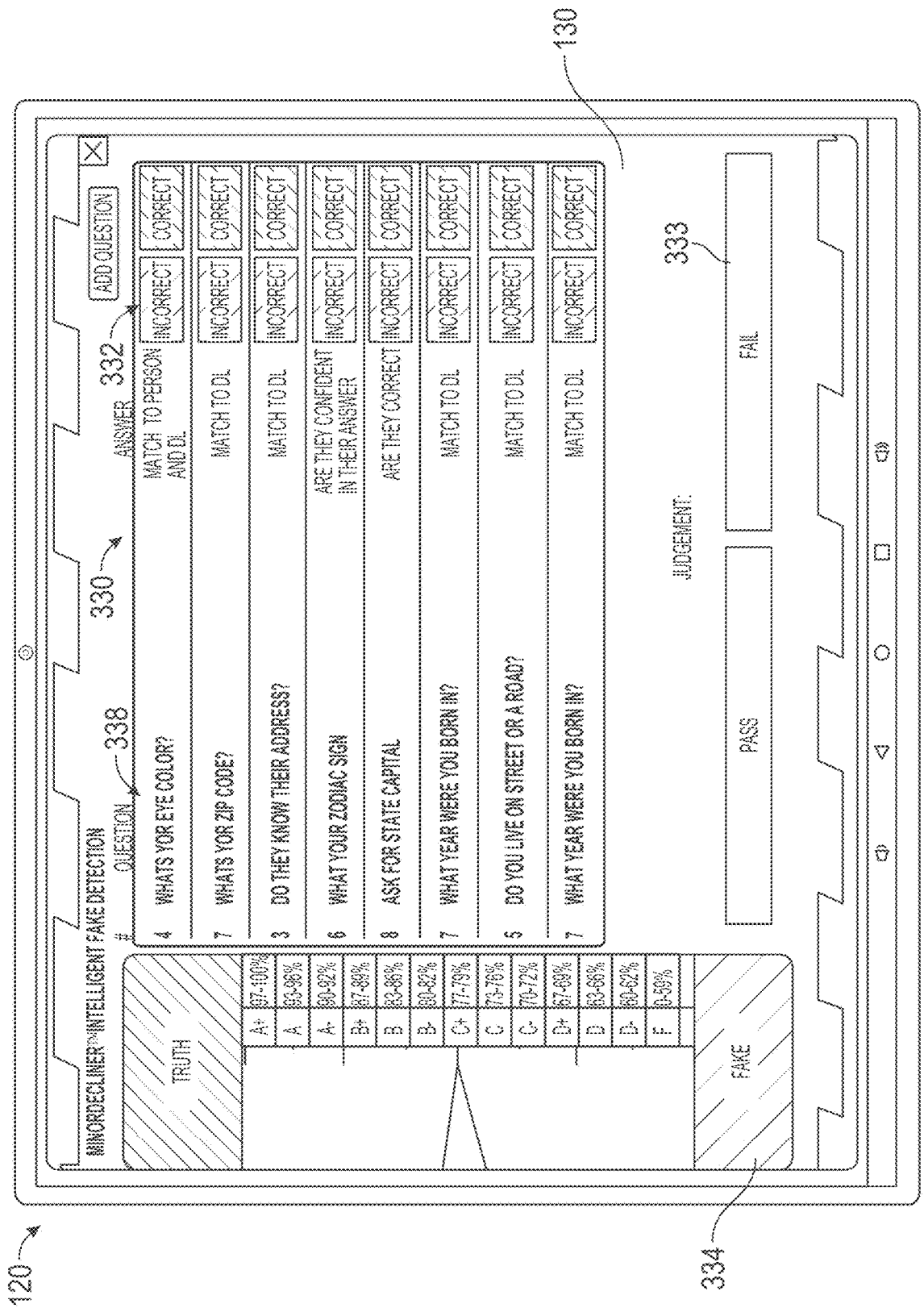
FIG. 3F depicts an example of an interface displaying configurable questions for the advanced fake ID detection feature that may be implemented by the application aspects of the AVS system, in accordance with an embodiment of the present disclosure.

FIG. 3F depicts another example of the interface 310 displaying the ability to add additional user configurable questions 338 for the advanced fake ID detection feature. FIG. 3F also illustrated that the answer inputs 332, indicating the results of those questions 338, can be selected individually (e.g., each of the questions 338 can have an answer input, one-by-one) or have the answers selected as a group and/or overall.

FIG. 3G depicts another example of the interface 310 displaying the functionality of the truth meter 334 for the advanced fake ID detection feature. The example illustrates that the truth meter 334 can move (e.g., needle sliding up and/or down the scale) based on the answer inputs 332 that are entered. For instance, if the number of answer inputs 332 that are being selected as "incorrect" by the user increases with each question 331 being asked, then the truth meter 334 may move incrementally down the scale towards "fake" for each answer input 332 that is submitted as "incorrect." In FIG. 3G, the truth meter 334 reads that the patron currently has been assigned a score of C (in a range of 70-72%) by the advanced fake ID detection feature.

Figure 3H:
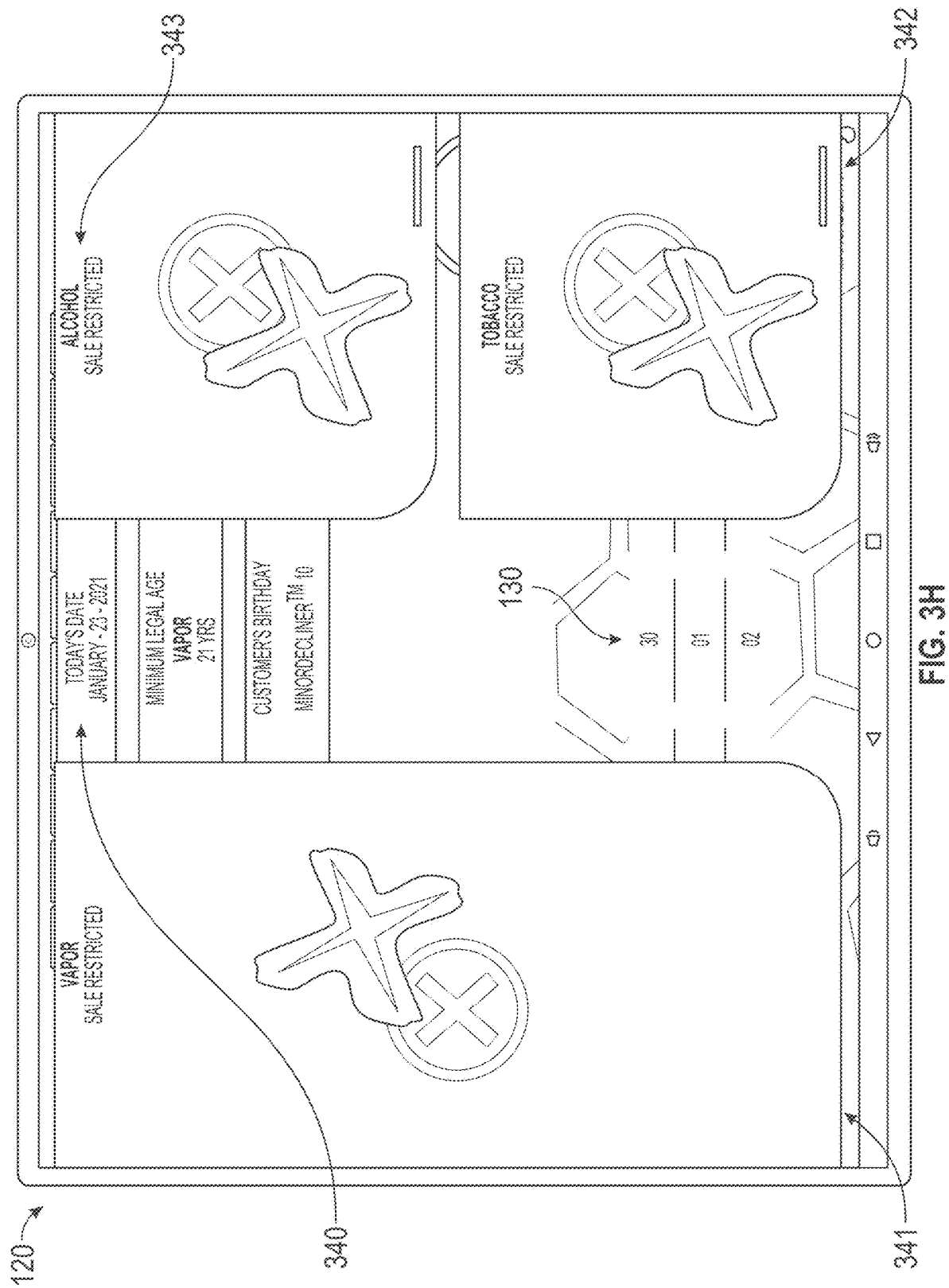
FIG. 3H depicts an example of an interface displaying an age verification result related to purchase of age-restricted products in response to the advanced fake ID detection feature, in accordance with an embodiment of the present disclosure.

FIG. 3H depicts an example of an interface 340 that displays the age verification results related to purchasing age-restricted products (e.g., vapor, alcohol, tobacco). According to the embodiments, these age verification results can be generated in response to the advanced fake ID detection feature shown in FIGS. 3A-3F. For example, if the ID is determined to be fake, that suggests the patron is under-aged and attempting to use a fake ID in order to defraud the employee and illegally purchase an age-controlled product. Thus, each of the windows for vapor 341, tobacco 342, and alcohol 343 are displaying a red "X" indicating that the patron has been restricted from purchasing these products, since the ID that was presented has been detected as fake ID by the AVS.

According to some embodiments, results generated by the advanced fake ID detection feature (or other ID validity and/or verification features) can be stored as records in a compliance log. For example, the result of each fake ID check can be stored as part of a compliance log in a manner that serves as proof that IDs are being checked for validity (in addition to age verification) by users, such as employees, in order to meet compliance requirement. In some cases, IDs must be checked on a 100% basis in order to be compliant. Thus, logging the ID validity and/or verification results can be a beneficial feature, provide electronically verifiable proof of each fake ID check.

Figure 4:
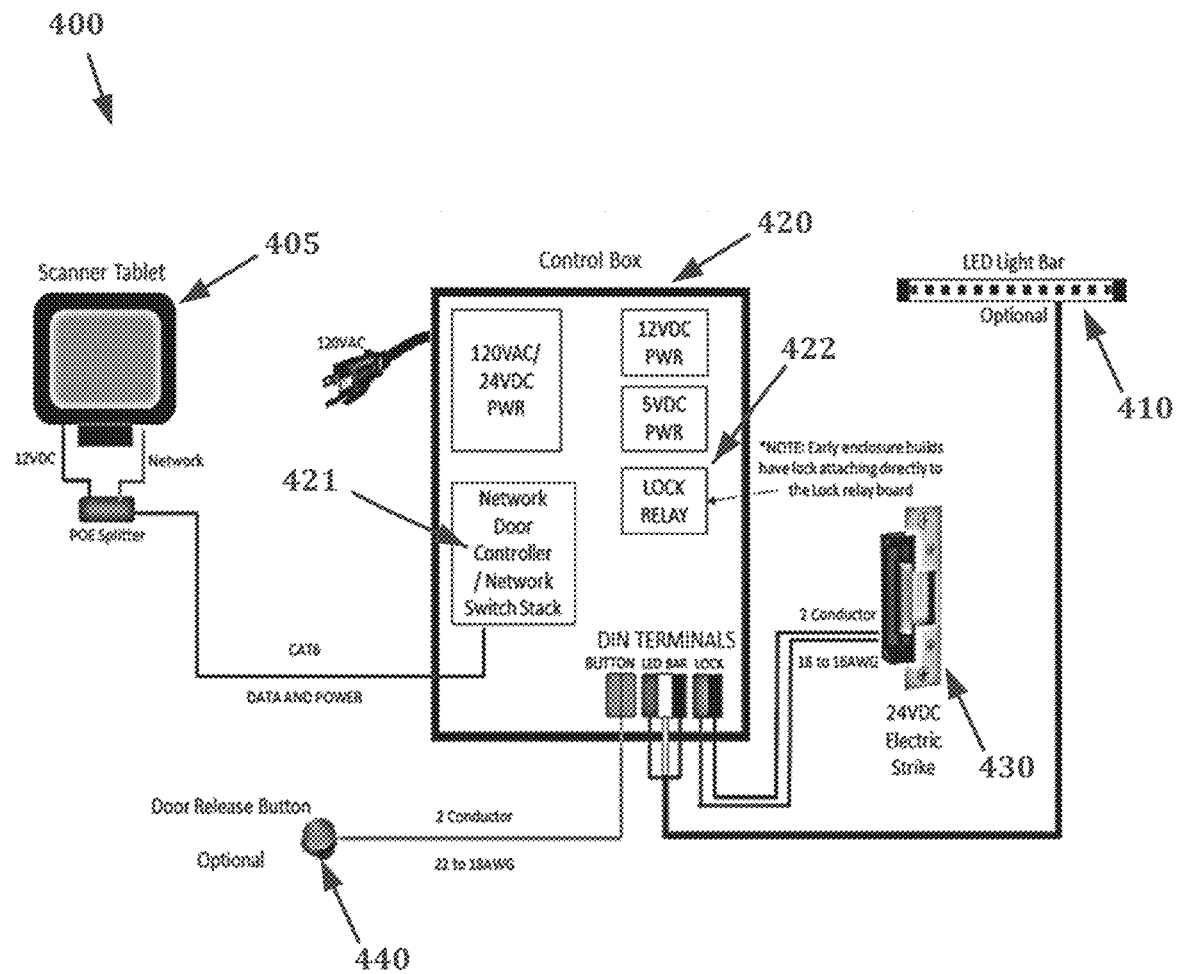
FIG. 4 is a diagram of a system implementing the AVS with age-restricted access control and automatic door lock features, in accordance with an embodiment of the present disclosure.

Referring now to FIG. 4, a diagram of a system 400 implementing an AVS with age-restricted access control and automatic door lock features is shown. In FIG. 4, the system 400 includes three principal elements: 1) integrated AVS 405; control box 420; and door lock 430. As an example, the integrated AVS 405 may be wall mounted proximate to a door, which serves as an entrance to an age-restricted area. That door can include an electro-mechanically controlled lock 430, which can be electrically controlled by the system 400. As seen, the integrated AVS 420 is connected (e.g., power connection and data connection) to the control box 420, and the control box 420 is in turn connected to the lock 430, a LED light bar 410, and a door release button 440 (via DIN terminals). Additionally, the control box includes at least a network door controller 421 and a lock relay 422. Thus, in response to the AVS 420 scanning an ID card and verifying whether a patron meets the legal age minimum requirement to access the age-restricted area, a signal can be output by the AVS 405 and transmitted to the control box 420. Particularly, the network door controller 421 at the control box 420 can generate the appropriate commanding signal for the lock relay 422 to either trigger the lock 430 to open (e.g., patron is of age and is permitted access to the age-controlled area) or close (e.g., patron is underage and is prohibited access to the age-controlled area). Additionally, the integrated AVS 405 can send an output signal to the LED light bar 410 to emit a particularly colored light, such as red (e.g., patron is underage and is prohibited access to the age-controlled area) or green (e.g., patron is of age and is permitted access to the age-controlled area) based on the age-verification result. In some cases, a human, such as security at the door can see the visual output of the integrated AVS 405 (either indication on the tablet screen or green light emitted by the LED light bar 410) indicating that the patron has been successfully verified to enter the age-restricted area. Therefore, the human can actuate the door release button 440 which transmits a signal to the control box 420 to command the lock 430 to unlock the door, thereby allowing the patron access to the age-restricted area. Accordingly, the system 400 implements age-restricted access control and door lock control that supports both automated aspects and human interaction aspects, realizing a design for the AVS that has flexibility and enhanced functionality.

Figure 5:
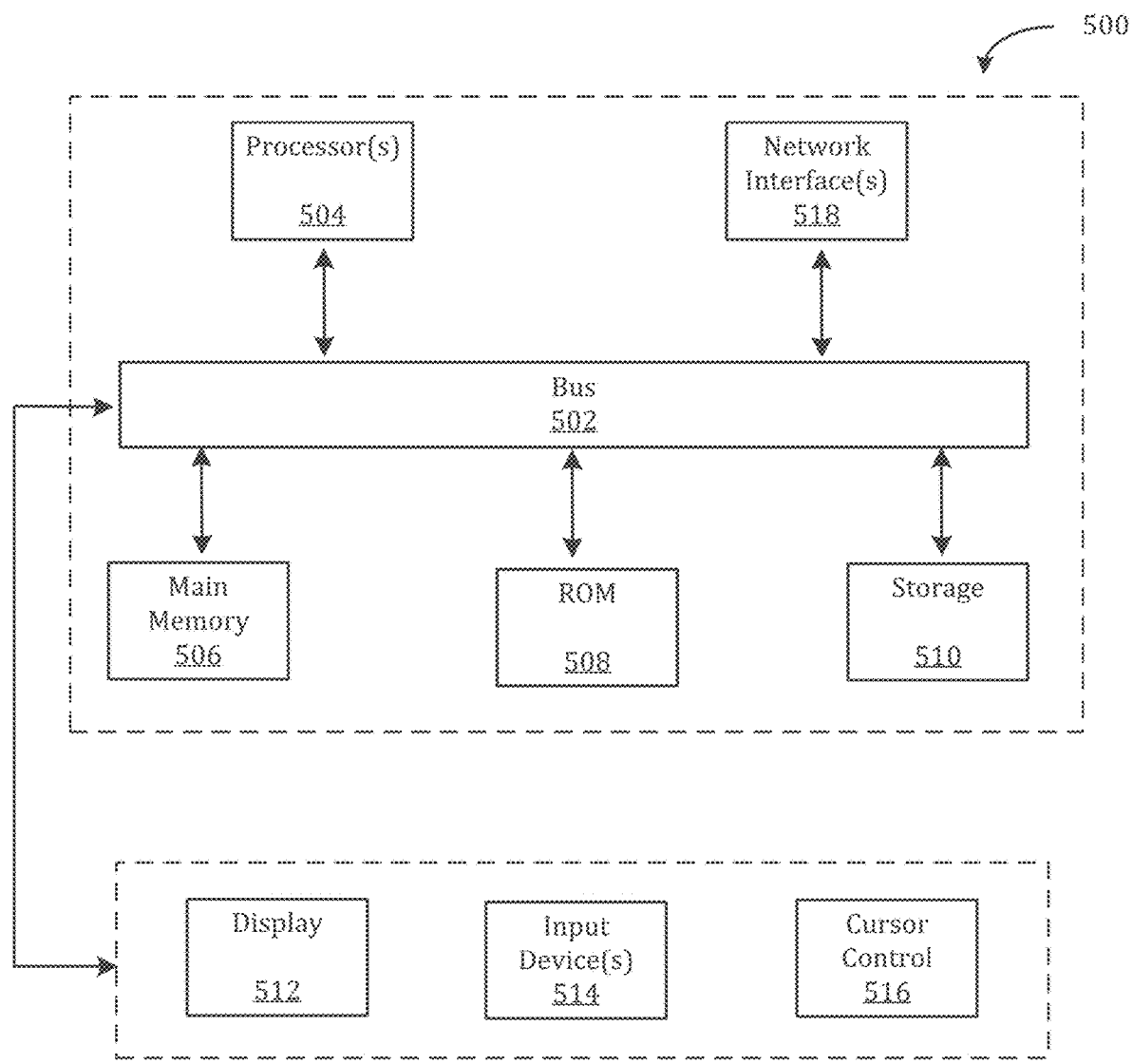
FIG. 5 depicts an example of a computer system that may be used in implementing the AVS shown in FIG. 1A, in accordance with an embodiment of the present disclosure.

FIG. 5 depicts a block diagram of an example computer system 500 in which the disclosed aspects of the AVS (shown in FIG. 1A) may be implemented. For example, the computer system 500 may implement the computer unit of the AVS as disclosed above in reference to FIG. 1A. Furthermore, it should be appreciated that although the various instructions are illustrated as being co-located within a single processing unit, there may be some implementations in which processor(s) includes multiple processing units, allowing one or more instructions to be executed remotely from the other instructions.

The computer system 500 includes a bus 502 or other communication mechanism for communicating information, one or more hardware processors 504 coupled with bus 512 for processing information. Hardware processor(s) 504 may be, for example, one or more general purpose microprocessors.

The computer system 400 also includes a main memory 506, such as a random-access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (flash drive), etc., is provided and coupled to bus 502 for storing information and instructions.

The computer system 400 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable codes that are executed by the computing device(s). This and other modules may include, by way of example, components, such as components, object-oriented components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of executable instructions, possibly having entry and exit points, written in a programming language, such as, for example, Python, Ruby on Rails or NodeJS. A component may be compiled and linked into an executable program, installed in a dynamic link library, or may be written in an interpreted programming language such as, for example, BASIC, Perl, or Python. It will be appreciated that components may be callable from other components or from themselves, and/or may be invoked in response to detected events or interrupts. The components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such executable code may be stored, partially or fully, on a memory device of the executing computing device, for execution by the computing device. The instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which, in combination with the computer system, causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with executable instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP in turn provides data communication services through the worldwide packet data communication network now commonly referred to as the "Internet." Local networks and Internet both use electrical, electromagnetic or optical signals that carry digital data streams. The signals through the various networks and the signals on network link and through communication interface 518, which carry the digital data to and from computer system 510, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Figure 6:
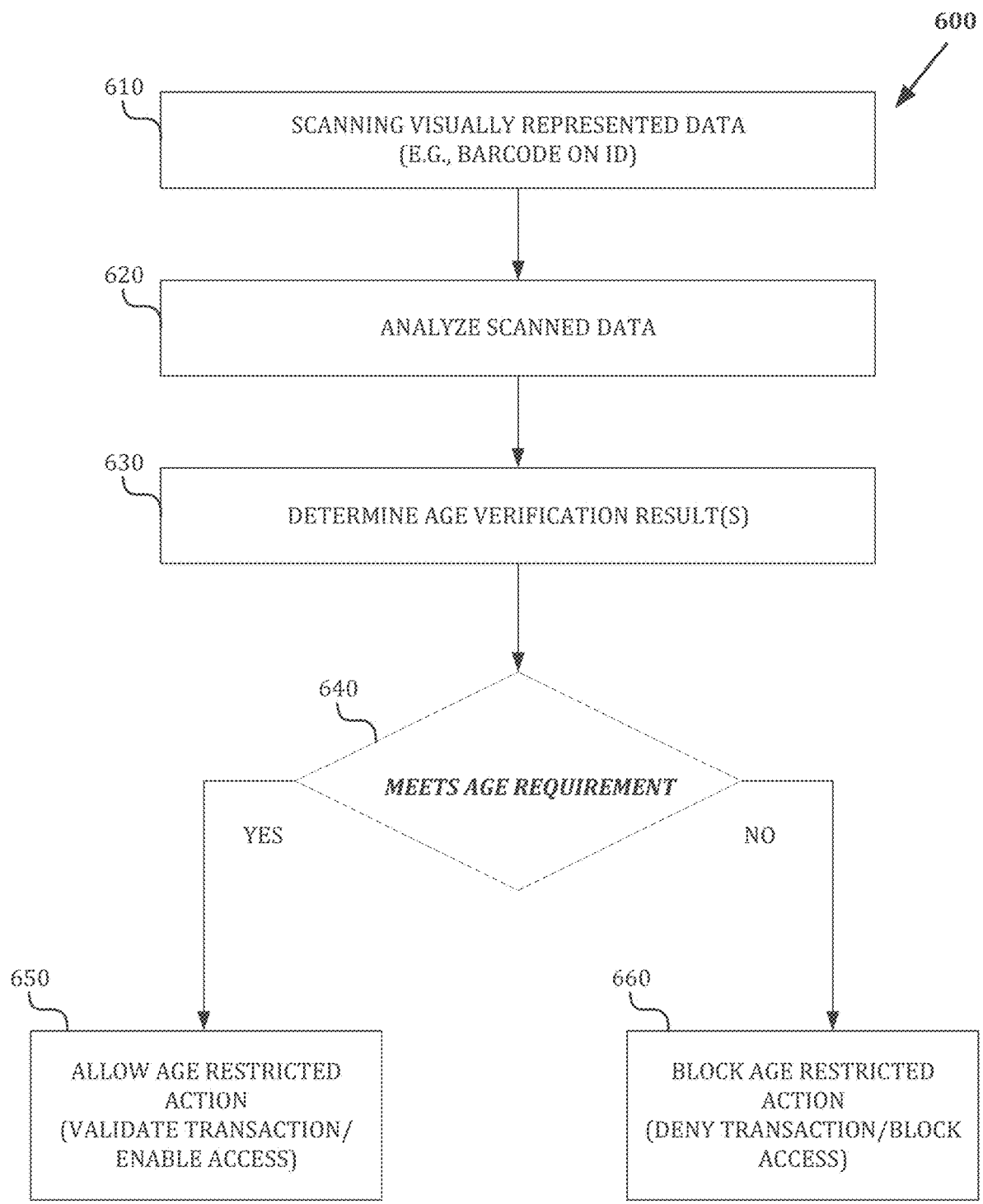
FIG. 6 is a flow diagram of a method for implementing the function of the AVS, in accordance with an exemplary embodiment of the present disclosure.

Referring now to FIG. 6, a method 600 for implementing the function of the AVS is illustrated in a flow diagram. For instance, method 600 can be executed by the AVS (shown in FIG. 1A) in order to allow access to an age-restricted area, such as a bar or casino. The method 600 begins at operation 610, where visually represented data, such as a barcode (or a QR code, or encrypted data) on a driver's license or any other user's ID is scanned by the AVS. As described in detail above, a scanner can perform the scanning function of 610. The scanner can be implemented as an input device that uses a light beam (e.g., laser) to scan visually represented data such as codes, barcodes, text, QR codes, graphic images and the like. By scanning, as executed in operation 610, the AVS can obtain data that is conveyed by the visually represented data. For example, a barcode on the back of the driver's license can be a 2D graphic that digitally represents the information displayed as a text on the front of the driver's license, such as a name, date of birth (DOB), expiration date, and the like.

In one embodiment, a processor of an age verification node (AVS) may be operatively connected to a scanner device. The AVS may have a memory on which are stored machine-readable instructions that when executed by the processor, cause the processor to acquire scan image data of a user ID from the at least one scanner device. The processor may extract a verifiable feature data from the scan image. The processor may also analyze the verifiable feature data to generate a user age verification result. The processor may compare the age verification result against a pre-set age requirement data and may, responsive to the age verification result meeting age requirement data value, validate an age restricted transaction for the user.

In one embodiment, the processor may deny the age restricted transaction for the user responsive to the age verification result being below the age requirement data value. In yet another embodiment, the processor may extract the verifiable feature such as a bar code, a QR code and an encrypted data code. The processor may acquire an age restricted transaction request and to determine the age requirement data value based on the age restricted transaction request. The processor may be connected to a server and may provide the scan image data to a server for comparing the scan image data against a database of stored valid IDs. Then, the processor may, responsive to a match between the scan image data and a stored valid ID, enable access to an age restricted action. The AVS may be connected to an access gate device operatively connected to the processor of the age verification node and may be configured to receive a signal from the processor to open the gate to provide access to an age-restricted area. In one embodiment, the processor of the age verification node may provide the scan image data to an AI module to receive a validation of the age of the user based on predicted determination of validity of the age based on the user ID.

After the visually represented data is scanned, the method 600 moves to operation 620. At operation 620, this data that is obtained by the AVS from scanning visually represented data (e.g., barcode) can be analyzed. As described in greater detail above, the AVS includes a computer unit that is configured to perform a number of data analysis operations on scanned data. As a key feature, the AVS can analyze the data obtained from scanning the barcode on the driver's license in order to determine a patron's age. It should be appreciated that the AVS can perform other forms of data analysis in operation 620, such as analyzing the scanned and other data (e.g., store data, employee data, time/date data, etc.) in a manner that supports compliance, logging and reporting, identification verification, and the like.

Next, at operation 630, the AVS can utilize the analyzed data to determine an age verification result. As an example, the AVS is programmed to register the current date, which can be compared to the DOB of the patron that has been determined from analyzing the data on the scanned driver's license in previous operation 620. The AVS can calculate an age corresponding to the patron at the time of attempting to enter an age-restricted area or purchase an age-controlled product. Thereafter, the AVS can compare the patron's determined age to stored limits pertaining to the legal age restrictions that are associated with the particular age-restricted areas or age-controlled products being monitored by the AVS. For example, the AVS can have a stored limit corresponding to entering a casino (e.g., age-restricted area having a legal age restricted minimum of 21 years old), the stored limit may indicate that the scanned DOB must be equal or be prior to Feb. 1, 2000, based on the current date of Feb. 1, 2002 or that the calculated age of the patron must be equal or exceed 21 years of age. Based on this analysis, the AVS can ultimately perform the age verification in operation 630, determining whether the patron meets the legal age restrictions to enter the age restricted area or purchase the age-controlled product.

The AVS can be programmed to calculate multiple age verifications, which correspond to different age-restricted areas and age-controlled products that may have different legal age restricted minimums. For instance, the AVS may determine a different age verification result for the same patron, where the patron meets the age restriction for entering a club (e.g., 18 years old), but does not meet the age restriction for purchasing any alcoholic beverages (e.g., 21 years old). Thus, at operation 640, the AVS performs a conditional check to determine whether the patron meets the age requirement (for one or more particular age-restricted areas or age-controlled products) that most specifically corresponds to the use case and/or operating environment. For instance, at previous operation 640, the AVS may obtain age verification results for entering a club, entering a casino floor, purchasing alcohol, or purchasing tobacco, which may all be available in a Las Vegas casino, at previous operation 630. Then, at operation 640, the AVS checks whether one of the age verification results determined in previous operation 630 indicates that the patron meets the age requirement for the particular use case, such as entering the casino floor for example.

Subsequent to this check, the AVS can perform an appropriate response based on the age verification result and the use case. In the case where the age verification result indicates that the patron does meet an age requirement for a particular age-restricted area or an age-controlled product (shown as "Yes"), the process can move to operation 650, where the AVS allows the appropriate age restriction action. Referring back to the example of entering the casino example, operation 650 can involve enabling access to the age-restricted area. This can involve a number of various outputs and/or actions, such as illuminating a green light from light bars indicating that the patron is "of-age" for entry, or enabling the access control feature to automatically unlock a door for entry. In another example, operation 650 can involve validating and/or approving the purchase of a age controlled product. For example, operation 650 can include displaying on a tablet a visual indication of the age verification, such as a green "check", indicating that the patron is "of-age" to buy alcohol, for example, and notifying the cashier that the purchase is legal and can be completed. It should be appreciated that the AVS can be configured to perform other actions related to age verification, which ultimately allows the patron to purchase an age restricted product and/or access and age restricted area.

In the case where the age verification result indicates that the patron does not meet an age requirement for a particular age-restricted area or an age-controlled product (shown as "No"), the process can move to operation 660, where the AVS performs an action that ultimately blocks a patron from entering the age-restricted area or purchasing the age-controlled product. Referring back to the example of entering the casino example, operation 660 can involve denying entry to the age-restricted area. This can involve a number of various outputs and/or actions, such as illuminating a red light from light bars indicating that the patron is not "of-age" (or that the ID is invalid). In another example, operation 660 can involve denying the purchase of an age-controlled product. For instance, operation 660 can include displaying on a tablet a visual indication of the failed age verification, such as a red "X", indicating that the patron is not "of-age" to buy alcohol, for example, and notifying the cashier that the purchase would be illegal, and thus should not be completed. It should be appreciated that the AVS can be configured to perform other actions related to age verification, which ultimately blocks the patron from purchasing an age-restricted product and/or accessing an age-restricted area.

Figure 7A:
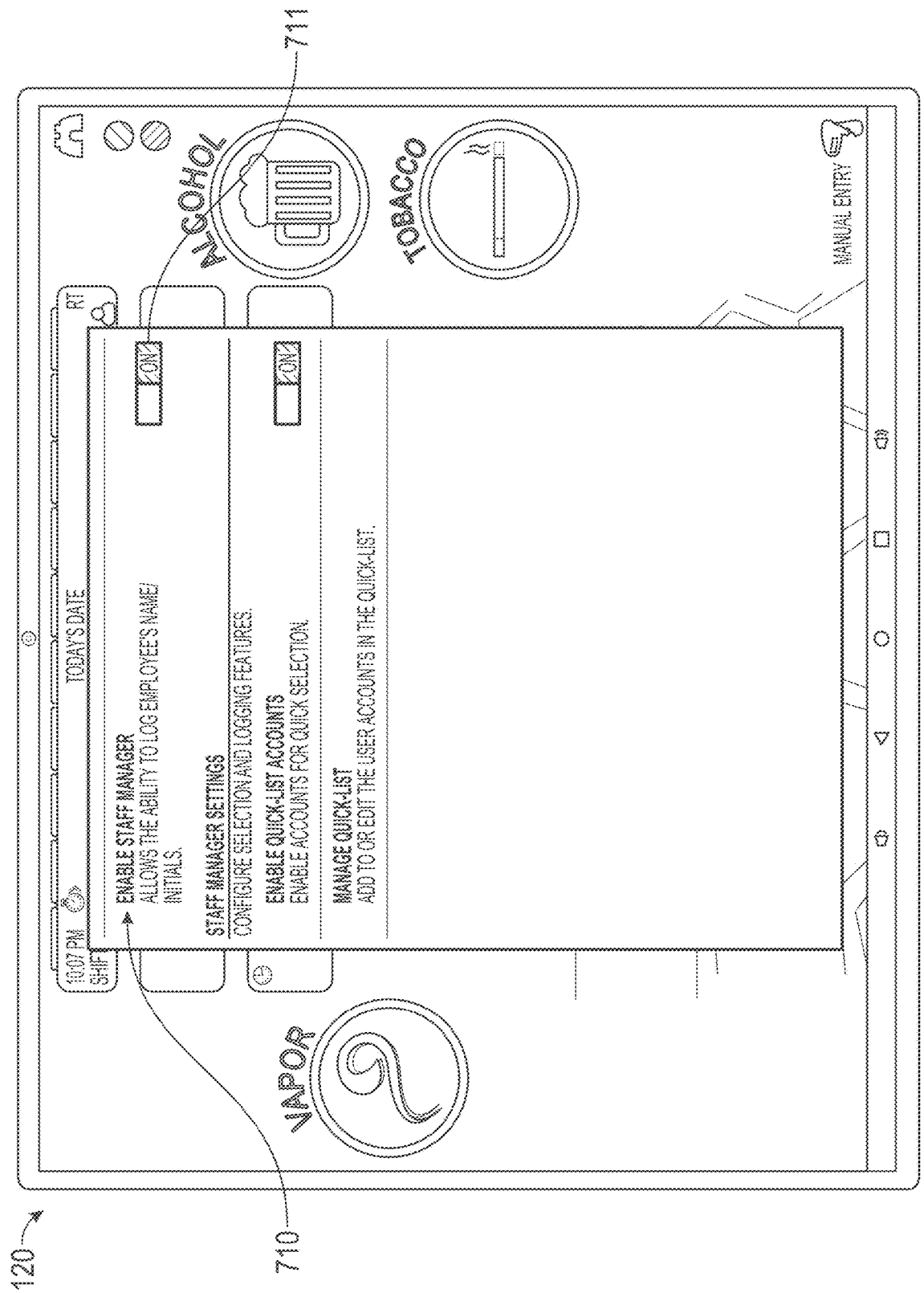
FIG. 7A depicts an example of an interface displaying a compliance auditing staff manager feature that may be implemented by the application aspects of the AVS system, in accordance with an exemplary embodiment of the present disclosure.

In FIG. 7A shows an example of an interface 710 displaying a compliance auditing staff manager feature 711 of the AVS system. In some embodiments, the compliance auditing staff manager feature 711 provides the ability for the AVS to associate a staff ID with a sales transaction for purposes of compliance auditing. For instance, a store owner (or manager) can check the performance of the store's staff with respect to scanning and checking IDS (for age verification and/or ID verification). The compliance auditing staff manager feature 711 can be supported by the application, as a part of the GUI on computer unit 120.

Figure 7B:
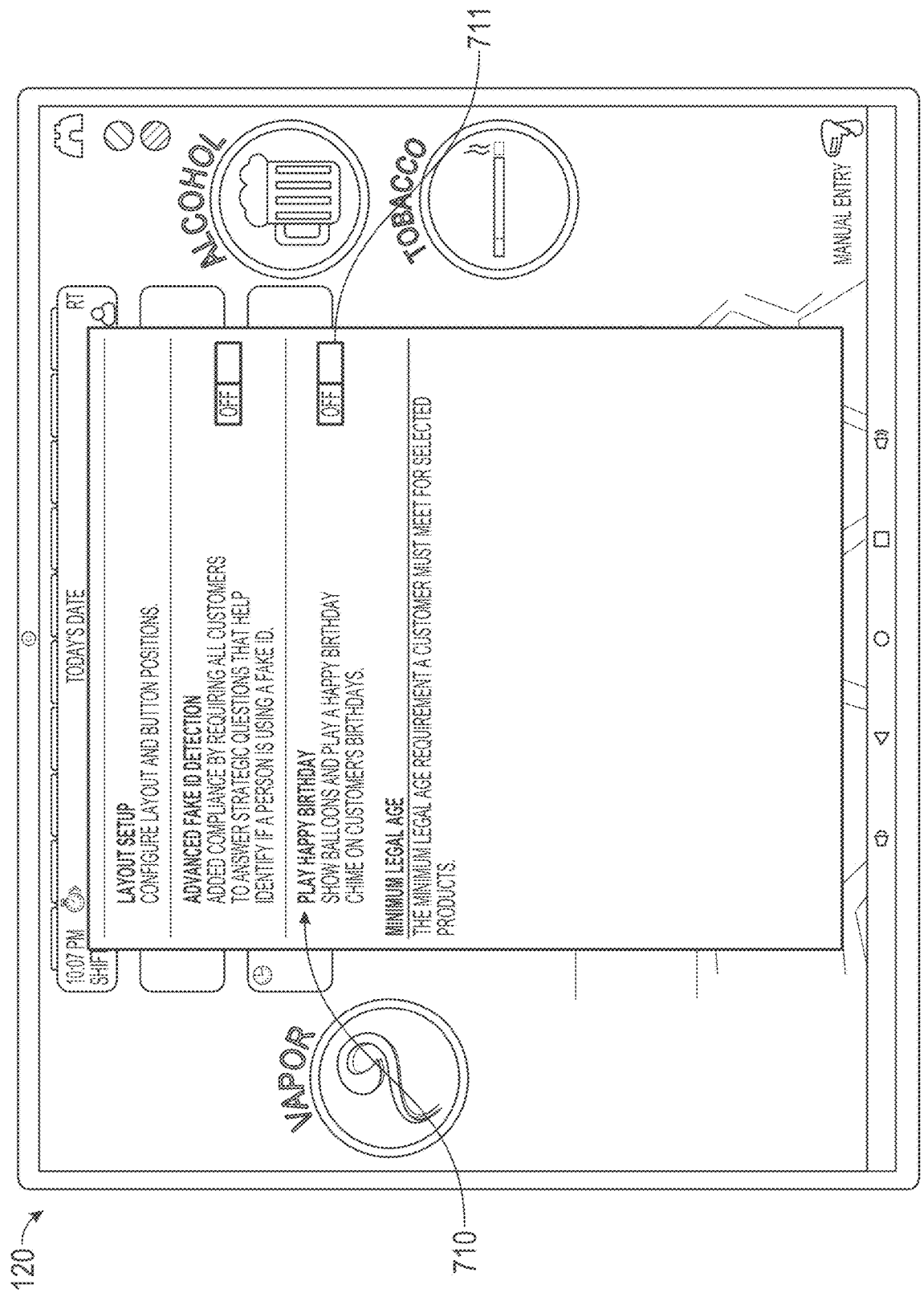
FIG. 7B depicts an example of an interface displaying a happy birthday feature that may be implemented by the application aspects of the AVS system, in accordance with an exemplary embodiment of the present disclosure.

FIG. 7B depicts an example of an interface 720 displaying a happy birthday feature 721. In some embodiments, the happy birthday feature 721 can play happy birthday and display a balloons graphics on a customer's birthday (based on the scanned ID). The happy birthday feature 721 can be supported by the application, as a part of the GUI on the computer unit 120.

Figure 7C:
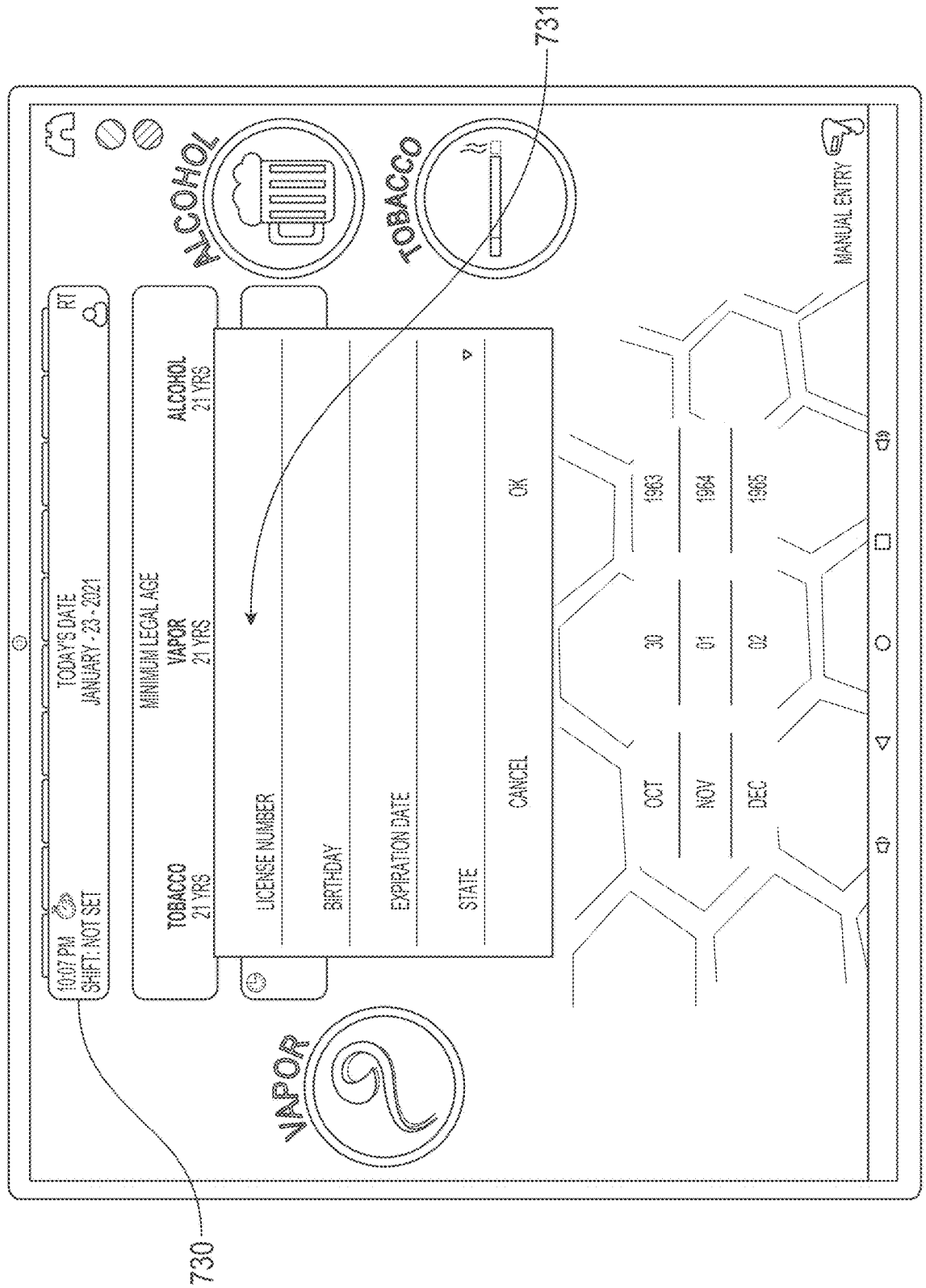
FIG. 7C depicts an example of an interface displaying an ID manual entry feature that may be implemented by the application aspects of the AVS system, in accordance with an exemplary embodiment of the present disclosure.

In FIG. 7C, an example of an interface 730 displaying an ID manual entry feature 731 is shown. In addition to scanning barcodes on IDs, such as driver's licenses, the AVS can also be configured to allow for manual entry of the information on an ID. For instance, the AVS can automatically display the ID manual entry feature 731, if an ID has failed scanning after a certain number of consecutive attempts (e.g., after three tries). A user can manually input (e.g., type) data from the ID into the computer unit of the AVS via the manual entry feature 731, which allows the AVS to obtain the necessary data from the presented ID, even if the ID cannot be properly scanned by the AVS' scanner (e.g., ID is damaged, the barcode is worn, etc.). The manual entry feature 731 can be supported by the application, as a part of the GUI on the AVS' computer unit.

Figure 7D:
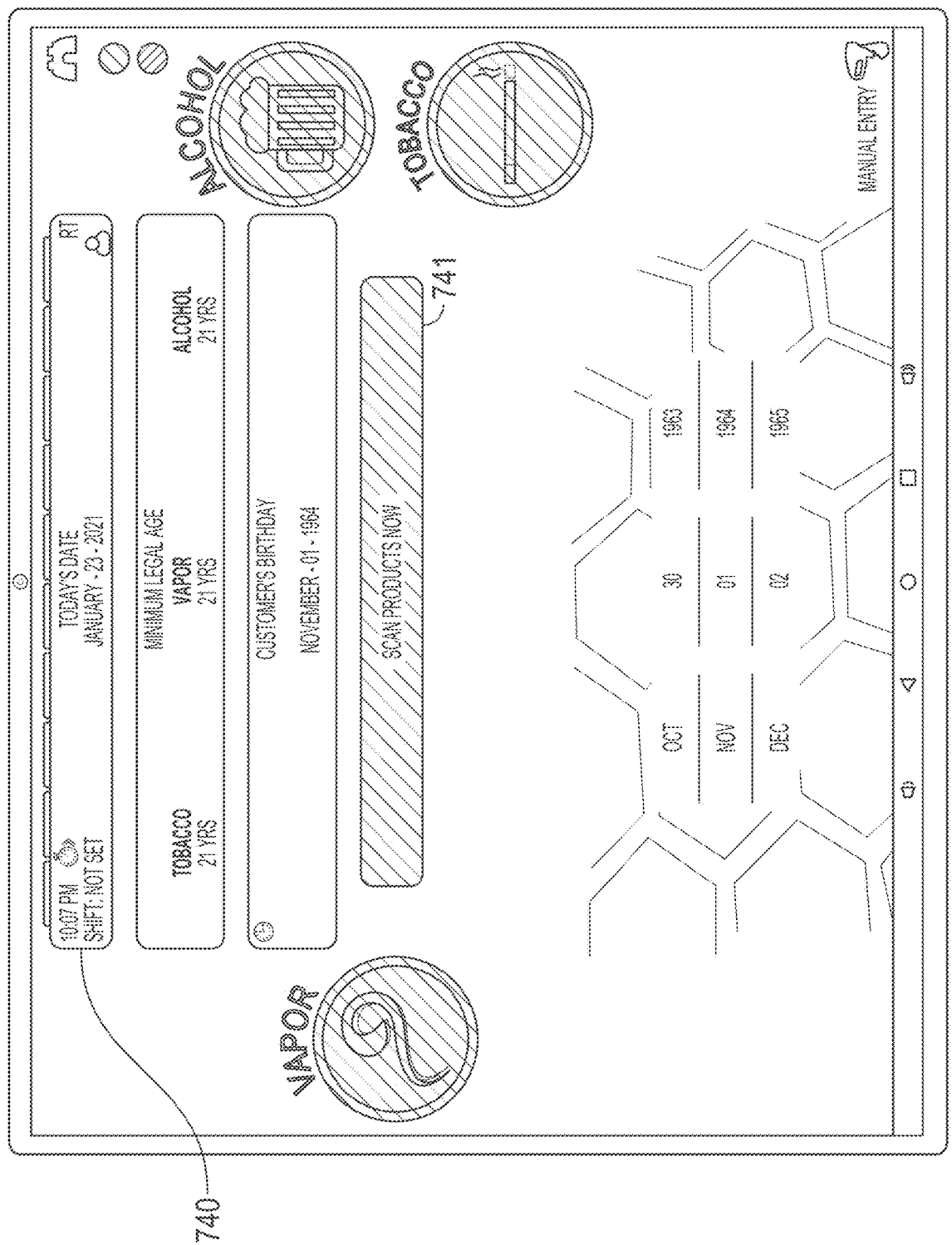
FIG. 7D depicts an example of an interface displaying an product scan feature that may be implemented by the application aspects of the AVS system, in accordance with an exemplary embodiment of the present disclosure.
Figure 7E:
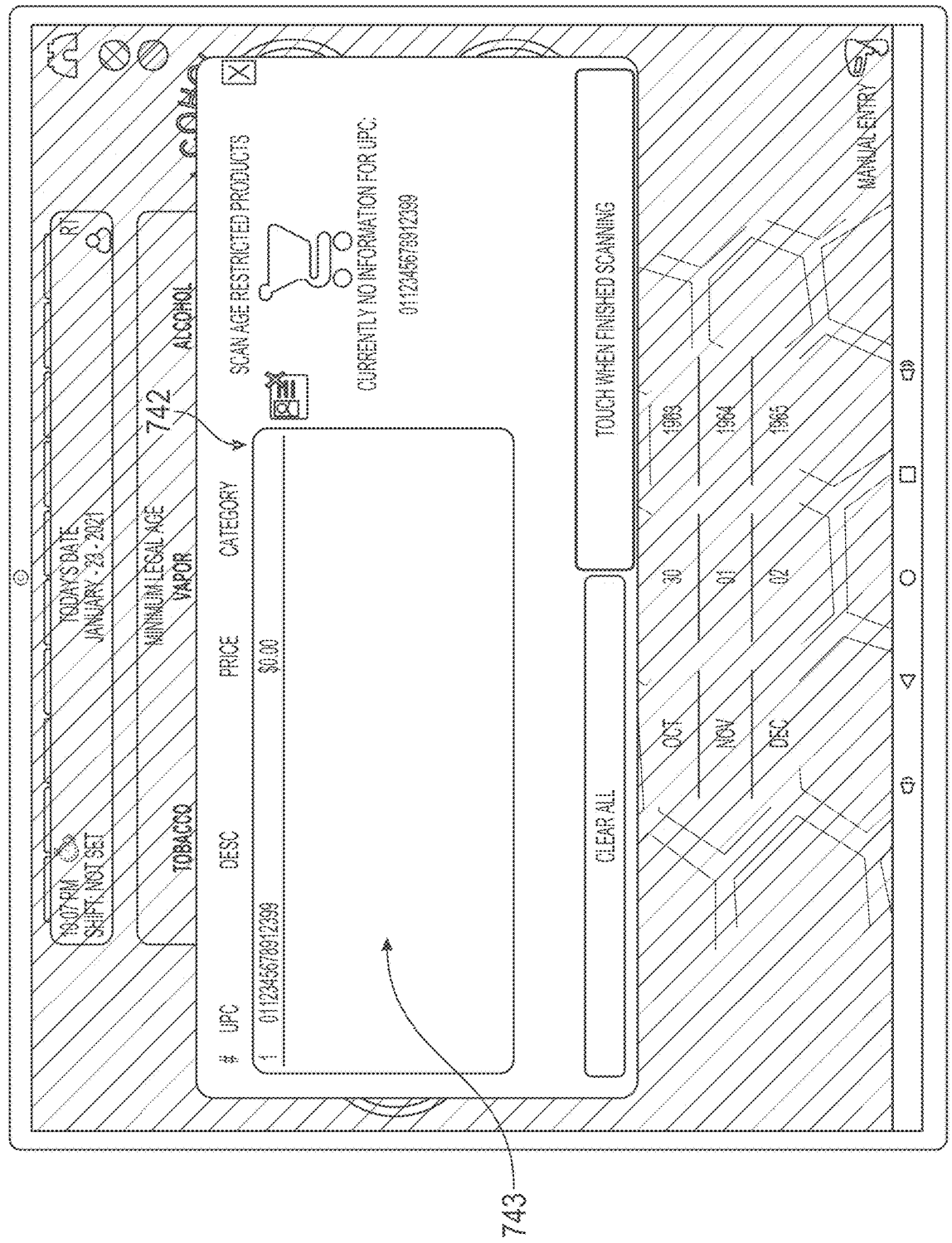
FIG. 7E depicts an example of an interface displaying an product scan page that may be implemented by the application aspects of the AVS system, in accordance with an embodiment of the present disclosure.

FIG. 7D depicts an example of an interface 740 displaying a product scan feature 741. The product scan feature 741 allows an age-controlled product to also be scanned and entered into the AVS for various purposes, such as compliance and/or inventory control (e.g., product quantity). In the illustrated example, the interface 740 displaying shows icons for the scanning of age-controlled product including alcohol, tobacco, and vapor. FIG. 7E depicts an example of an interface 742 displaying a product scan page 743, which displays information related to the age-controlled product that has been scanned using the product scan feature. In the example, the product scan page 743 can include information such as the product's UPC, price, and category.

Figure 7F:
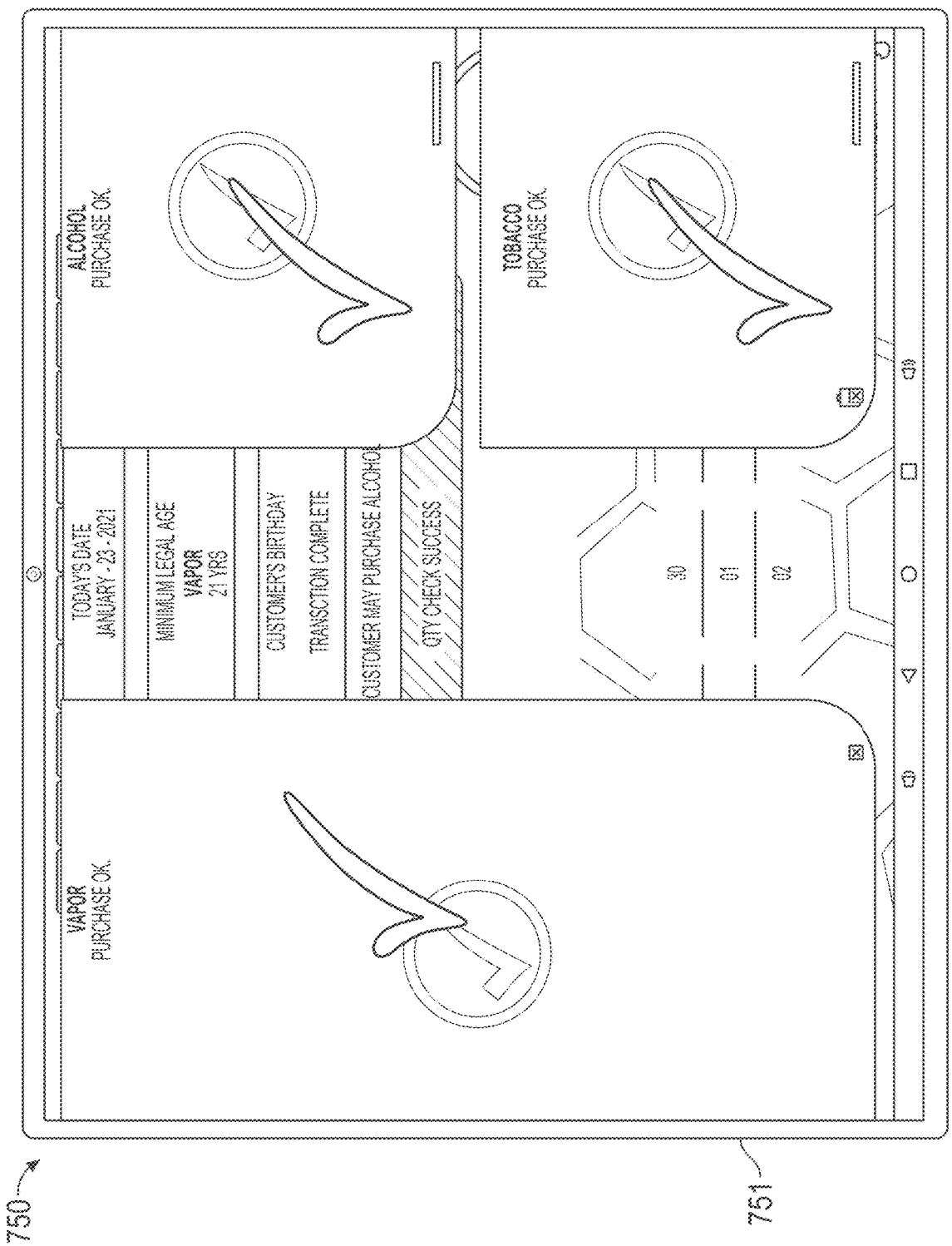
FIG. 7F depicts an example of an interface displaying an age verification result based on a quantity limit feature of the AVS, in accordance with an embodiment of the present disclosure.

In FIG. 7F an example of an interface 750 displaying an age verification result 751 based on a quantity limit feature of the AVS. FIG. 7F depicts the age verification results related to purchasing age-restricted products (e.g., vapor, alcohol, tobacco). According to the embodiments, these age verification results can be generated in response to quantity limits for the corresponding products. In order to obtain these quantities limits, the AVS may communicate with a local database or remote sever. For example, the AVS may determine that there is enough inventory to support a purchase of five or less of tobacco items, alcohol items, and vapor items. Thus, in a transaction where a customer is purchasing only one each of these products, the windows for vapor 341, tobacco 342, and alcohol 343 can display green "check" indicating that the purchase meets the quantity limits and thus the purchase can be completed.

Figure 7G:
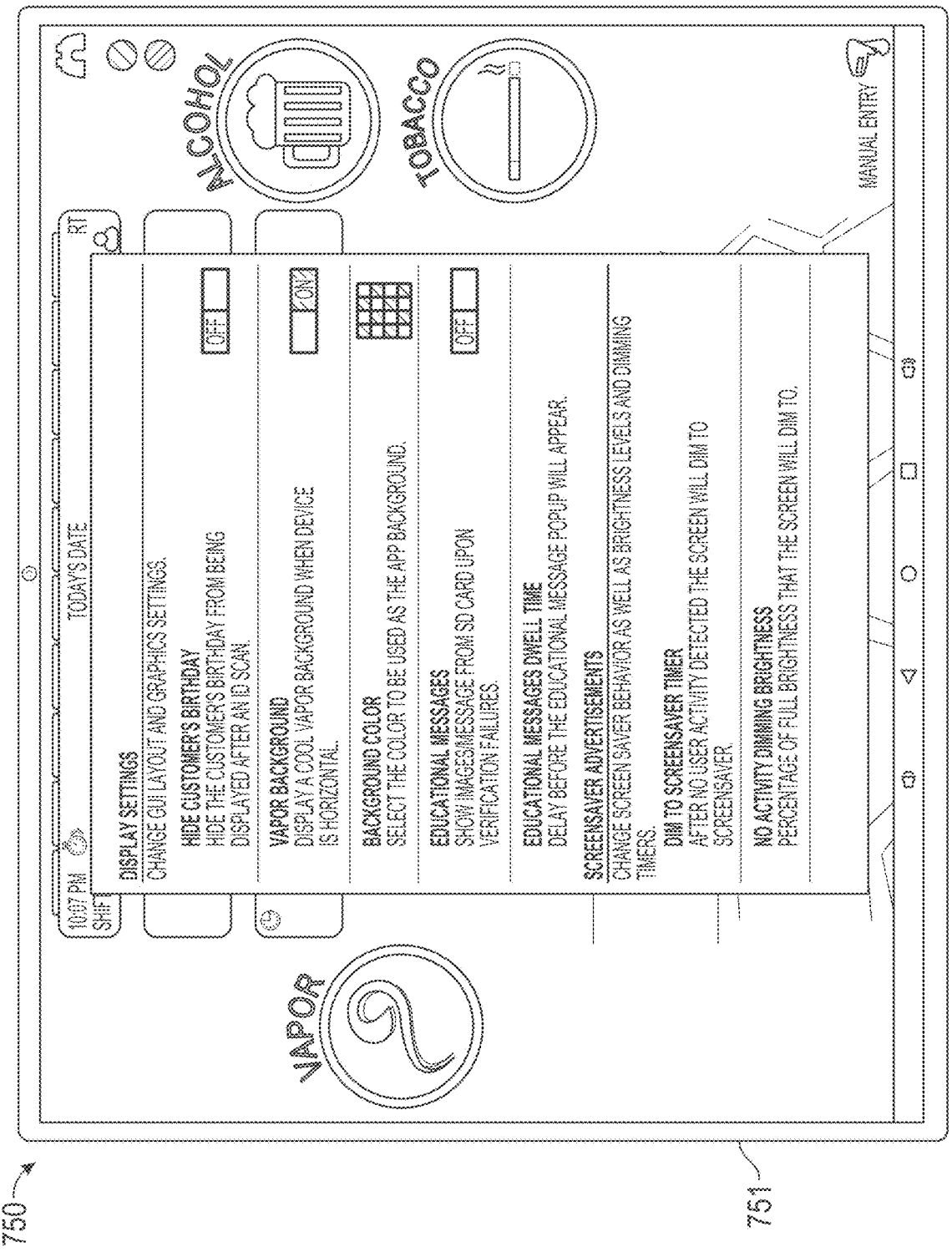
FIG. 7G depicts an example of an interface supporting customized display background color that may be implemented by the application aspects of the AVS system, in accordance with an embodiment of the present disclosure.
Figure 7H:
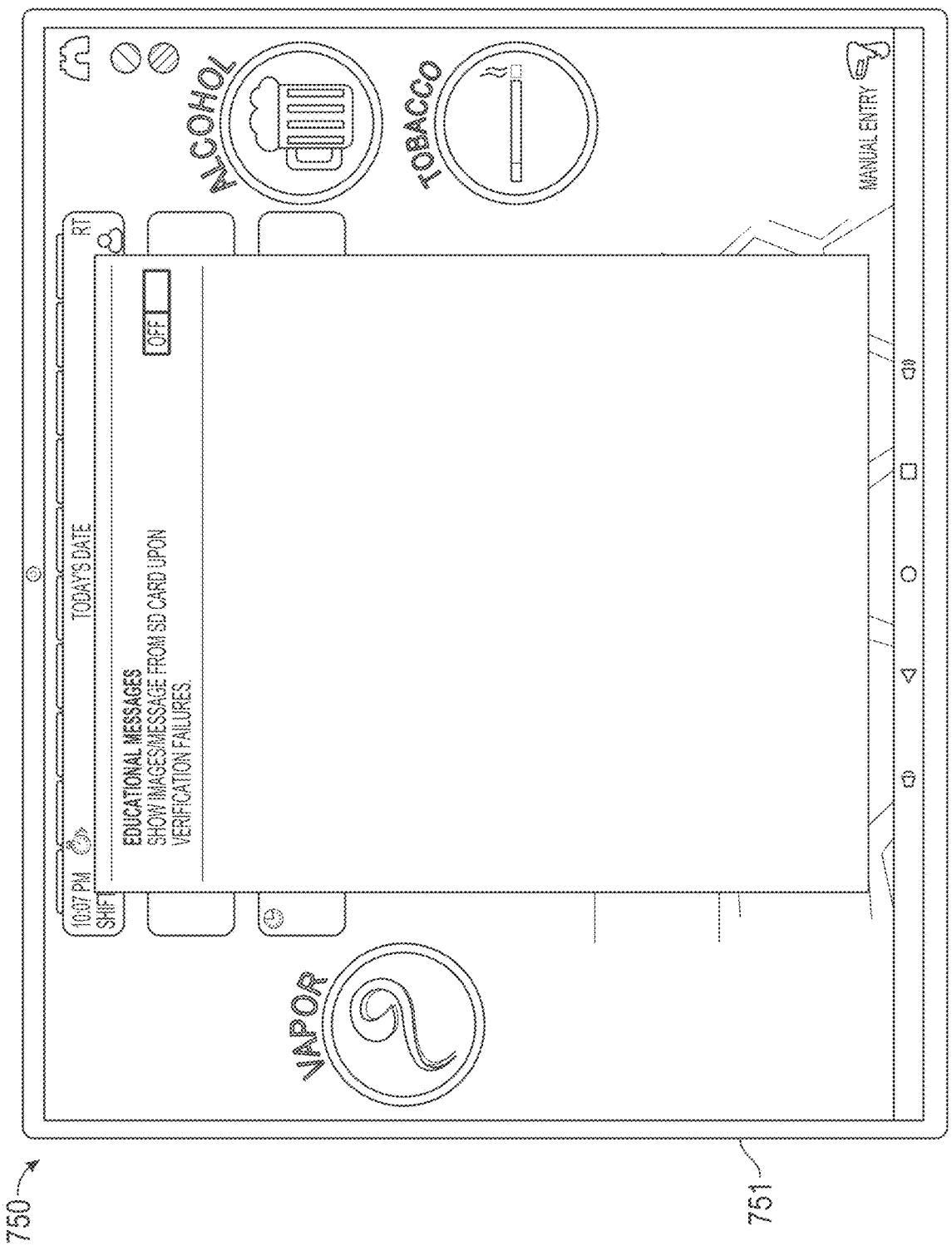
FIG. 7H depicts an example of an interface supporting educational messages that may be implemented by the application aspects of the AVS system, in accordance with an embodiment of the present disclosure.
Figure 71:
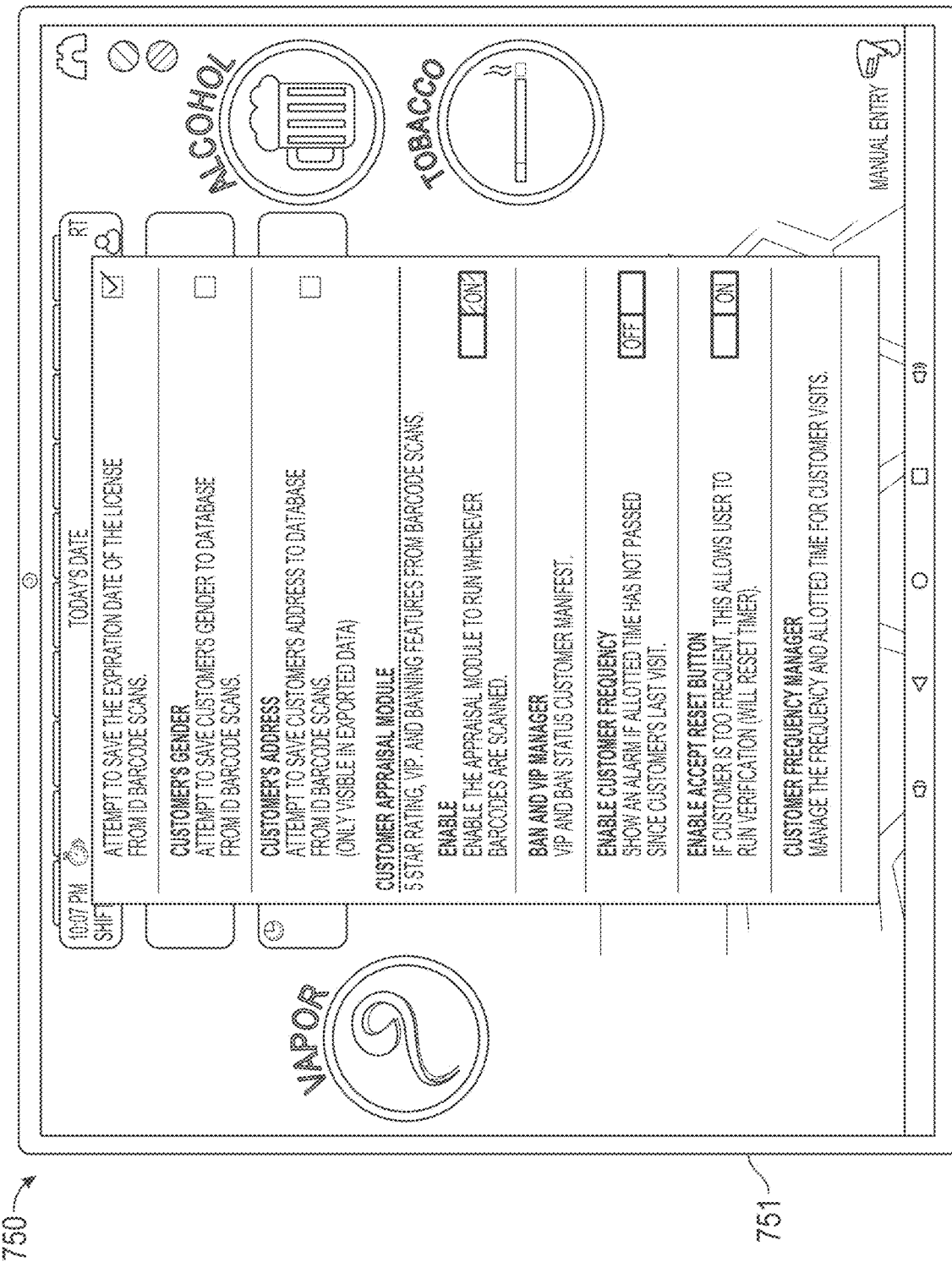
Figure 7J:
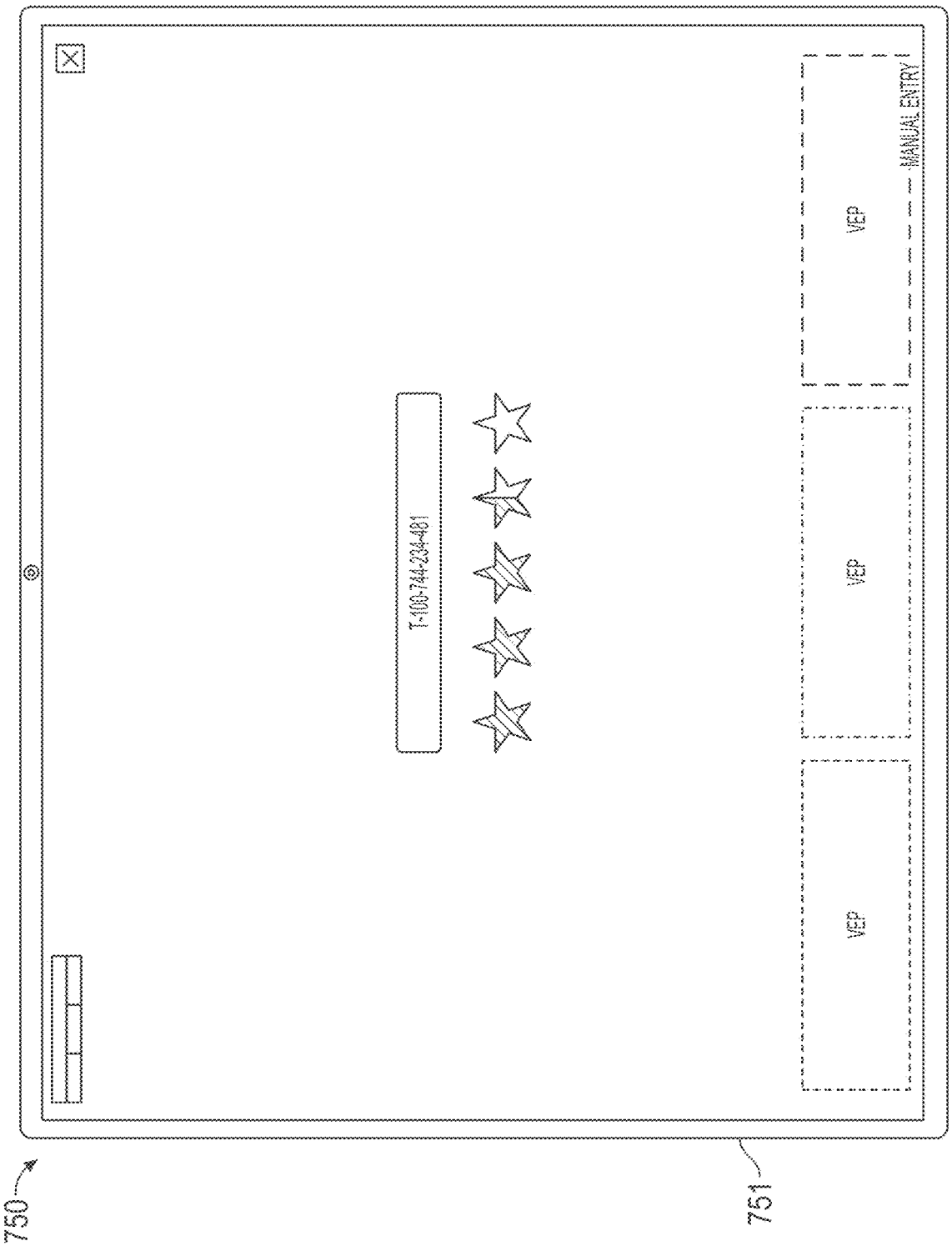
FIG. 7J depicts an example of an interface supporting a customer appraisal screen that may be implemented by the application aspects of the AVS system, in accordance with an embodiment of the present disclosure.
Figure 7K:
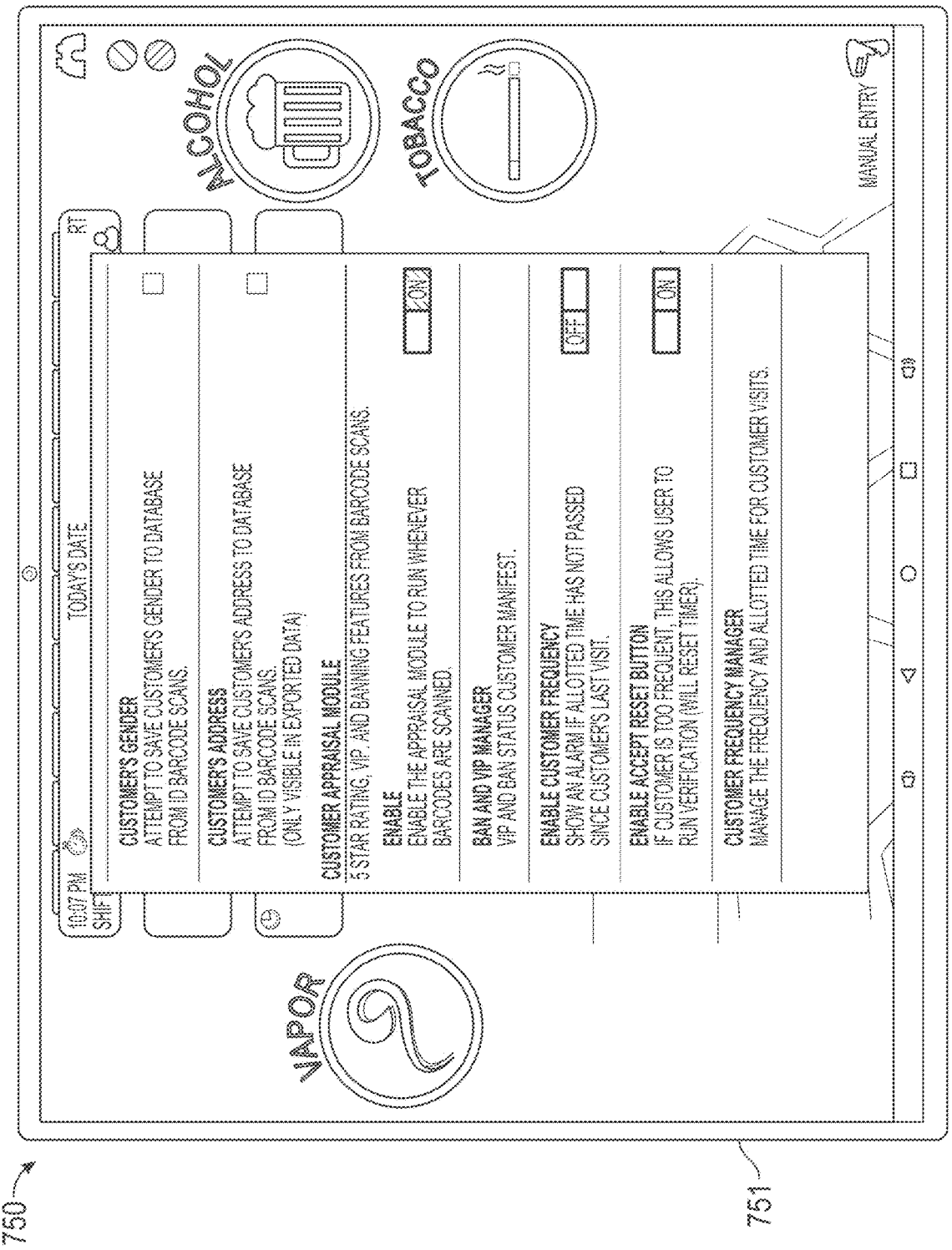
FIG. 7K depicts an example of an interface supporting a customer frequency module that may be implemented by the application aspects of the AVS system, in accordance with an embodiment of the present disclosure.
Figure 7L:
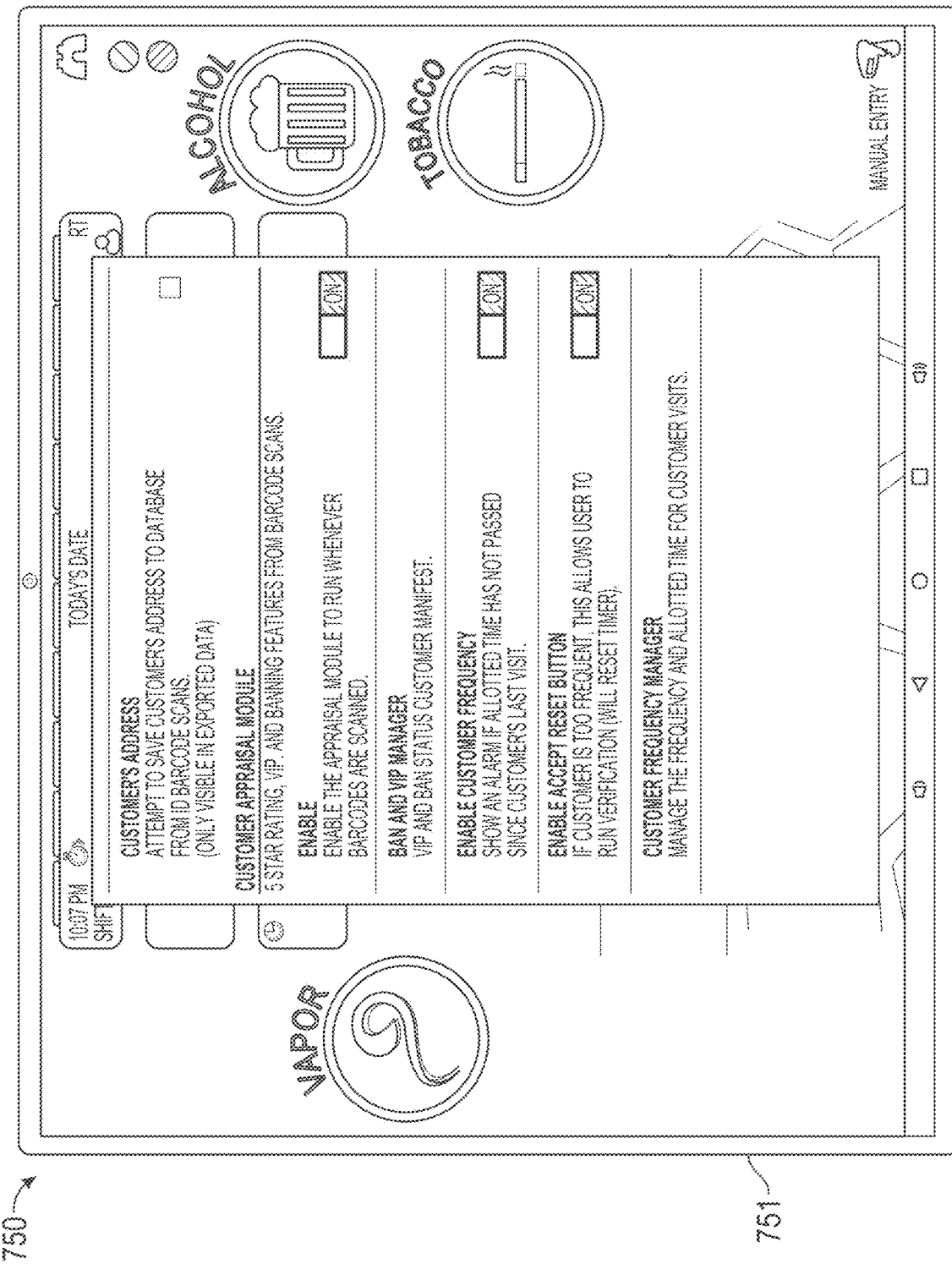
FIG. 7L depicts an example of an interface supporting customizable options for the customer frequency module that may be implemented by the application aspects of the AVS system, in accordance with an embodiment of the present disclosure.
Figure 7M:
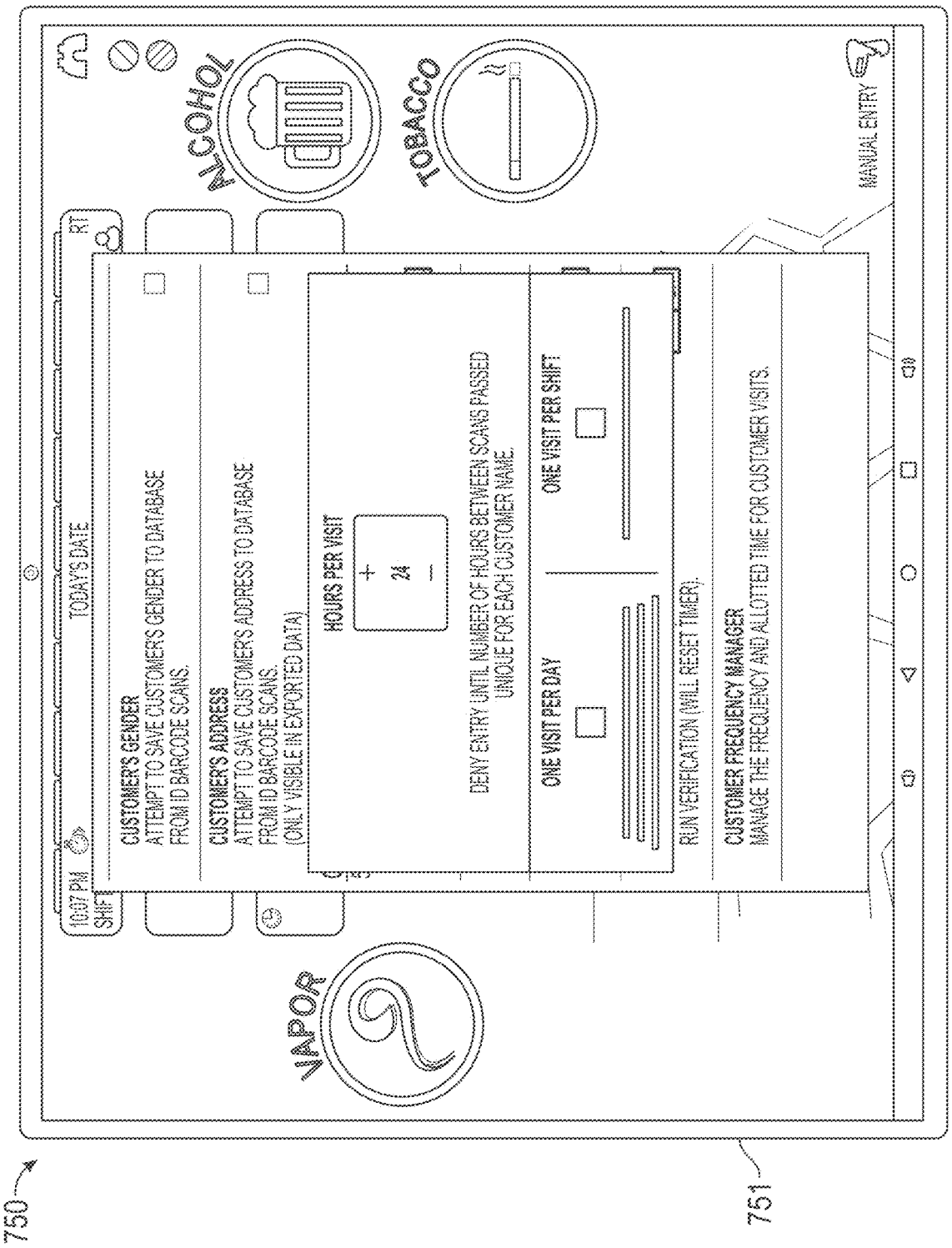
FIG. 7M depicts an example of an interface displaying a customer frequency set up that may be implemented by the application aspects of the AVS system, in accordance with an embodiment of the present disclosure.
Figure 7N:
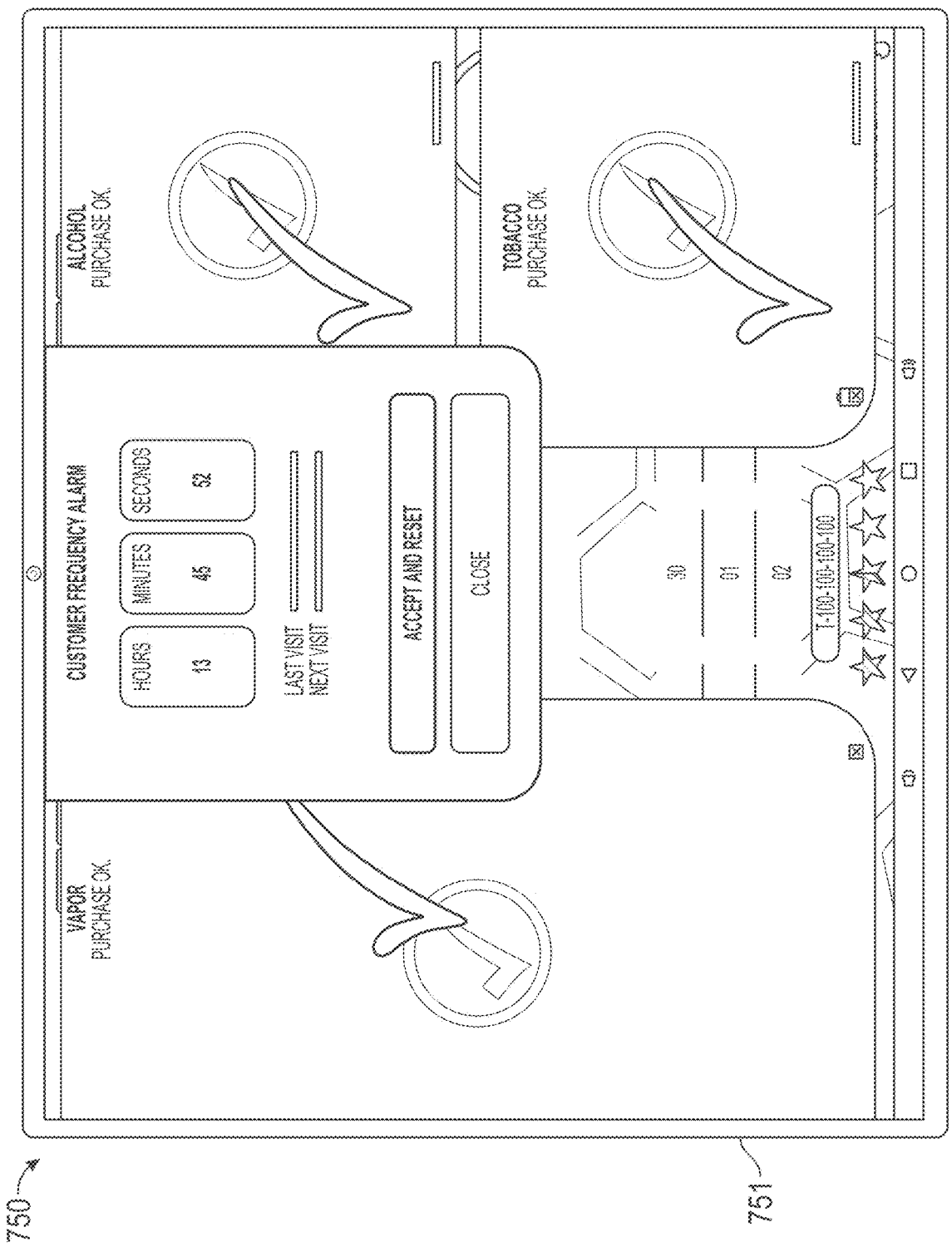
FIG. 7N depicts an example of an interface displaying an alarm for customer frequency that may be implemented by the application aspects of the AVS system, in accordance with an embodiment of the present disclosure.
Figure 70:
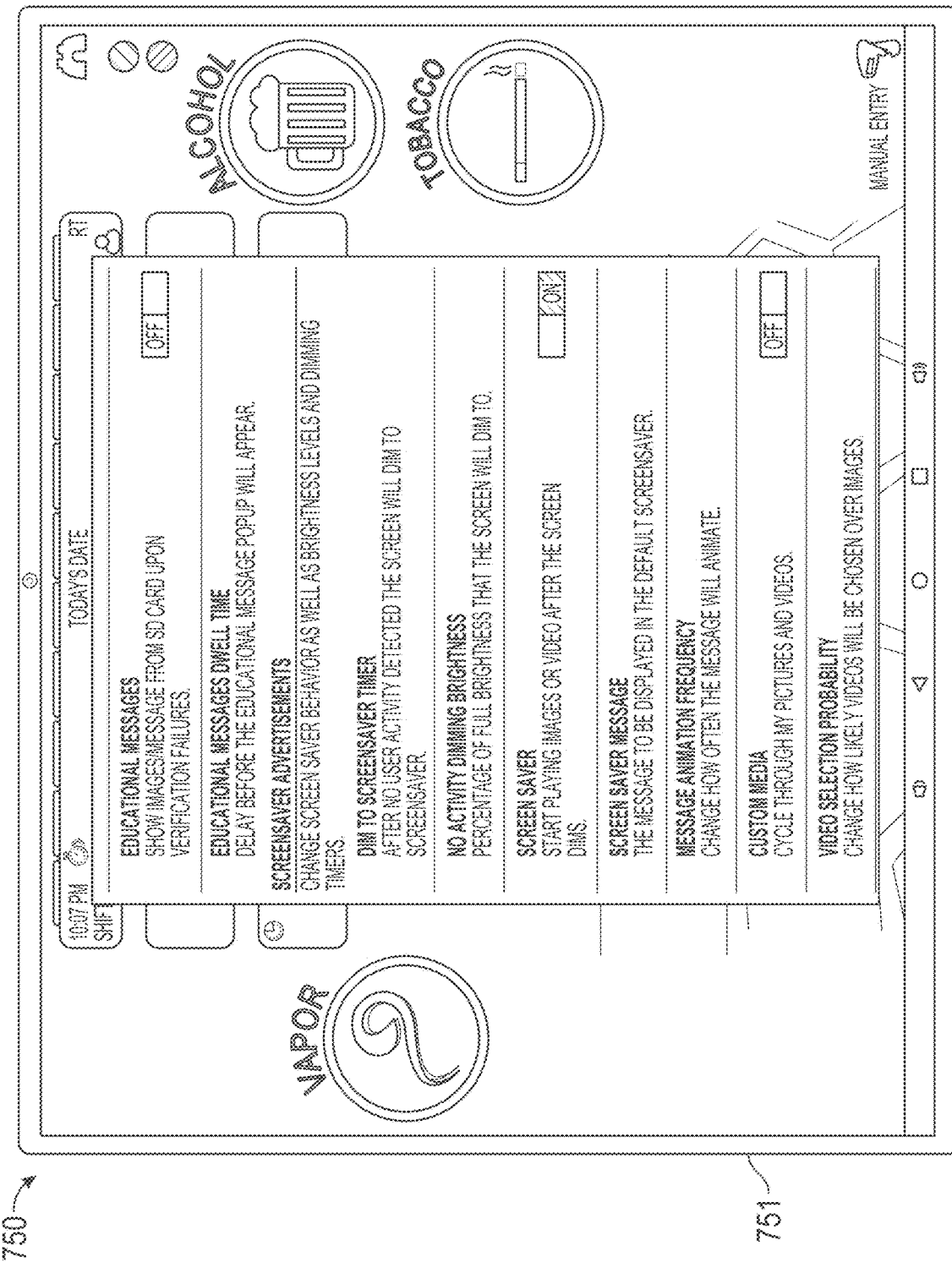
Figure 7P:
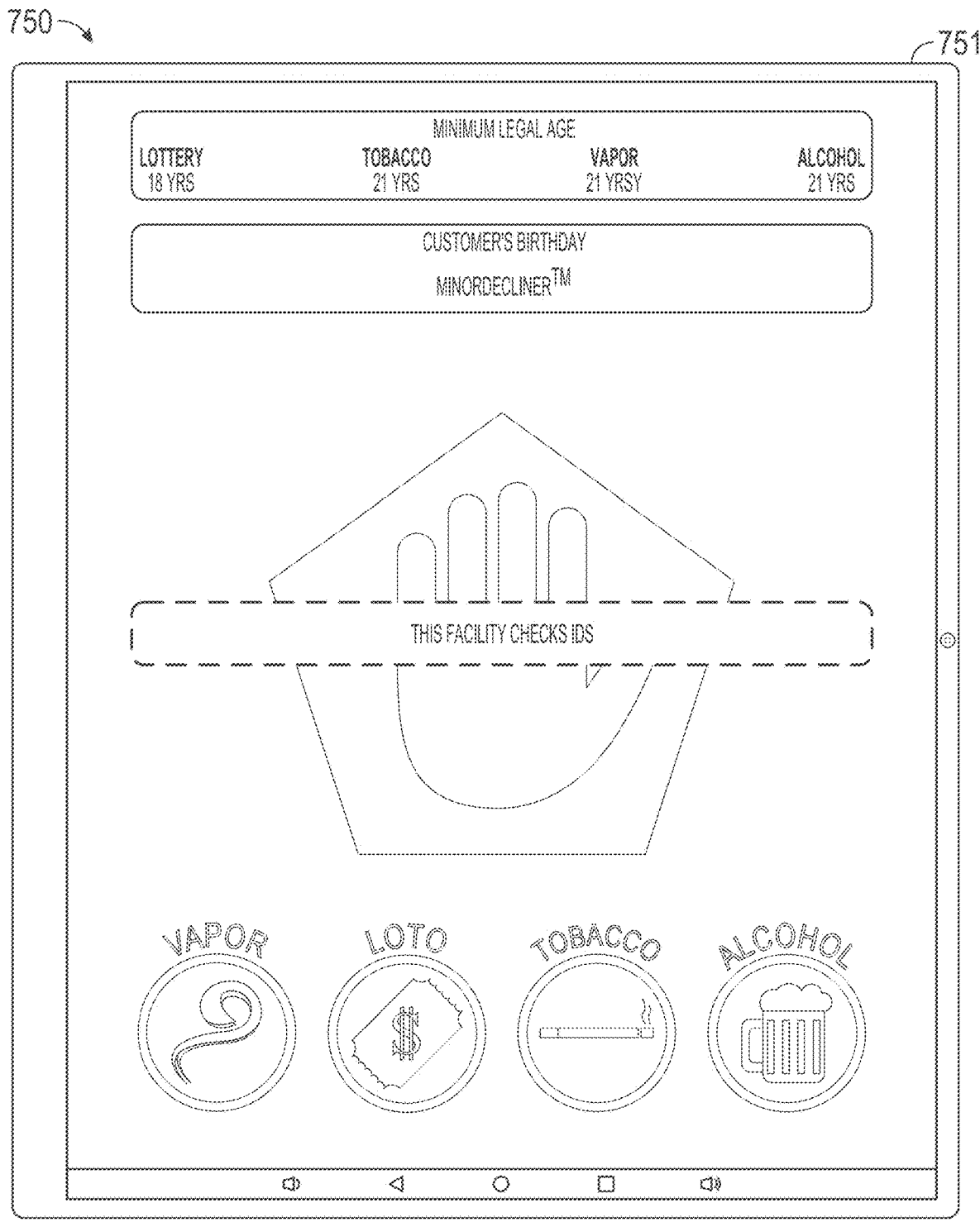
FIG. 7P depicts an example of an interface displaying a custom screen saver that may be implemented by the application aspects of the AVS system, in accordance with an embodiment of the present disclosure.
Figure 7Q:
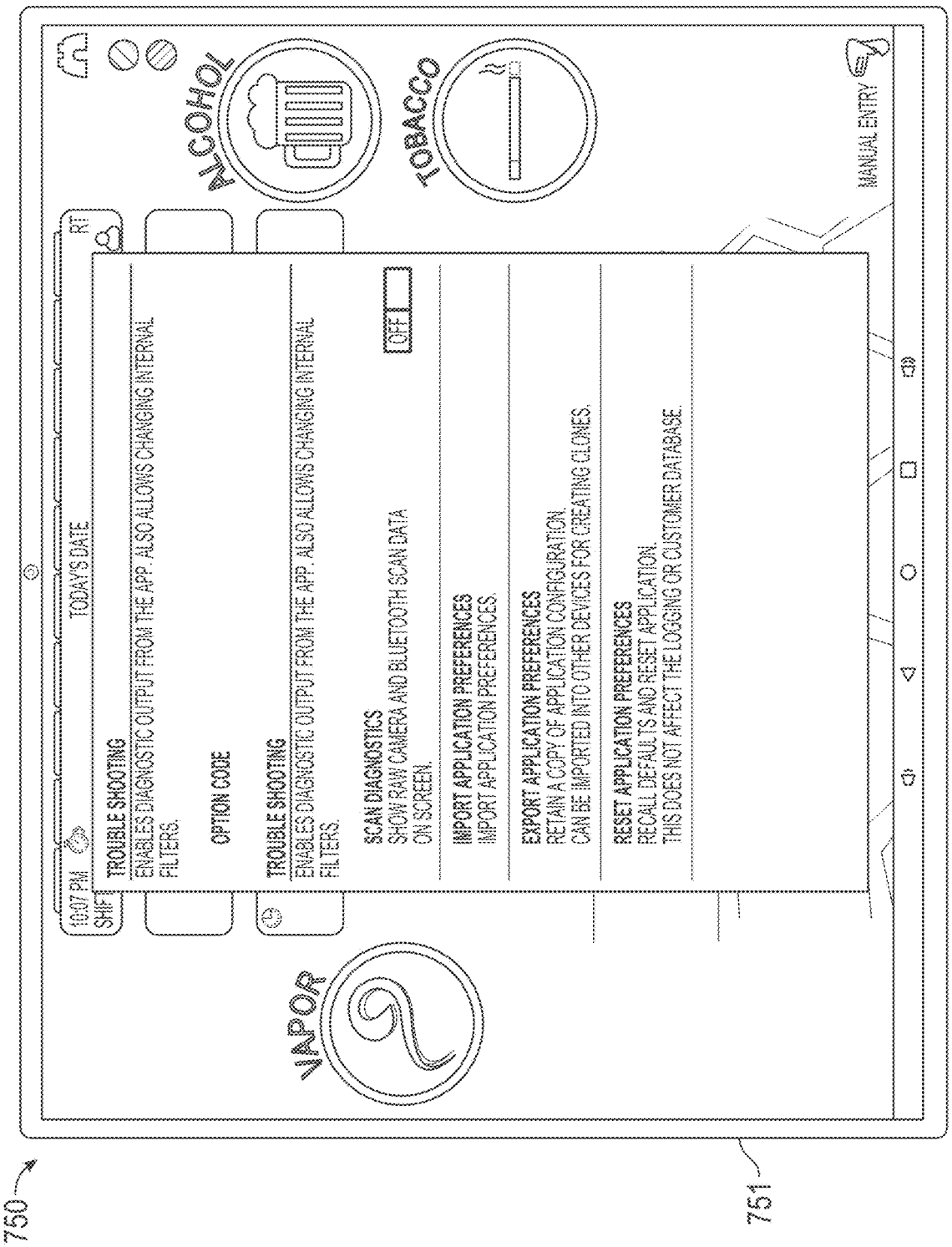
FIG. 7Q depicts an example of an interface supporting the save and export of configurations that may be implemented by the application aspects of the AVS system, in accordance with an embodiment of the present disclosure.
Figure 7R:
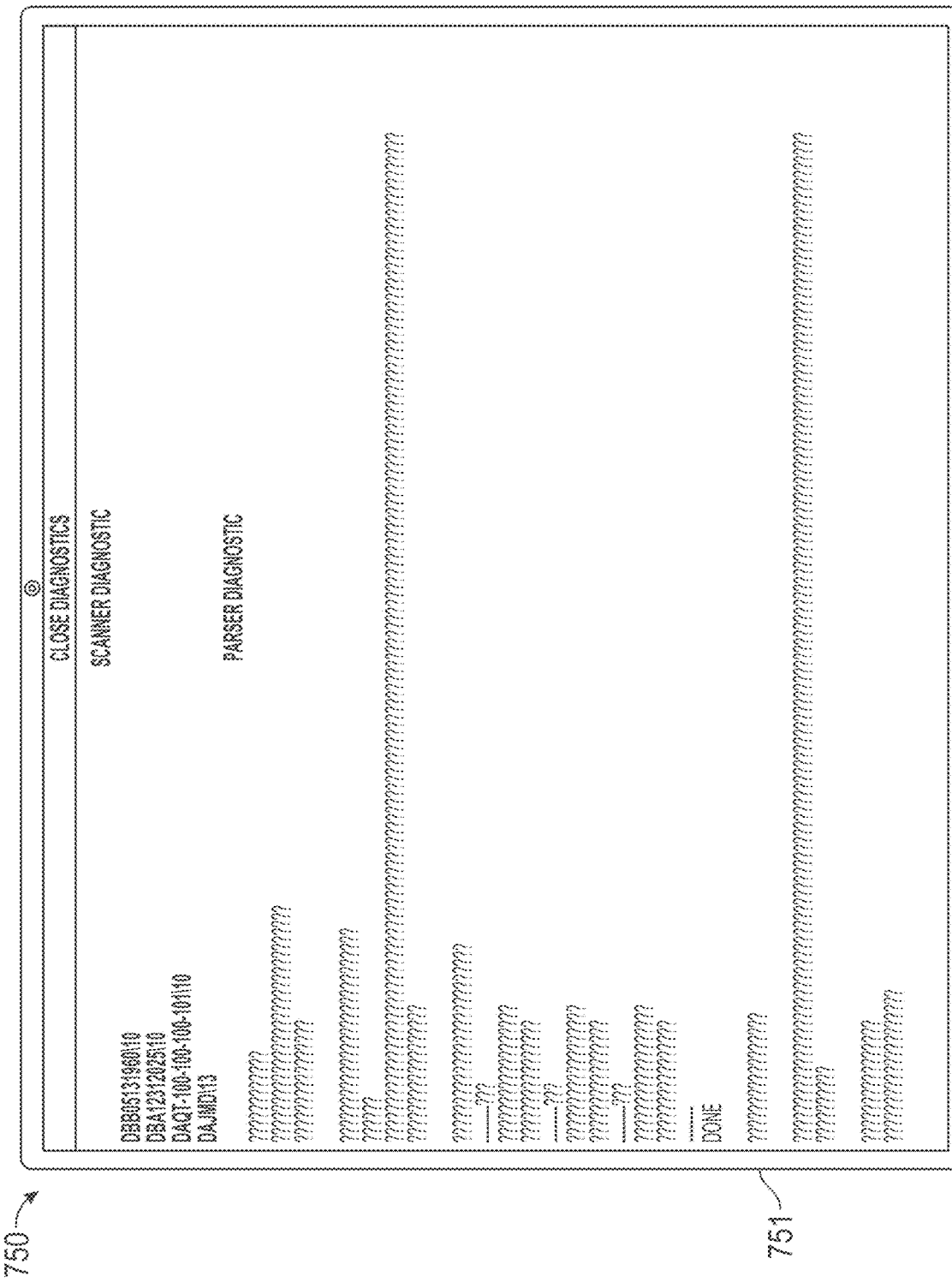
FIG. 7R depicts an example of an interface displaying on-board scan diagnostics that may be implemented by the application aspects of the AVS system, in accordance with an embodiment of the present disclosure.
Figure 7T:
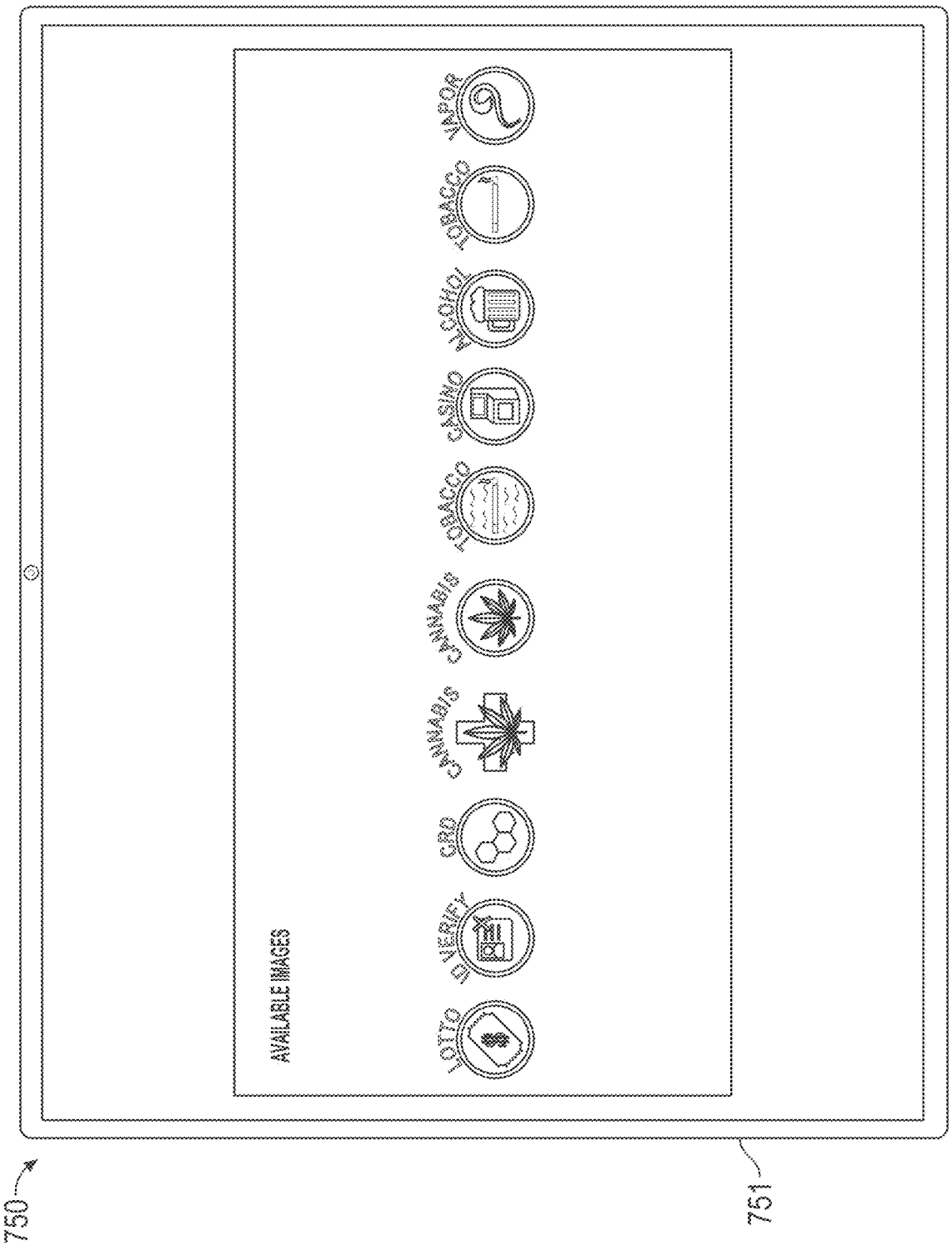
FIG. 7T depicts an example of an interface displaying custom icons that may be implemented by the application aspects of the AVS system, in accordance with an embodiment of the present disclosure.
Figure 7U:
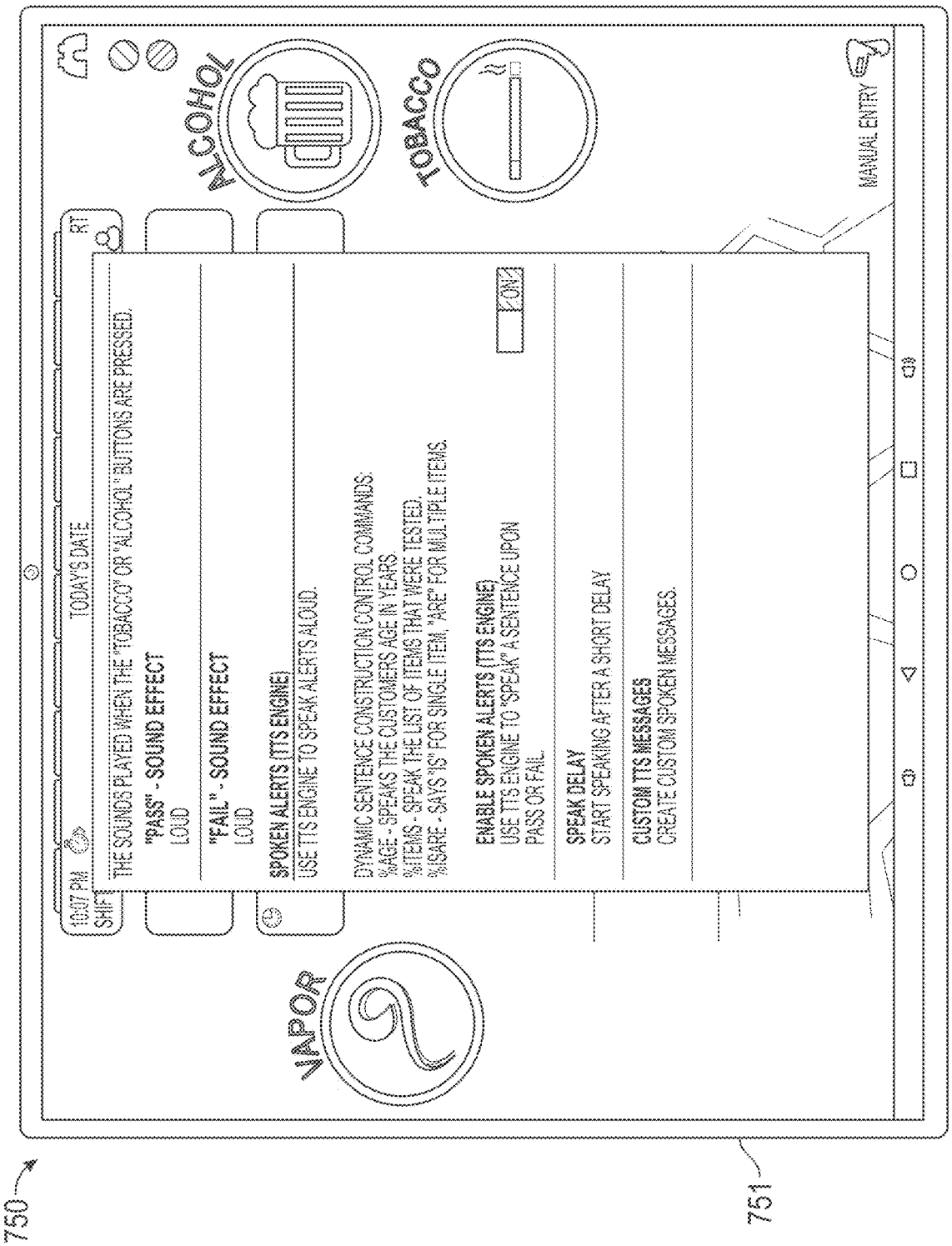
FIG. 7U depicts an example of an interface supporting a spoken message simulator that may be implemented by the application aspects of the AVS system, in accordance with an embodiment of the present disclosure.
Figure 7V:
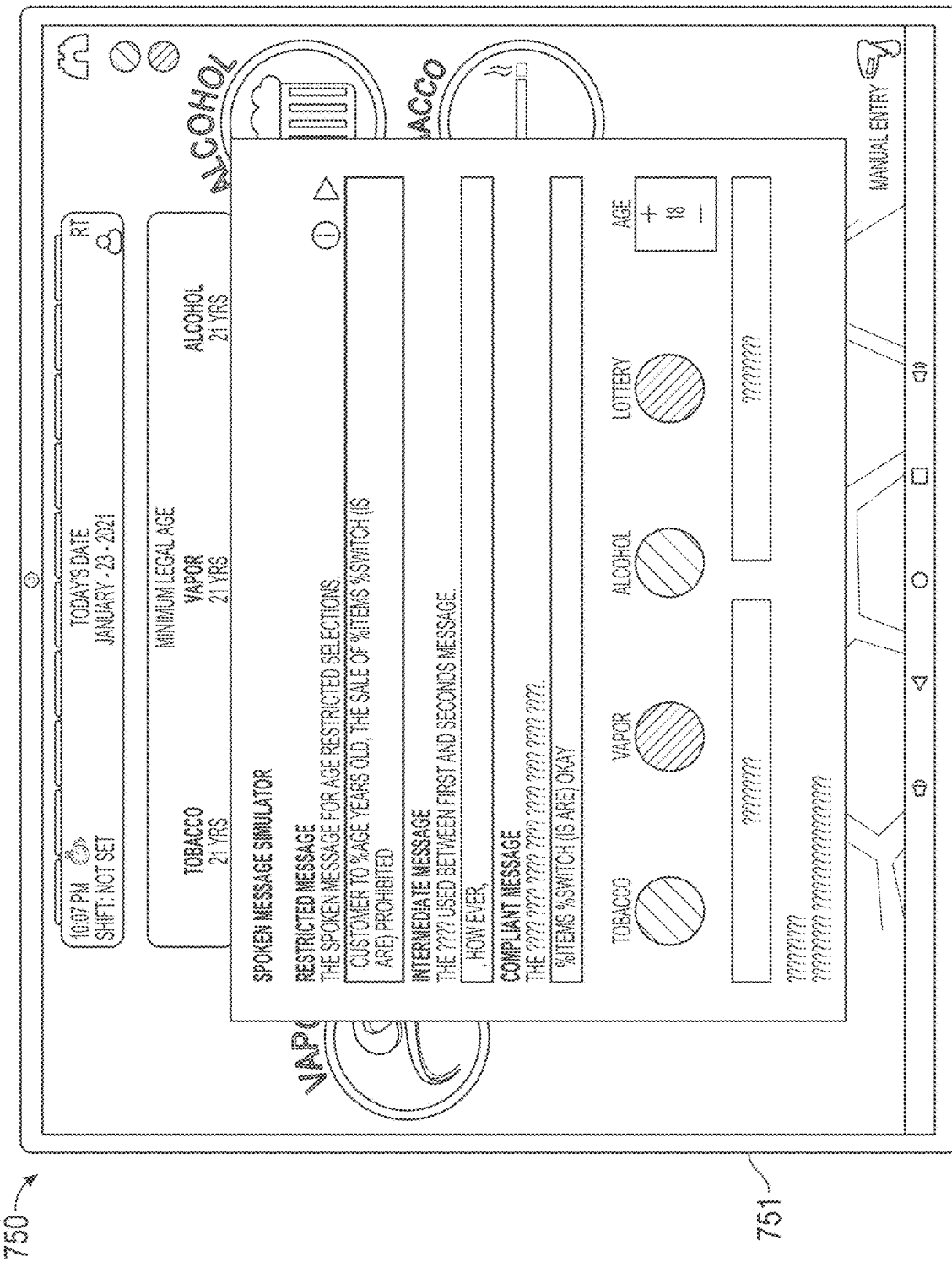
FIG. 7V depicts an example of an interface supporting a set-up of visually impaired speech feature that may be implemented by the application aspects of the AVS system, in accordance with an embodiment of the present disclosure.
Figure 7W:
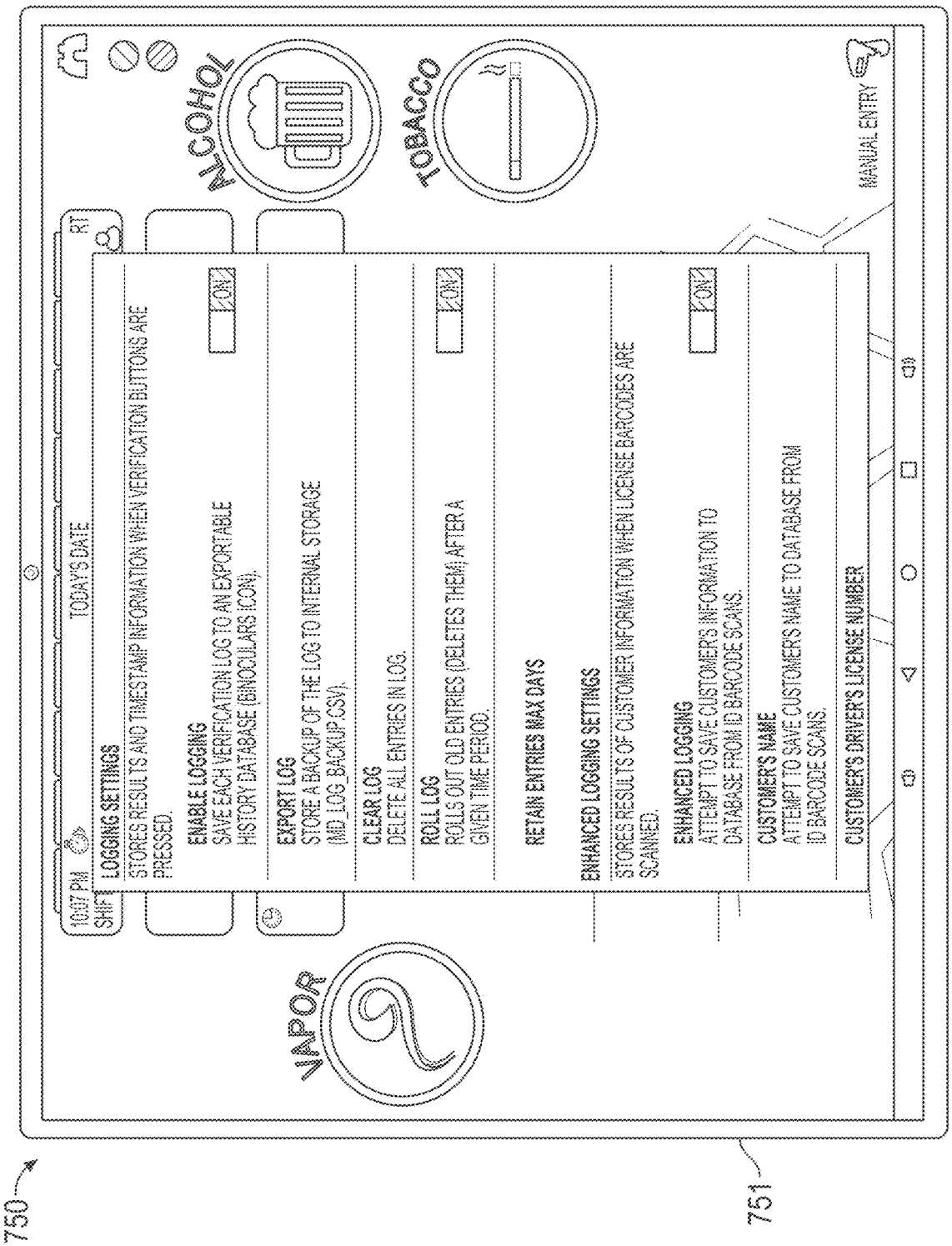
FIG. 7W depicts an example of an interface supporting the export of scan logs that may be implemented by the application aspects of the AVS system, in accordance with an embodiment of the present disclosure.
Figure 7X:
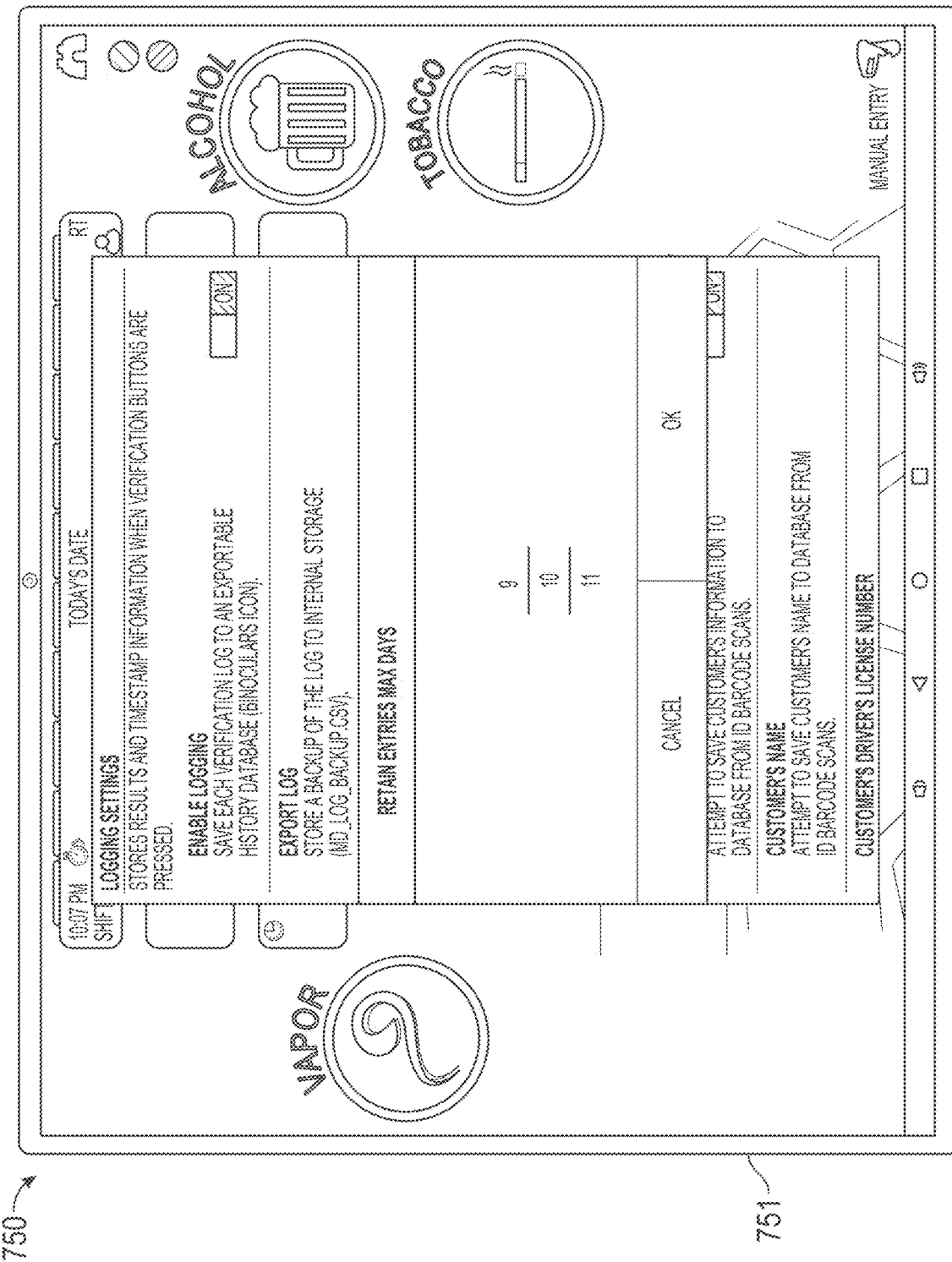
FIG. 7X depicts an example of an interface supporting set-up of roll logs that may be implemented by the application aspects of the AVS system, in accordance with an embodiment of the present disclosure.

FIGS. 7G-7X depict examples of various additional features that can be implemented by the AVS, as disclosed herein.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computer processors, not only residing within a single machine, but deployed across a number of machines.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A employee-operated point of sale (POS) age verification system, comprising:
    a computing device;
    a processor of an age verification node operatively connected to at least one scanner device;
    a control box comprising:
        a network door controller electrically connected to the processor of the age verification node;
        a lock relay electrically connected to the network door controller;
        a lock mechanism electrically connected to the control box, the lock mechanism is configured to be oriented in a locked position or an unlocked position;
        a memory storing machine-readable instructions that when executed by the processor, cause the processor to:
            acquire scan image data of a user ID from the at least one scanner device in bidirectional communication with the computing device;
            extract a verifiable feature data from the scan image, where in the verifiable feature data comprises at least one of: a two-dimensional bar code, a quick response code, and a PDF417 barcode;
            provide the scan image data to a server for comparing the scan image data against a database of stored valid IDs;
            analyze the verifiable feature data to generate a user age verification result;
            compare the user age verification result against a pre-set age requirement data value;
            responsive to the user age verification result meeting the pre-set age requirement data value, validate an age restricted transaction for the user;
            responsive to a match between the scan image data and a stored valid ID, enable access to an age restricted action and generate, via the processor of the age verification node, an output signal;
            transmit the output signal to the control box to generate, via the network door controller of the control box, a command signal;
            transmit the command signal to the lock relay to orient the locking mechanism in the unlocked position;
        implementing the at least one scanner device to interpret the verifiable feature data to output a dynamic feedback to the computing device;
        further comprising an access gate device operatively connected to the processor of the age verification node and configured to receive a signal from the processor to open the gate to provide access to an age-restricted area;
        outputting, in real time, a control signal to the actuator to physically enable and disable access and sale based on the result;
        implementing an artificial intelligence module to analyze behavioral patterns and identify counterfeit identification documents;
        performing real-time multi-threshold verification across distinct product categories comprising alcohol, tobacco, lottery, and vaping products in one transaction; and
        associating each scan with time, employee ID, and store location in the compliance log for regulatory auditing purposes.

2. The system of claim 1, wherein the instructions further cause the processor to deny the age restricted transaction for the user responsive to the user age verification result being below the age requirement data value.

3. The system of claim 1, wherein the instructions further cause the processor to acquire an age restricted transaction request and to determine the age requirement data value based on the age restricted transaction request.

4. A method of age verification performed by an employee-operated point of sale system, the method comprising:
    acquiring, by a processor of an age verification employee-operated point of sale system, scan image data of a user ID from an at least one scanner device in bidirectional communication with a computing device;
    providing a control box comprising:
        a network door controller electrically connected to the processor of the age verification node;
        a lock relay electrically connected to the network door controller;
    providing a lock mechanism electrically connected to the control box, the lock mechanism is configured to be oriented in a locked position or an unlocked position;
    extracting, by the processor of the age verification employee-operated point of sale node, a verifiable feature data from the scan image wherein extracting the verifiable feature data comprises at least one of: a two-dimensional bar code, a quick response code, and a PDF417 barcode;

implementing the age verification employee-operated point of sale node to interpret the verifiable feature data to output a dynamic feedback to the computing device;

providing the scan image data to an AI module to receive a validation of the age of the user based on predicted determination of validity of the age based on the user ID;

analyzing, by the processor of the age verification employee-operated point of sale node, the verifiable feature data to generate a user age verification result;

comparing, by the processor of the age verification employee-operated point of sale node, the user age verification result against a pre-set age requirement data value;

responsive to the user age verification result meeting the pre-set age requirement data value, validating an age restricted transaction for the user and generating, via the processor of the age verification node, an output signal;

transmitting the output signal to the control box to generate, via the network door controller of the control box, a command signal;

transmitting the command signal to the lock relay to orient the locking mechanism in the implementing an artificial intelligence module to analyze behavioral patterns and identify counterfeit identification documents;

performing real-time multi-threshold verification across distinct product categories comprising alcohol, tobacco, lottery, and vaping products in one transaction; and associating each scan with time, employee ID, and store location in the compliance log for regulatory auditing purposes.

5. The method of claim 4, further comprising denying the age restricted transaction for the user responsive to the user age verification result being below the age requirement data value.

6. The method of claim 4, further comprising acquiring an age restricted transaction request and determining the age requirement data value based on the age restricted transaction request.

7. The method of claim 4, further comprising providing the scan image data to a server for comparing the scan image data against a database of stored valid IDs.

8. The method of claim 7, further comprising, responsive to a match between the scan image data and a stored valid ID, enabling access to an age restricted action.

9. A non-transitory computer-readable medium comprising instructions, that when executed by a processor of an employee-operated point of sale (POS) age verification system, cause the processor to perform a method comprising:

acquiring scan image data of a user ID from an at least one scanner point of sale device in bidirectional communication with a computing device;

providing a control box comprising:
a network door controller electrically connected to the at least one scanner point of sale device; and
a lock relay electrically connected to the network door controller;

providing a lock mechanism electrically connected to the control box, the lock mechanism is configured to be oriented in a locked position or an unlocked position;

extracting a verifiable feature data from the scan image wherein the processor extracts the verifiable feature data comprising at least one of: a two-dimensional bar code, a quick response code, and a PDF417 barcode;

implementing the at least one scanner point of sale device to interpret the verifiable feature data to output a dynamic feedback to the computing device;

analyzing the verifiable feature data to generate a user age verification result;

comparing the user age verification result against a pre-set age requirement data value; and responsive to the user age verification result meeting the pre-set age requirement data value, validating an age restricted transaction for the user and generating, via the at least one scanner point of sale device, an output signal;

transmitting the output signal to the control box to generate, via the network door controller of the control box, a command signal;

transmitting the command signal to the lock relay to orient the locking mechanism in the unlocked position;

performing real-time multi-threshold verification across distinct product categories comprising alcohol, tobacco, lottery, and vaping products in one transaction;

implementing an artificial intelligence module to analyze behavioral patterns and identify counterfeit identification documents; and associating each scan with time, employee ID, and store location in a compliance log for regulatory auditing purposes.

10. The non-transitory computer readable medium of claim 9, further comprising instructions, that when read by the processor, cause the processor to deny the age restricted transaction for the user responsive to the user age verification result being below the age requirement data value.

11. The non-transitory computer readable medium of claim 9, further comprising instructions, that when read by the processor, cause the processor to acquire an age restricted transaction request and to determine the age requirement data value based on the age restricted transaction request.

12. The non-transitory computer readable medium of claim 9, further comprising instructions, that when read by the processor, cause the processor to provide the scan image data to a server for comparing the scan image data against a database of stored valid IDs.

13. The non-transitory computer readable medium of claim 12, further comprising instructions, that when read by the processor, cause the processor to, responsive to a match between the scan image data and a stored valid ID, enable access to an age restricted action.

* * * * *